United States Patent
Alrod et al.

(10) Patent No.: US 11,068,342 B1
(45) Date of Patent: Jul. 20, 2021

(54) REDUNDANCY DATA IN INTEGRATED MEMORY ASSEMBLY

(71) Applicant: Western Digital Technologies, Inc., San Jose, CA (US)

(72) Inventors: Idan Alrod, Herzliya (IL); Eran Sharon, Rishon Lezion (IL); Ran Zamir, Ramat Gan (IL); Stella Achtenburg, Netanya (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/889,459

(22) Filed: Jun. 1, 2020

(51) Int. Cl.
*G06F 11/00* (2006.01)
*G06F 11/10* (2006.01)

(52) U.S. Cl.
CPC ............................... *G06F 11/1068* (2013.01)

(58) Field of Classification Search
None
See application file for complete search history.

(56) References Cited

U.S. PATENT DOCUMENTS

| 9,268,635 | B2 | 2/2016 | Sharon et al. | |
| 10,218,384 | B2 | 2/2019 | Sharon et al. | |
| 10,312,944 | B2* | 6/2019 | Khayat | H03M 13/2918 |
| 10,387,303 | B2 | 8/2019 | Mehra et al. | |
| 10,459,644 | B2 | 10/2019 | Mehra et al. | |
| 10,565,123 | B2 | 2/2020 | Song et al. | |
| 10,991,444 | B1* | 4/2021 | Bazarsky | G11C 29/021 |
| 2016/0156372 | A1* | 6/2016 | Motwani | G06F 11/1076 714/755 |
| 2016/0179620 | A1 | 6/2016 | Bazarsky et al. | |
| 2017/0148510 | A1 | 5/2017 | Bazarsky et al. | |
| 2017/0255517 | A1 | 9/2017 | Achtenberg et al. | |
| 2018/0091172 | A1 | 3/2018 | Ilani et al. | |
| 2019/0132007 | A1* | 5/2019 | Weinberg | G06F 11/1076 |
| 2019/0140668 | A1* | 5/2019 | Kim | H03M 13/35 |
| 2019/0163620 | A1* | 5/2019 | Muthiah | G06F 3/064 |
| 2019/0188073 | A1* | 6/2019 | Motwani | G06F 11/108 |
| 2019/0341375 | A1 | 11/2019 | Hirano et al. | |
| 2020/0304149 | A1* | 9/2020 | Zamir | H03M 13/1111 |

OTHER PUBLICATIONS

R. Motwani and C. Ong, "Soft decision decoding of RAID stripe for higher endurance of flash memory based solid state drives," 2015 International Conference on Computing, Networking and Communications (ICNC), 2015, pp. 603-607, doi: 10.1109/ICCNC.2015.7069413. (Year: 2015).*

* cited by examiner

*Primary Examiner* — Daniel F. McMahon
(74) *Attorney, Agent, or Firm* — Vierra Magen Marcus LLP

(57) ABSTRACT

Technology for recovering data in memory dies is disclosed. A set of codewords may be stored across a set of memory dies. One of the memory dies stores redundancy information that is based on information from each codeword in the set of codewords. Each of the memory dies is bonded to control die through bond pads that allow communication between the control die and the memory die. If decoding of one of more codewords fails, the redundancy information may be used to recover data bits of all the codewords in the set. The redundancy information may be sent to a memory controller that is in communication with the control dies, which performs the data recovery.

24 Claims, 29 Drawing Sheets

Sparse parity check matrix H

N=13 variable nodes
v1 v2 v3 v4 v5 v6 v7 v8 v9 v10 v11 v12 v13

M=10 check nodes

| | v1 | v2 | v3 | v4 | v5 | v6 | v7 | v8 | v9 | v10 | v11 | v12 | v13 |
|---|---|---|---|---|---|---|---|---|---|---|---|---|---|
| cn1 | | 1 | | 1 | | | | | | | 1 | | 1 |
| cn2 | 1 | | | | | | 1 | | | | | 1 | |
| cn3 | | | 1 | | 1 | 1 | | | | 1 | 1 | | |
| cn4 | | 1 | | | | | | 1 | | | 1 | | |
| cn5 | | | | 1 | | | 1 | | | | | 1 | |
| cn6 | 1 | | | | 1 | 1 | | | 1 | | | | |
| cn7 | | 1 | | | | | | 1 | | 1 | | | 1 |
| cn8 | | | | | 1 | | | 1 | | | 1 | 1 | |
| cn9 | 1 | | 1 | | 1 | | | | | | | | 1 |
| cn10 | | | | | | | 1 | 1 | 1 | 1 | | | |

Sparse bipartite graph, 392

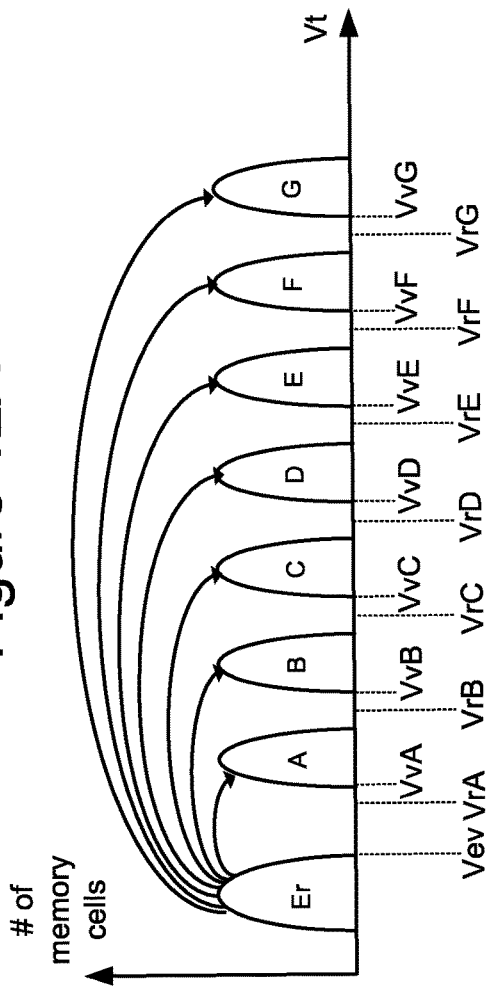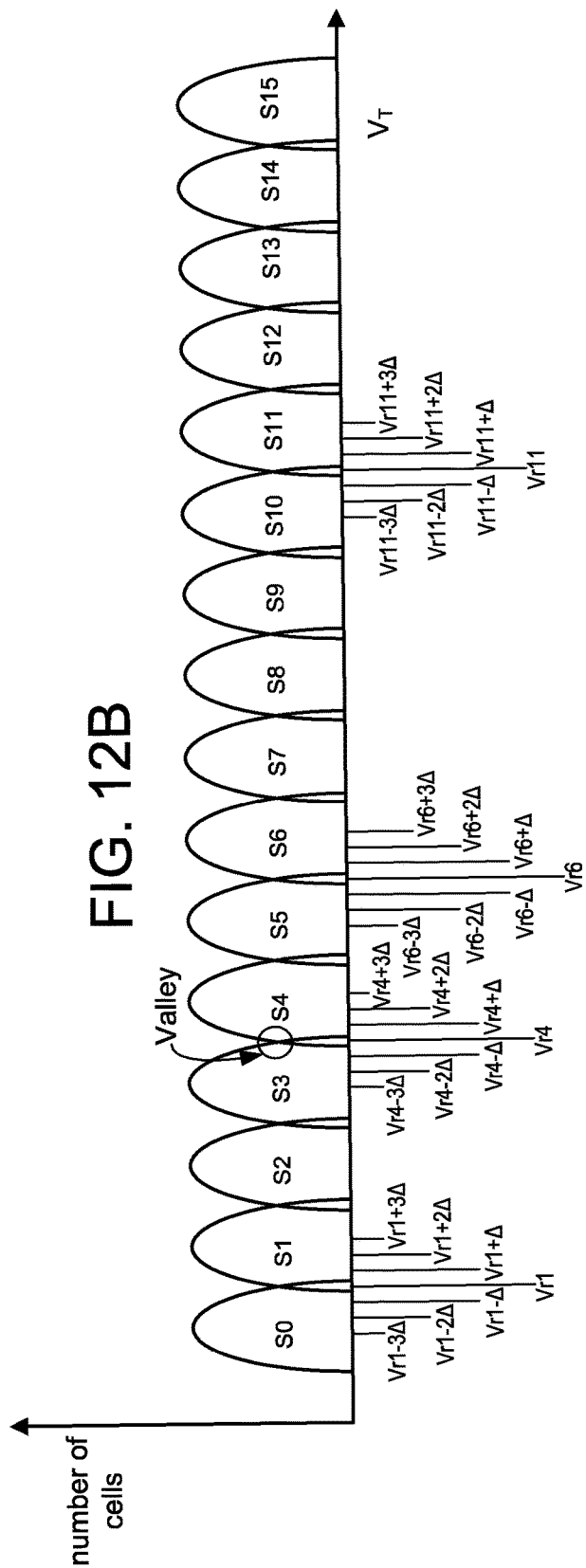

REDUNDANCY DATA IN INTEGRATED MEMORY ASSEMBLY

BACKGROUND

The strong growth in demand for portable consumer electronic devices is driving the need for high-capacity storage devices. Non-volatile semiconductor memory devices, such as flash memory storage cards, are widely used to meet the ever-growing demands on digital information storage and exchange. Their portability, versatility and rugged design, along with their high reliability and large capacity, have made such memory devices ideal for use in a wide variety of electronic devices, including for example digital cameras, digital music players, video game consoles, PDAs and cellular telephones.

Non-volatile semiconductor memory devices contain non-volatile memory cells that may be programmed to store data. Typically, the memory cells are programmed to a number of data states. Using a greater number of data states allows for more bits to be stored per memory cell. For example, four data states may be used to store two bits per memory cell, eight data states may be used in order to store three bits per memory cell, 16 data states may be used to store four bits per memory cell, etc. To read the data back from the non-volatile memory cells, it is typical to use read reference voltages in order to determine what data state a memory cell is presently in.

It is possible for there to be errors in the data at the time when the data is read from the non-volatile memory cells. It is typical to use some type of error correcting code (ECC) to recover from such errors. For example, an ECC encoder may generate parity bits based on the user data. The parity bits may be stored in the non-volatile memory cells. For example, an ECC codeword (or more briefly "codeword") that contains the user data and the parity bits may be stored in the memory cells. An ECC decoder may be used to run an ECC algorithm to detect and correct errors in the data. An ECC decoder is able to decode an ECC codeword based only on the ECC codeword. However, in some cases there may be too many errors in the data for the ECC decoder to correct the user data in an ECC codeword, based only on the parity bits for that codeword.

DESCRIPTION OF THE DRAWINGS

FIG. 12A illustrates example threshold voltage distributions for the memory array when each memory cell stores three bits of data.

FIG. 12B depicts threshold voltage distributions when each memory cell stores four bits of data.

DETAILED DESCRIPTION

Figure 1A:
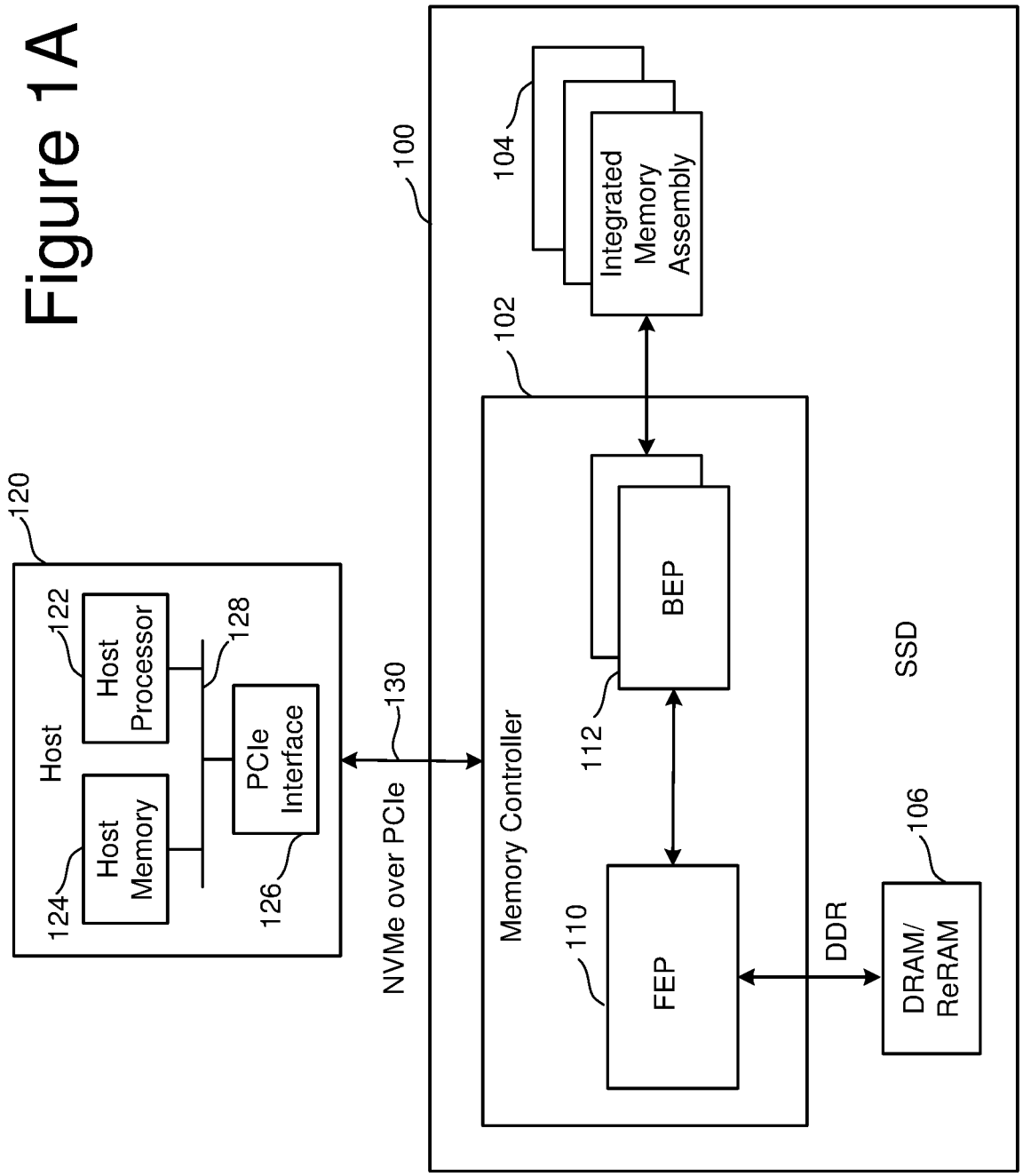
FIG. 1A is a block diagram of one embodiment of a memory system connected to a host.

The present technology will now be described with reference to the figures, which in embodiments, relate to data recovery in a memory system. In one embodiment, the memory system includes an integrated memory assembly having control dies and memory dies. The memory dies contain non-volatile memory cells. Each control die may be bonded to one of the memory dies with bonds pads. The control die controls various operations on the memory die, such as read, write, and erase. In one embodiment, data and/or control signals are passed through the bond pads. In some embodiments, the memory system includes a memory controller in communication with the integrated memory assembly. In some embodiments, the memory controller and integrated memory assembly communicate over a data bus.

In some embodiments, the memory system recovers data when an ECC decoder is unable to correct user data in a codeword based only on parity bits in that codeword. Herein, the term "failed codeword" (or "failed ECC codeword") will be used to refer to a codeword for which at least one ECC decoder in the memory system is unable to correct the user data in the codeword based only on the parity bits in that codeword. The memory system will typically have more than one type of ECC decoder, with some having better error correcting capability than others. Thus, if one ECC decoder fails to decode a codeword, one or more other ECC decoders with greater error correction capability may be used to attempt decode the failed codeword. It is not required to use every ECC decoder in the memory system for the codeword to be considered a failed codeword. In other words, even if one ECC decoder in the memory system is unable to decode the codeword, the codeword is considered to be a failed codeword. In some cases, every ECC decoder in the memory system is used to attempt to decode the failed codeword. If every ECC decoder in the memory system fails to decode a codeword, then this will be referred to herein as an unrecoverable by error correction code (UECC) error.

In some embodiments, the memory system uses additional redundancy information that was generated from multiple codewords in order to recover a failed codeword. An example of additional redundancy information is an Exclusive OR (XOR) codeword that is formed by an XOR of multiple codewords. For example, the XOR codeword may be formed from a bitwise XOR of each of the codewords. The combination of the multiple codewords and the XOR codeword is referred to herein as an XOR stripe. In some embodiments, the XOR stripe spans multiple memory dies. For example, one or more of the codewords in the XOR stripe are stored on each of a number of memory dies. In some embodiments, the entire XOR stripe is stored on a single memory die. Note that in some embodiments, the memory system does not use the additional redundancy information unless there is a UECC error. However, it is not required for there to be a UECC error for the memory system to use the additional redundancy information to recover a failed codeword.

In one embodiment, each codeword is decoded at a control die using an ECC decoder based on the parity bits of the individual codeword. In some embodiments, the memory controller is able to decode codewords using the parity bits in the event that a control die failed to decode the codeword. In some embodiments, the memory controller uses a different technique to decode the codewords than the control dies. For example, the memory controller may use a message passing soft bit decoder, whereas the control dies may each use a bit flipping decoder.

In one embodiment, XOR information is sent to the memory controller when decoding one or more codewords in an XOR stripe using an ECC decoder at a control die fails. The memory controller may also receive information from decoding (or attempting to decode) the codewords at each of the control dies. This information could include the data bits when the codeword is successfully decoded or the codeword (or a partially decoded codeword) when the codeword is not successfully decoded. The information could also include a syndrome weight of a codeword when the codeword is not successfully decoded. In one embodiment, the memory controller uses the redundancy information and other decoding information from the control dies to recover the data bits in all of the codewords in the set.

In some embodiments, a control die has an XOR engine, such that it can perform an XOR recovery for a failed codeword. In one embodiment, the control die stores an entire XOR stripe on a single memory die. Performing the XOR recovery at the control die can vastly reduce the amount of data that is sent to the memory controller to recover the failed codeword. In one embodiment, the control die runs an ECC decoder on each codeword in the XOR stripe, with the exception of the failed codeword. For each codeword that is successfully decoded, the control die performs an XOR operation with the content of an XOR buffer, and stores the result in the XOR buffer. For any codewords that are not successfully decoded with the ECC decoder, the control die sends the un-decoded codeword to the memory controller. In many cases, there will not be any such un-decoded codewords. The amount of information in the XOR buffer is quite small. For example, the content of the XOR buffer may be the size of a codeword.

In some embodiment, the XOR stripe spans multiple memory die. To recover one or more failed codewords in the XOR stripe, each control die performs an XOR recovery on codewords stored in the one or more memory dies that the control die controls. Each control die sends the memory controller the results of its XOR recovery, which may be the content of the aforementioned XOR buffer. Each memory die may also send the memory die un-decoded codewords for any codewords that the control die was unable to decode using an ECC decoder. The memory controller then completes the XOR recovery, which may include performing further XOR operations on the contents of the XOR buffers from the control dies.

Hence, if one or more control die performs all or part of the XOR recovery, very little information needs to be transferred to the memory controller, relative to if the memory controller were to perform the entire XOR recovery. If the memory controller were to perform the entire XOR recovery, the control die would need to transfer all of the codewords. If there are, for example, 128 codewords in the XOR stripe, this represents a substantial savings. Also, memory usage in the memory controller is reduced by performing the XOR in one or more control die. Note that in some memory systems, a memory controller is designed to operate with a configurable number of memory dies. For example, the memory controller may be designed to operate in a memory system that has 8, 16, 32, 64, or more memory dies. The memory controller may be designed to operate for the highest number of memory dies, and hence may contain sufficient memory for the maximum possible number of memory dies. However, performing the XOR recovery on the control die reduces the amount of memory that needs to be provisioned in the memory controller for XOR recovery.

In some embodiments, a joint XOR and LDPC recovery (JLX recovery) is performed. Some of the calculations of the JLX recovery are performed on the control dies, which allows such calculations to be performed in parallel. Also, performing calculations on a control die significantly reduced data transfer from the control die to the memory controller.

In some embodiments, an iterative approach of JLX recovery is used, which can help to recover more than one failed codeword in an XOR stripe. In some cases, it is difficult to recover a first failed codeword in an XOR stripe, due to a second (or third, etc.) failed codeword in the XOR stripe. In one embodiment, if a first XOR recovery of a first failed codeword is not successful, then iterative approach of JLX recovery is used. The iterative approach may include performing a second XOR recovery to recover a second failed ECC codeword in the XOR stripe. Then, a third XOR recovery may be performed to recover the first failed ECC codeword based on the recovered second failed ECC codeword. The iterative approach may be extended in the event that there are more than two failed codewords in the XOR stripe.

In some embodiments, the control die and the memory die are bonded together with many bond pads that permit communication between the control die and the memory die. In one embodiment, the control die is able to access data from the memory die through the bond pads. In one embodiment, each data bit and each parity bit of a codeword is read by way of a different bond pads. This, in effect, provides an interface that is much wider than a data bus between the integrated memory assembly and the memory controller. Therefore, transferring the codewords from the memory die to the control die is very efficient. A net effect is that having decoding on the control die can be more efficient use of communication bandwidth than decoding on the memory controller.

In some embodiments, the control die and the memory die are fabricated on different semiconductor wafers, which permits use of different semiconductor fabrication processes on the different wafers. For example, semiconductor fabrication processes may involve high temperature anneals. Such high temperature anneals may be needed for proper formation of some circuit elements, but could be damaging to other circuit elements. It can be challenging to form complex circuitry such as decoders on the memory die due to limitations of semiconductor fabrication processes. Also, the fabrication process that is used to form memory cells on the memory die may place constraints on the size of the transistors that are formed on the memory die. In some embodiments, the control circuitry on the control die has transistors that are a different size (e.g., smaller) than memory cell transistors on the memory die. The different (e.g., smaller) size of the transistors on the control die may improve performance of the control circuitry on the control die. For example, smaller transistors may use less power than larger transistors. Also, using smaller transistors allows one embodiment of a control die to have more transistors for control circuitry on the control die.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal," and forms thereof, as may be used herein are by way of example and illustrative purposes only, and are not meant to limit the description of the technology inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.25% of a given dimension.

FIG. 1A-FIG. 3B describe one example of a memory system that can be used to implement the technology proposed herein. FIG. 1A is a block diagram of one embodiment of a memory system 100 connected to a host 120. Memory system (e.g., non-volatile memory system) 100 can implement the technology proposed herein. Many different types of memory systems can be used with the technology proposed herein. One example memory system is a solid state drive ("SSD"); however, other types of memory systems can also be used. Memory system 100 comprises a memory controller 102, integrated memory assembly 104 for storing data, and local memory (e.g. DRAM/ReRAM) 106. Memory controller 102 comprises a Front End Processor Circuit (FEP) 110 and one or more Back End Processor Circuits (BEP) 112. In one embodiment FEP 110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the memory controller 102 is manufactured as a System on a Chip ("SoC"). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the integrated memory assemblies/die at the request of FEP circuit 110. In some embodiments, an integrated memory assembly is referred to as a memory package. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Memory controller 102 is one example of a control circuit. The term apparatus may be used herein to refer to any of, but not limited to, integrated memory assembly 104, memory system 100, memory controller 102, or the combination of memory system 100 and host 120.

In one embodiment, there are a plurality of integrated memory assemblies 104. In an embodiment, each integrated memory assembly 104 includes one or more memory die and one or more control die. Each memory die may include one or more memory structures. A control die may control operations on a memory die. For example, a control die may control read, write, and erase operations on a memory die. In one embodiment, the memory controller 102 communicates with a control die in order to instruct the control die to perform read, write, or erase operations on one or more non-volatile memory die or one or more memory structures. In one embodiment, each memory die in the integrated memory assembly 104 utilize NAND flash memory (including two dimensional NAND flash memory and/or three dimensional NAND flash memory). In other embodiments, the integrated memory assembly 104 can include other types of memory; for example, the memory package can include PCM memory.

Memory controller 102 communicates with host 120 via an interface 130 that implements NVM Express (NVMe) over PCI Express (PCIe). For working with memory system 100, host 120 includes a host processor 122, host memory 124, and a PCIe interface 126. Host memory 124 is the host's physical memory, and can be DRAM, SRAM, non-volatile memory or another type of storage. Host 120 is external to and separate from memory system 100. In one embodiment, memory system 100 is embedded in host 120.

Figure 1B:
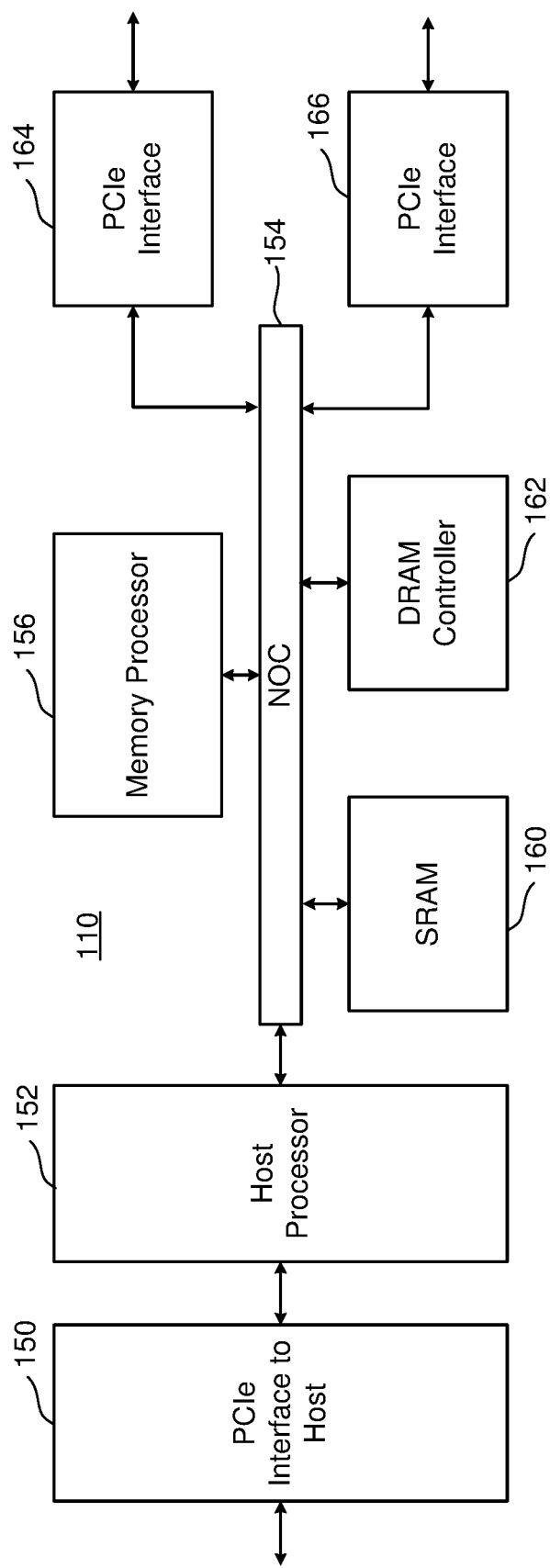
FIG. 1B is a block diagram of one embodiment of a Front End Processor Circuit.

FIG. 1B is a block diagram of one embodiment of FEP circuit 110. FIG. 1B shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 1B, memory controller 102 includes two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

Figure 2:
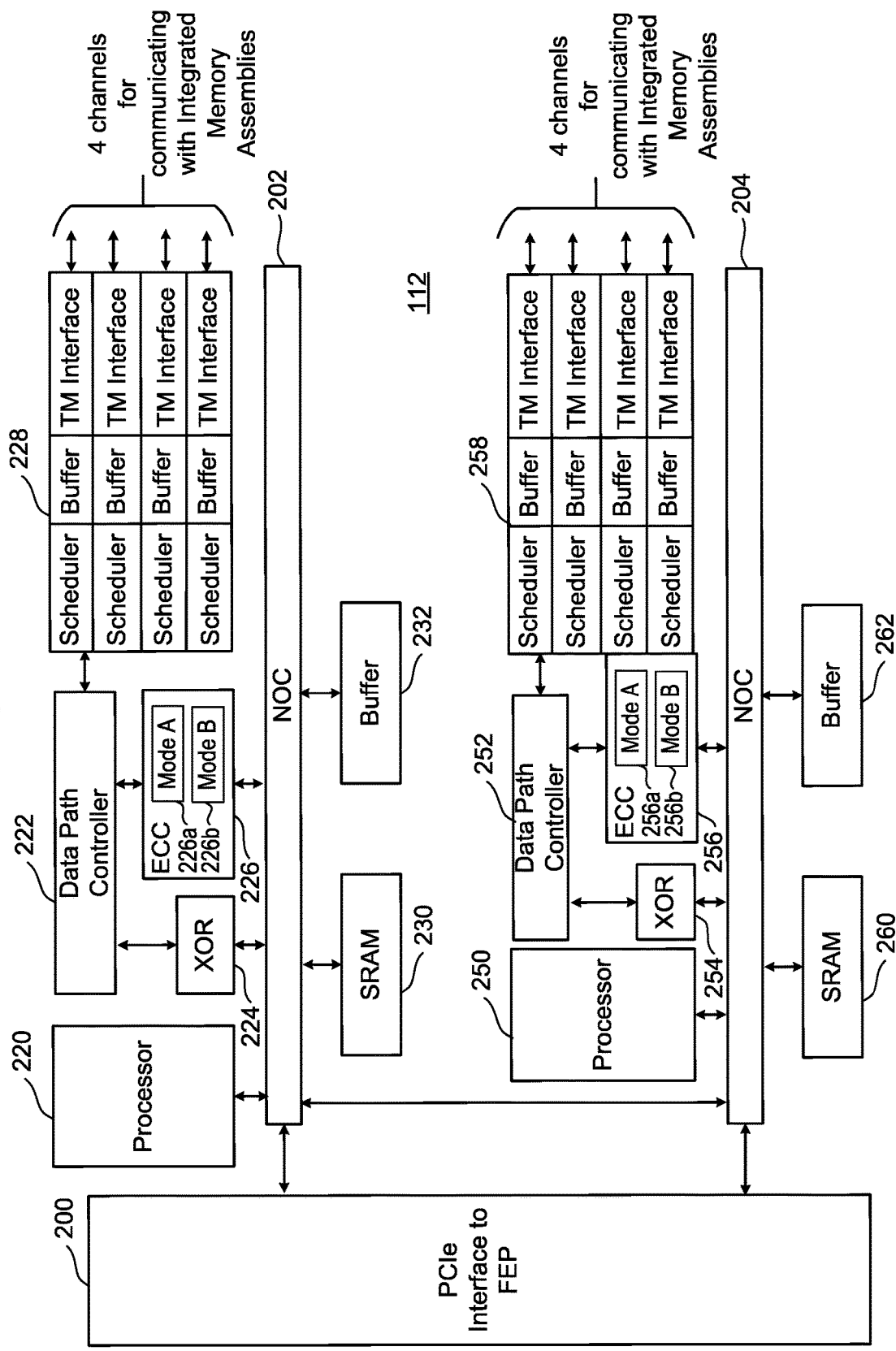
FIG. 2 is a block diagram of one embodiment of a Back End Processor Circuit.

FIG. 2 is a block diagram of one embodiment of the BEP circuit 112. FIG. 2 shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254), an ECC engine (226/256). The ECC engines 226/256 are used to perform error correction, as known in the art. Herein, the ECC engines 226/256 may be referred to as controller ECC engines.

In some embodiments, the ECC engines have different modes, such as ECC mode A 226a/256a and ECC mode B 226b/256b. In one embodiment, ECC mode A 226a/256a and ECC mode B 226b/256b are each message passing soft decoding modes. In one embodiment, ECC mode A 226a/256a and ECC mode B 226b/256b use belief propagation. The two modes may differ in their resolution. In general, a higher resolution decoder is able to correct a higher number of bit errors in a codeword. In one embodiment, the resolution refers to the number of bits in messages that are passed in an iterative message passing decoder. For example, the messages in ECC Mode B 226b/256b may have 6 bits, whereas the messages in ECC Mode A 226a/256a may have 3 bits. In some embodiments, using fewer bits in the messages (corresponding to a lower resolution) results in faster decoding. Using fewer bits in the messages may also consume less power. In one embodiment, the higher resolution decoder uses more power than the lower resolution decoder. In one embodiment, ECC mode A 226a/256a is a low power (LP) mode and ECC mode B 226b/256b is a high power (HP) mode. As will be discussed below, in some embodiments, a control die in the integrated memory assembly 104 has an ECC engine 330 (see FIG. 3A). In one embodiment, the ECC engine 330 has a bit-flipping decoder. In some embodiments, the bit-flipping decoder uses less power than either of ECC mode A 226a/256a or ECC mode B 226b/256b. The bit-flipping decoder is referred to as an ultra-lower power (ULP) decoder, in some embodiments. Further details of decoders having different resolutions are described in U.S. Pat. No. 10,218,384, entitled "ECC Decoder with Multiple Decode Modes," which is incorporated herein by reference.

The XOR engines 224/254 may be used to form redundancy information that is based on information from each codeword in a set of codewords. The redundancy information may be stored in one of the memory dies. This redundancy information may be used to recover the data bits for each of the codewords in the set. As one example, each codeword could be 4 kilobytes. Each codeword may be for one page of data, as one example. As one example, redundancy information may be formed from a bitwise XOR of each of the codewords. In one embodiment, the bitwise XOR has the same number of bits of each codeword.

Data path controller 222 is connected to a memory interface 228 for communicating via four channels with integrated memory assemblies. Thus, the top NOC 202 is associated with memory interface 228 for four channels for communicating with integrated memory assemblies and the bottom NOC 204 is associated with memory interface 258 for four additional channels for communicating with integrated memory assemblies. In one embodiment, each memory interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits. In other embodiments, the memory interface (an electrical circuit for communicating with memory dies) can be a different structure than depicted in FIG. 2. Additionally, controllers with structures different than FIGS. 1B and 2 can also be used with the technology described herein.

Figure 3A:
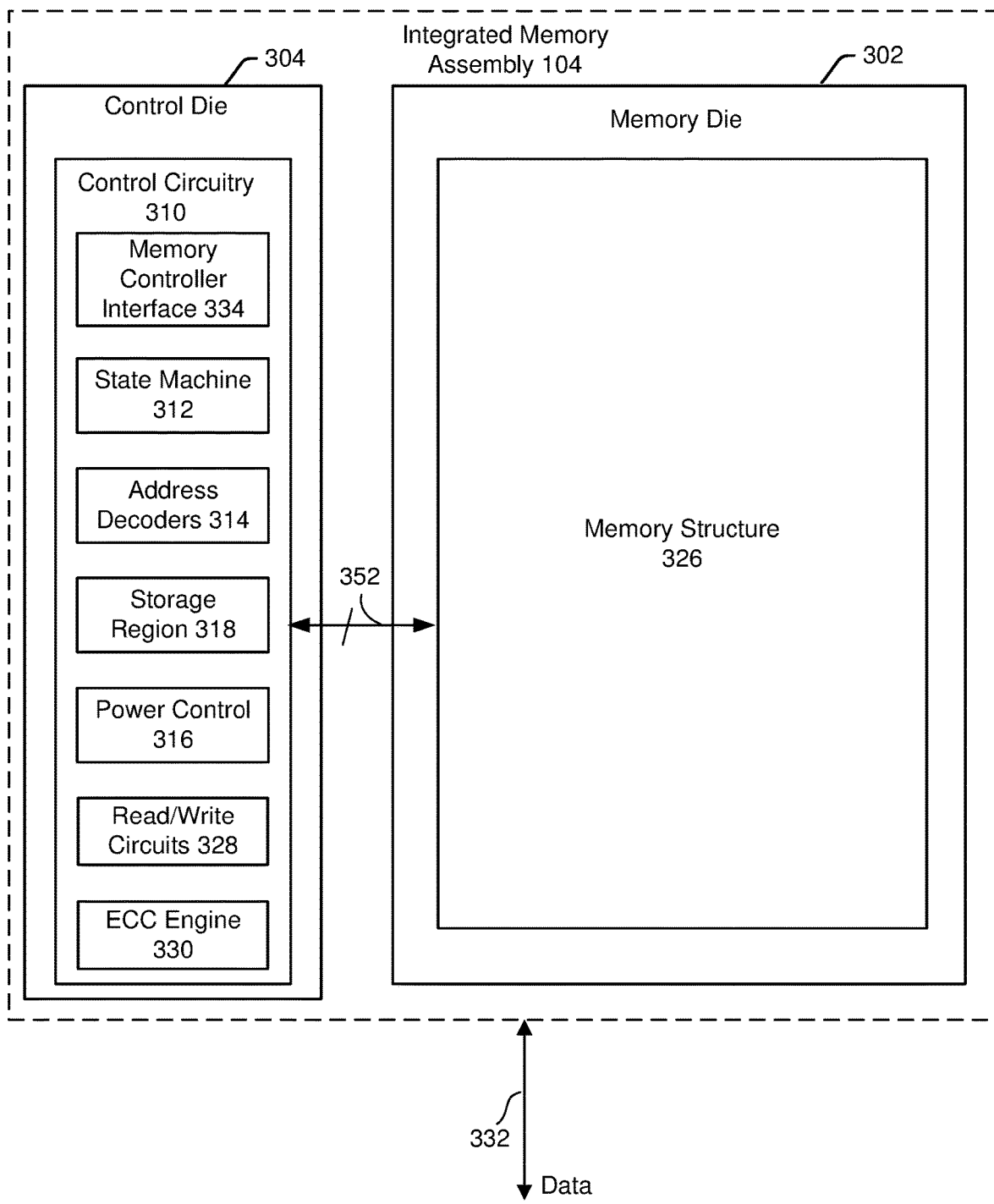
FIG. 3A is a functional block diagram of an integrated memory assembly.

FIG. 3A is a functional block diagram of one embodiment of an integrated memory assembly 104. In one embodiment, the integrated memory assembly 104 includes two semiconductor die (or more succinctly, "die"). Memory die 302 includes include memory structure 326. Memory structure 326 may contain non-volatile memory cells. Control die 304 includes control circuitry 310. In some embodiments, the memory die 302 and the control die 304 are bonded together, as will be described in more detail below.

The control circuitry 310 performs memory operations (e.g., write, read, erase and others) on memory structure 326. The control circuitry 310 includes state machine 312, an on-chip address decoder 314, a power control circuit 316, a storage region 318, read/write circuits 328, and an ECC engine 330. In another embodiment, a portion of the read/write circuits 328 are located on control die 304, and a portion of the read/write circuits 328 are located on memory die 302. For example, the read/write circuits 328 may contain sense amplifiers. In one embodiment, the sense amplifiers are located on the control die 304. In one embodiment, the sense amplifiers are located on the memory die 302.

Herein, the term, "memory die," "memory semiconductor die," or the like, means a semiconductor die that contains non-volatile memory cells for storage. Herein, the term, "control die," "control semiconductor die," or the like, means a semiconductor die that contains control circuitry for performing memory operations on non-volatile memory cells on a memory die. Typically, numerous semiconductor die are formed from a single semiconductor (e.g., silicon) wafer.

The on-chip address decoder 314 provides an address interface between addresses used by host 120 or memory controller 102 to the hardware address used by row decoders and column decoders (not expressly depicted in FIG. 3A). Power control circuit 316 controls the power and voltages supplied to the word lines, bit lines, and select lines during memory operations. The power control circuit 316 includes voltage circuitry, in one embodiment. Power control circuit 316 may include charge pumps for creating voltages. The power control circuit 316 executes under control of the state machine 312, in one embodiment.

The read/write circuits 328 includes sense blocks (which may contain sense amplifies (SA), in some embodiments. The sense amplifies include bit line drivers, in some embodiments. The read/write circuits 328 executes under control of the state machine 312, in one embodiment. Each memory structure 326 is addressable by word lines via a row decoder (not depicted in FIG. 3A) and by bit lines via a column decoder (not depicted in FIG. 3A), in some embodiments.

The error correction code (ECC) engine 330 is configured to decode and error correct codewords. Herein, ECC engine 330 may be referred to as an on-die ECC engine. In one embodiment, the on-die ECC engine 330 is configured to encode data bits from the memory controller 102 into codewords that contain the data bits and parity bits. The control circuitry stores the codewords in the memory structure 326. In one embodiment, the on-die ECC engine 330 is configured to decode the codewords, which are read back from the memory structure 326. In some embodiments, if the on-die ECC engine 330 is successful at decoding a codeword, then the control die 304 only sends back the data bits to the memory controller 102. In some embodiments, if the on-die ECC engine 330 is not successful at decoding a codeword, then the controller ECC engine 226/256 may be used to decode the codeword.

In some embodiments, first the control die 304 attempts to decode a codeword using ECC engine 330. In some embodiments, ECC engine 330 comprises a very low complexity bit flipping decoder. Embodiments of the ECC engine 330 have very low complexity and ultra-low power. If decoding fails, the memory controller 102 may attempt to decode that codeword. In some embodiments, the memory controller 102 has multiple ECC modes. For example, ECC mode A 226A (see FIG. 2) may be used to attempt to decode a codeword that the control die 304 could not decode. If ECC Mode A 224A fails to decode the codeword, then ECC mode B 224B may be used by the memory controller 102. For example, the on-die ECC engine 330 may use a bit flipping decoder to attempt to decode a codeword. Under typical conditions, decoding based on bit flipping may be successful most of the time. In the event that the on-die ECC engine 330 fails to successfully decode the codeword, the codeword may be passed to the memory controller 102. In one embodiment, the memory controller 102 first attempts to decode using a message passing soft decoding mode at one level of resolution. This first attempt may be made by ECC Mode A 224A. If the first attempt by the memory controller 102 fails, then the controller may use a message passing soft decoding mode at higher level of resolution. This second attempt may be made by ECC Mode B 224B. Note that the aforementioned bit flipping decoder may use less power than the message passing soft decoding modes. Hence, most of the time the decoding may be achieved using a low power decoder on the control die 304. None of the on-die ECC engine 330, ECC Mode A 224A, nor ECC Mode B 224B are limited to the foregoing examples.

In one embodiment, any subset of the control circuitry 310 can be considered one or more control circuits. State machine 312, read/write circuits 328, on-die ECC engine 330, and/or memory controller 102 (or equivalently functioned circuits), in combination with all or a subset of the other circuits depicted in FIG. 3A, can be considered one or more control circuits. The one or more control circuits can include hardware only or a combination of hardware and software (including firmware). For example, a controller programmed by firmware is one example of a control circuit. One or more control circuits can include a processor, PGA (Programmable Gate Array, FPGA (Field Programmable Gate Array), ASIC (Application Specific Integrated Circuit), integrated circuit or other type of circuit.

Pathways 352 are pathways between one or more components in the control circuitry 310 and the memory structure on memory die 302. A portion of each pathway resides in the memory die 302 and a portion of each pathway reside in the control die 304. The term pathway may be used for portion of pathways 352 that is entirely within one of the die. Thus, it may be stated that the memory die 302 has a first plurality of pathways and that the control die 304 has a second plurality of pathways. In one embodiment, the control die 304 and the memory die 302 are configured to transfer signals through pathway pairs of the first plurality of pathways and the second plurality of pathways. In some embodiments, the memory die 302 and the control die 304 are bonded to each other, or otherwise attached to each other, to facilitate signal transfer through the pathway pairs.

A pathway may be used to provide or receive a signal (e.g., voltage, current). A pathway includes an electrically conductive path. A pathway may include one or more of, but is not limited to, a bond pad, metal interconnect, via, transistor, electrically conducting material and other material that may transfer or carry an electrical signal. Pathways 352 allow the control circuitry 310 to provide voltages to word lines, select lines, and bit lines on memory die 302, in one embodiment. Pathways 352 may be used to receive signals from, for example, bit lines. In one embodiment, there are about 100,000 pathways 352. However, there could be more or fewer than 100,000 pathways. Having such a large number of pathways 352 allows a very large amount of data, or other signals, to be passed in parallel.

Memory controller interface 334 is an electrical interface for communicating with memory controller 102. For example, memory controller interface 334 may implement a Toggle Mode Interface that connects to the Toggle Mode interfaces of memory interface 228/258 for memory controller 102. In one embodiment, memory controller interface 334 includes a set of input and/or output (I/O) pins that connect to communication channel 332 (also refers to herein as a data bus). In one embodiment, communication channel 332 connects to the memory controller 102 as part of the Toggle Mode Interface. In one embodiment, a communication channel 332 of one integrated memory assembly 104 connects to another integrated memory assembly 104.

Communication channel 332 is depicted as being connected to integrated memory assembly 104 for generality. Communication channel 332 may connect to either or both of die 302 and/or 304. In one embodiment, communication channel 332 connects the memory controller 102 directly to control die 304. In one embodiment, communication channel 332 connects the memory controller 102 directly to memory die 302. If communication channel 332 connects the controller directly to memory die 302, then pathway 352 may be used to allow communication between the memory controller 102 and the control circuitry 310.

In one embodiment, memory structure 326 comprises a three-dimensional memory array of non-volatile memory cells in which multiple memory levels are formed above a single substrate, such as a wafer. The memory structure may comprise any type of non-volatile memory that are monolithically formed in one or more physical levels of arrays of memory cells having an active area disposed above a silicon (or other type of) substrate. In one example, the non-volatile memory cells comprise vertical NAND strings with charge-trapping material.

In another embodiment, memory structure 326 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 326 is not limited to the examples above. Many different types of memory array architectures or memory technologies can be used to form memory structure 326. No particular non-volatile memory technology is required for purposes of the new claimed embodiments proposed herein. Other examples of suitable technologies for memory cells of the memory structure 326 include phase change memory (e.g., PCM), and the like. Examples of suitable technologies for memory cell architectures of the memory structure 326 include two-dimensional arrays, three-dimensional arrays, cross-point arrays, stacked two-dimensional arrays, vertical bit line arrays, and the like.

A person of ordinary skill in the art will recognize that the technology described herein is not limited to a single specific memory structure, but covers many relevant memory structures within the spirit and scope of the technology as described herein and as understood by one of ordinary skill in the art.

Although FIG. 3A depicts one control die 304 and one memory die 302 in an integrated memory assembly 104, there may be more than one control die 304 and more than one memory die 302 in an integrated memory assembly 104.

Figure 3B:
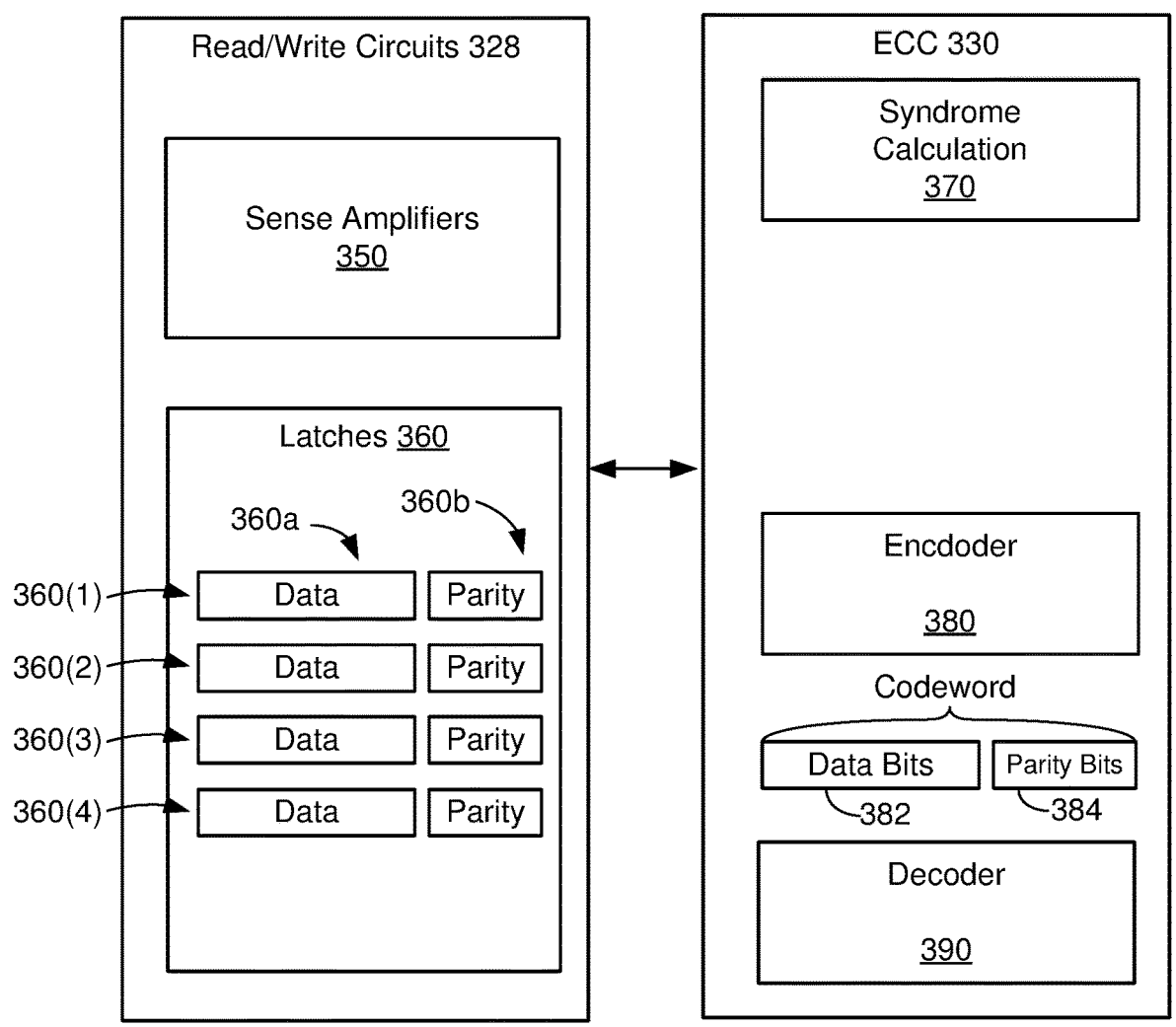
FIG. 3B is a block diagram of one embodiment of a read/write circuits and ECC of an integrated memory assembly.

FIG. 3B is a block diagram of one embodiment of the read/write circuits 328 and ECC engine 330 of the control die 304. The read/write circuits 328 have sense amplifiers 350 and latches 360. The latches 360 may include data latches 360a and parity latches 360b. In one embodiment, the data latches 360a store data bits of the codeword and the parity latches store parity bits of the codeword. It is not required that there be specific latches for data bits and for parity bits. FIG. 3B depicts four sets of data latches 360(1), 360(2), 360(3), 360(4). Each set may be used to store a codeword for a different page. In an embodiment in which four bits are stored per memory cell, four pages are stored in a set of memory cells. The four pages may be referred to as a lower page (LP), lower-middle page (LMP), upper-middle page (UMP), and an upper page (UP). In another embodiment, the sense amplifiers 350 are on the memory die 302, but the latches 360 remain on the control die 304.

The on-die ECC engine 330 is able to encode data bits received from the memory controller 102. In one embodiment, the on-die ECC engine 330 forms codewords that each contain data bits and parity bits. In one embodiment, the memory controller 102 provides the codewords to the control die 304. The control circuitry 310 stores the codewords into non-volatile memory cells in the memory structure 326. Upon a request from the memory controller 102 to read data, the control circuitry 310 reads codewords from the memory structure 326. The on-die ECC engine 330 is also able to decode and error correct the codewords read from the memory structure 326. In some embodiments, the on-die ECC engine 330 calculates parity bits for each unit of data (e.g., page) that is being stored. The parity bits (also referred to as an error correction code) may be stored with the unit of data (e.g., page). The combination of the unit of data and its associated parity bits are referred to as a codeword. In one embodiment, the parity bits are stored remotely from the unit of data (e.g., page).

In an embodiment, upon successfully decoding a codeword, the control die 304 sends only the data bits, but not the parity bits, to the memory controller 102. Therefore, bandwidth over communication lines between the memory controller 102 and the integrated memory assembly 104 is saved. Also, substantial power may be saved. For example, the interface between the control die and the memory controller 102 could be a high speed interface.

The on die ECC engine 330 includes syndrome calculation logic 370, an encoder 380, and a decoder 390. The encoder 380 is configured to encode data using an ECC scheme, such as a low-density parity check (LDPC) encoder, a Reed Solomon encoder, a Bose-Chaudhuri-Hocquenghem (BCH) encoder, a Turbo Code encoder, an encoder configured to encode one or more other ECC encoding schemes, or any combination thereof. The encoder 380 may form a codeword, which contains data bits 382 and parity bits 384. The data bits may be provided by the memory controller 102.

In one embodiment, the data bits 382 are stored in the data latches 360a, and the parity bits 384 are stored in the parity latches 360b. Based on the bits in the latches 360, the sense amplifiers 350 may control bit line voltages in the memory structure 326 when the non-volatile memory cells are being programmed. In this manner, the codewords may be programmed into non-volatile memory cells in the memory structure 326. It will be appreciated that other voltages may also be applied to the memory structure 326, such applying a program voltage to memory cells that are selected for programming.

The decoder 390 is configured to decode the codewords that were stored in the memory die 302. In one embodiment, sense amplifiers 350 sense bit lines in the memory structure 326 in order to read a codeword. The sense amplifiers 350 may store the read codeword into latches 360. The decoder 390 is able to detect and correct errors in the codeword. In one embodiment, the decoder 390 is a relatively low power decoder, as compared to a decoder on the memory controller 102. In one embodiment, the decoder on the memory controller 102 is able to correct more bit errors in the codeword than can typically be corrected by decoder 390. Thus, decoder 390 may provide a power versus error correction capability tradeoff. For example, decoder 390 may be very efficient with respect to power consumption, but at the expense of possibly not being able to correct a high number of errors in a codeword.

In one embodiment, the decoder 390 implements a bit flipping decoder. In one embodiment, the decoder 390 implements a message passing soft decoding mode. The decoder 390 may implement both a bit flipping decoder and a message passing soft decoding mode decoder. For example, the control die 304 may first attempt to decode a codeword with the bit flipping decoder. If that fails, then the control die 304 may attempt to decode using the message passing soft decoder.

In some embodiments, the decoder 390 is based on a sparse bipartite graph having bit (or variable) nodes and check nodes. The decoder 390 may pass messages between the bit nodes and the check nodes. Passing a message between a bit node and a check node is accomplished by performing a message passing computation, in some embodiments. The message passing computation may be based on the belief propagation algorithm.

The syndrome calculation logic 370 is able to determine a syndrome weight for codewords. The syndrome weight refers to the number of parity check equations that are unsatisfied. Parity check equations are discussed in more detail in connection with FIGS. 3D and 3E. The initial syndrome weight of a codeword may correlate with the bit error rate (BER) of that codeword. Thus, the control die 304 may estimate a BER for a codeword based on the initial syndrome weight. In one embodiment, the syndrome logic is implemented in hardware. The syndrome weight can be determined without fully decoding a codeword. Hence, the initial syndrome weight can be calculated in less time and with less power than for decoding a codeword. In some embodiments, the control die 304 makes management decisions based on the estimated BER. For example, the control die 304 may determine what technique should be used to decode a codeword, what read reference voltages should be used to read memory cells, etc. based on the estimated BER.

Figure 3C:
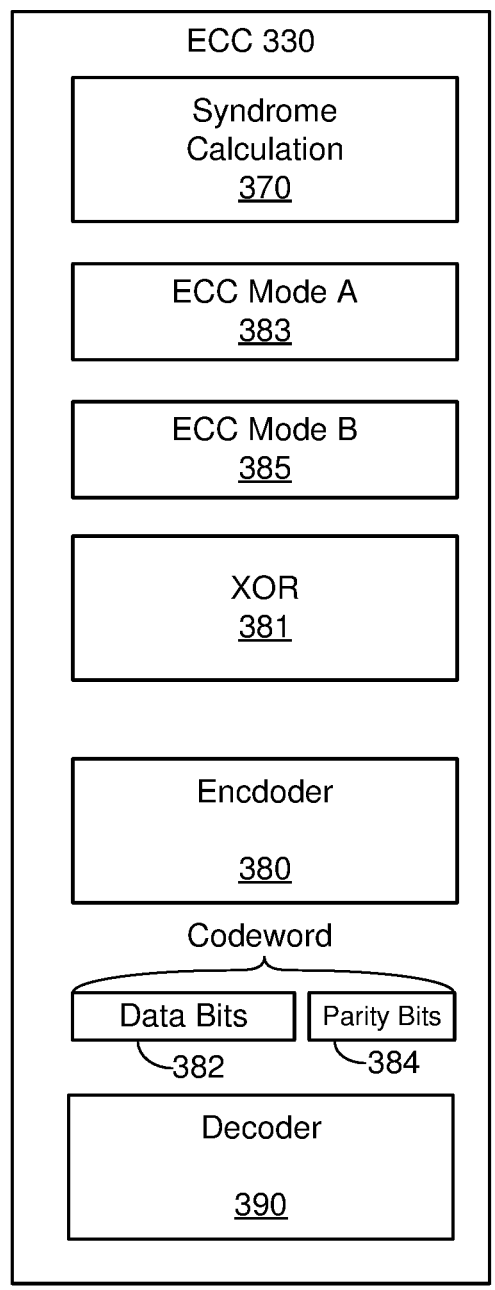
FIG. 3C is a block diagram of one embodiment of an ECC engine of an integrated memory assembly.

One embodiment of a control die 304 has additional ECC functionality beyond that depicted in FIG. 3B. In some embodiments, some of the ECC functionality that is depicted on the memory controller in FIG. 2 is located on a control die 304. FIG. 3C is a block diagram of one embodiment of an ECC engine 330 on a control die 304 having enhanced ECC capability. The ECC engine 330 has XOR engine 381, ECC Mode A 383, and ECC Mode B 385. In other embodiments, the ECC engine 330 has a subset of XOR engine 381, ECC Mode A 383, and ECC Mode B 385. In one embodiment, the ECC engine 330 has XOR but not ECC Mode A 383 or ECC Mode B 385.

The XOR engine 381 may be used to form redundancy information that is based on information from each codeword in a set of codewords. In some embodiments, the set of codewords and the redundancy information are referred to as an XOR stripe. The set of codewords may be part of an XOR stripe. In one embodiment, the set of codewords (e.g., XOR stripe) is stored across different memory dies 302. For example, each codeword in the set may be stored on a different memory die 302. The redundancy information for the set may be stored in one of the memory dies. In one embodiment, the set of codewords and redundancy information is all stored on the same memory die 302. In either option, the redundancy information may be used to recover the data bits for each of the codewords in the set. Thus, the XOR engine 381 may be used to recover data bits when decoding the codewords using an ECC decoder fails. It is not required to attempt to decode using every ECC decoder in the memory system 100 prior to using the XOR engine 381.

In one embodiment, the XOR engine 381 is able to recover the data bits for a codeword in the XOR stripe. This recovery may be used, for example, in the event that decoding using the parity bits of a codeword is unable to decode that codeword. In some embodiments, the XOR engine 381 is able to recover the data bits for two codewords in the XOR stripe in the event that two of the codewords in the set are undecodable using an ECC decoder.

The ECC engine 330 has ECC mode A 383 and ECC mode B 385. These two modes could correspond to ECC mode A 226a/256a and ECC mode B 226b/256b in the memory controller 102. However, ECC mode A 383 and ECC mode B 385 are not required to correspond to ECC mode A 226a/256a and ECC mode B 226b/256b in the memory controller 102. ECC mode A 383 and ECC mode B 385 may differ in their resolution. In general, a higher resolution decoder is able to correct a higher number of bit errors. In one embodiment, the resolution refers to the number of bits in messages that are passed in an iterative message passing decoder. For example, the messages in ECC mode B 385 may have 6 bits, whereas the messages in ECC mode A 383 may have 3 bits. In some embodiments, using fewer bits in the messages (corresponding to a lower resolution) results in faster decoding. In one embodiment, ECC mode A 383 is used in the event that decoder 390 is unable to decode a codeword. In some embodiments, decoder 390 includes a bit flipping decoder. ECC mode B 385 may be used in the event ECC mode A 383 is unable to decode the codeword.

In some embodiments, the integrated memory assembly 104 has multiple memory dies 302 and multiple control dies 304. In one embodiment, all of the control dies 304 in the integrated memory assembly 104 have the more limited ECC functionality depicted in FIG. 3B. In one embodiment, one control die 304 in the integrated memory assembly 104 has enhanced ECC functionality (including one or more of XOR 381, ECC Mode A 383, and/or ECC Mode B 385), whereas the other control dies 304 in the integrated memory assembly 104 have the more limited ECC functionality depicted in FIG. 3B.

Figures 3D, 3E:
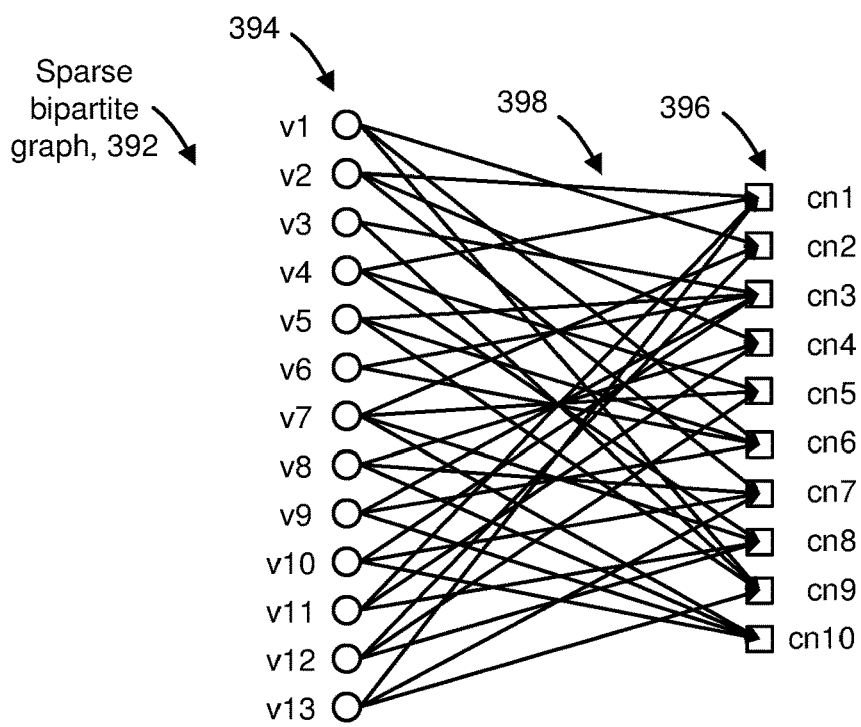
FIG. 3D depicts an example of a sparse parity check matrix H.
FIG. 3E depicts a sparse bipartite graph which corresponds to the sparse parity check matrix of FIG. 3D.

As noted above, in some embodiments, the on-die ECC engine 330 uses a sparse parity check matrix. FIG. 3D depicts an example of a sparse parity check matrix H (which may also be represented as a sparse bipartite graph). The matrix includes M rows and K+M columns, which are in correspondence with K information bits and M parity bits in each codeword of length N=K+M. Further, the parity bits are defined such that M parity check equations are satisfied, where each row of the matrix represents a parity check equation.

FIG. 3E depicts a sparse bipartite graph 392 which corresponds to the sparse parity check matrix of FIG. 3D. Specifically, the code can be defined by a sparse bipartite graph G=(V,C,E) with a set V of N bit nodes 394 (N=13 in this example), a set C of M check nodes 396 (M=10 in this example) and a set E (E=38 in this example) of edges 398 connecting bit nodes 394 to check nodes 396. The bit nodes correspond to the codeword bits and the check nodes correspond to parity-check constraints on the bits. A bit node 394 is connected by edges 398 to the check nodes 396 it participates in.

During decoding, one embodiment of the decoder 390 attempts to satisfy the parity checks. In this example, there are ten parity checks, as indicated by the check nodes cn1 through cn10. The first parity check at cn1 determines if $v2 \oplus v4 \oplus v11 \oplus v13=0$, where "$\oplus$" denotes the exclusive-or (XOR) logical operation. This check is satisfied if there is an even number of "1" in bits corresponding to variable nodes v2, v4, v11 and v13. Variable nodes may also be referred to as bit nodes. This check is denoted by the fact that edges from variable nodes v2, v4, v11 and v13 are connected to check node cn1 in the bi-partite graph. The second parity check at cn2 determines if $v1 \oplus v7 \oplus v12=0$, the third parity check at cn3 determines if $v3 \oplus v5 \oplus v6 \oplus v9 \oplus v10=0$, the fourth parity check at cn4 determines if $v2 \oplus v8 \oplus v11=0$, the fifth parity check at cn5 determines if $v4 \oplus v7 \oplus v12=0$, the sixth parity check at cn6 determines if $v1 \oplus v5 \oplus v6 \oplus v9=0$, the seventh parity check at cn7 determines if $v2 \oplus v8 \oplus v10 \oplus v13=0$, the eighth parity check at cn8 determines if $v4 \oplus v7 \oplus v11 \oplus v12=0$, the ninth parity check at cn9 determines if $v1 \oplus v3 \oplus v5 \oplus v13=0$ and the tenth parity check at cn10 determines if $v7 \oplus v8 \oplus v9 \oplus v10=0$.

In one embodiment, the decoder 390 uses an iterative probabilistic decoding process involving iterative message passing decoding algorithms. These algorithms operate by exchanging messages between bit nodes and check nodes over the edges of the underlying bipartite graph representing the code.

The decoder 390 may be provided with initial estimates of the codeword bits (based on the content that is read from the memory structure 326). These initial estimates may be refined and improved by imposing the parity-check constraints that the bits should satisfy as a valid codeword. This may be done by exchanging information between the bit nodes representing the codeword bits and the check nodes representing parity-check constraints on the codeword bits, using the messages that are passed along the graph edges.

Figure 4:
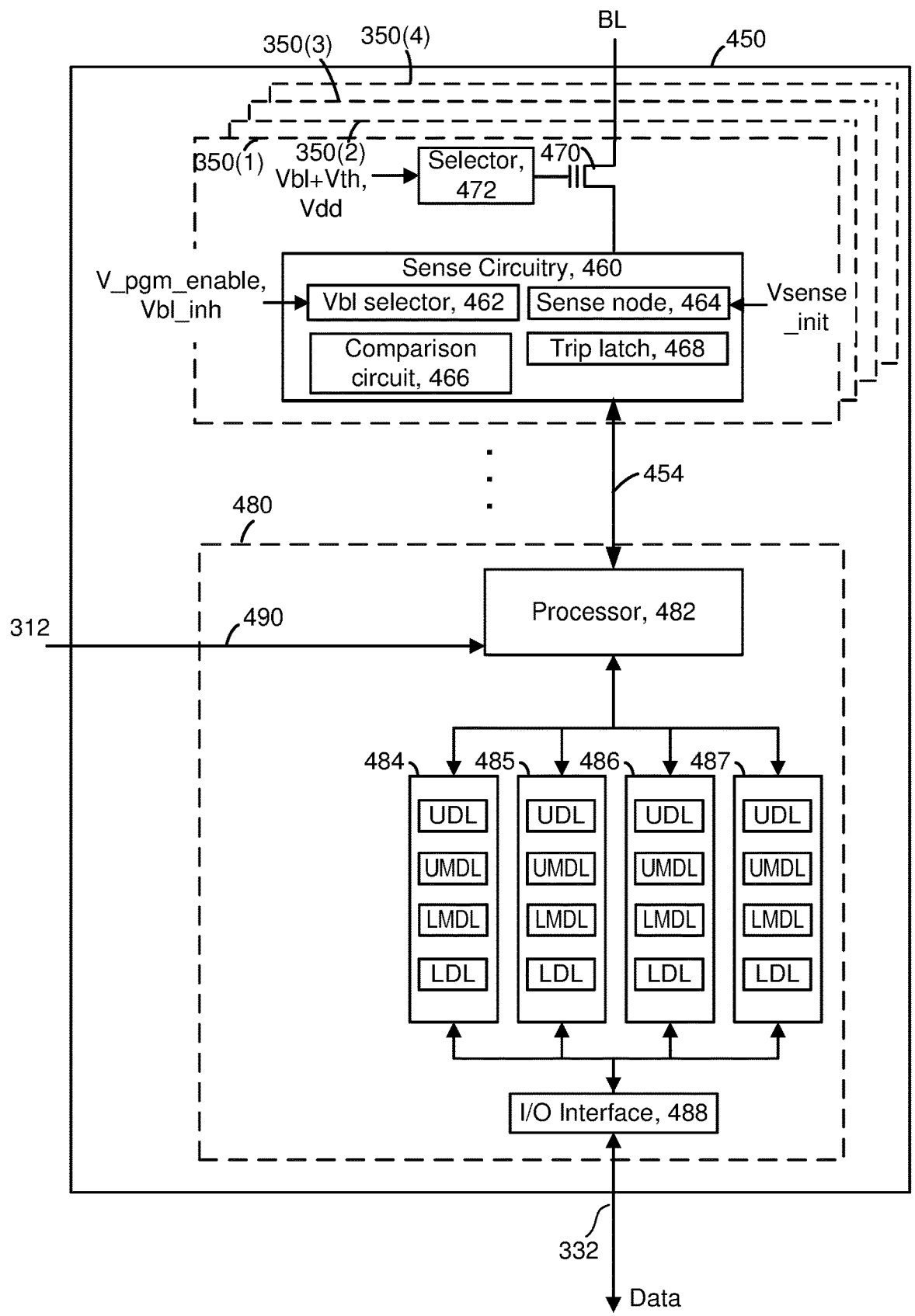
FIG. 4 is a block diagram depicting one embodiment of a sense block.

FIG. 4 is a block diagram depicting one embodiment of a sense block 450. The sense block is part of the read/write circuits 328. An individual sense block 450 is partitioned into one or more core portions, referred to as sense circuits or sense amplifiers 350(1)-350(4), and a common portion, referred to as a managing circuit 480. In one embodiment, there will be a separate sense circuit for each bit line/NAND string and one common managing circuit 480 for a set of multiple, e.g., four or eight, sense circuits. Each of the sense circuits in a group communicates with the associated managing circuit via data bus 454. Thus, there are one or more managing circuits which communicate with the sense circuits of a set of storage elements (memory cells).

The sense amplifier 350(1), as an example, comprises sense circuitry 460 that performs sensing by determining whether a conduction current in a connected bit line is above or below a predetermined threshold level. The sensing can occur in a read or verify operation. The sense circuit also supplies a bit line voltage during the application of a program voltage in a program operation.

The sense circuitry 460 may include a Vbl selector 462, a sense node 464, a comparison circuit 466 and a trip latch 468. During the application of a program voltage, the Vbl selector 462 can pass a program enable voltage (e.g., V_pgm_enable) or a program-inhibit voltage (e.g., Vbl_inh) to a bit line connected to a memory cell. Herein, a "program enable voltage" is defined as a voltage applied to a memory cell that enables programming of the memory cell while a program voltage (e.g., Vpgm) is also applied to the memory cell. In certain embodiments, a program enable voltage is applied to a bit line coupled to the memory cell while a program voltage is applied to a control gate of the memory cell. Herein, a "program inhibit voltage" is defined as a voltage applied to a bit line coupled to a memory cell to inhibit programming of the memory cell while a program voltage (e.g., Vpgm) is also applied to the memory cell (e.g., applied to the control gate of the memory cell). Note that boosting voltages (e.g., Vpass) may be applied to unselected word lines along with the program inhibit voltage applied to the bit line.

Program inhibit voltages are applied to bit lines coupled to memory cells that are not to be programmed and/or bit lines having memory cells that have reached their respective target threshold voltage through execution of a programming process. These may be referred to as "unselected bit lines." Program inhibit voltages are not applied to bit lines ("selected bit lines") having a memory cell to be programmed. When a program inhibit voltage is applied to an unselected bit line, the bit line is cut off from the NAND channel, in one embodiment. Hence, the program inhibit voltage is not passed to the NAND channel, in one embodiment. Boosting voltages are applied to unselected word lines to raise the potential of the NAND channel, which inhibits programming of a memory cell that receives the program voltage at its control gate.

A transistor 470 (e.g., an nMOS) can be configured as a pass gate to pass Vbl from the Vbl selector 462, by setting the control gate voltage of the transistor sufficiently high, e.g., higher than the Vbl passed from the Vbl selector. For example, a selector 472 may pass a power supply voltage Vdd, e.g., 3-4 V to the control gate of the transistor 470.

The sense amplifier 350(1) is configured to control the timing of when the voltages are applied to the bit line. During sensing operations such as read and verify operations, the bit line voltage is set by the transistor 470 based on the voltage passed by the selector 472. The bit line voltage is roughly equal to the control gate voltage of the transistor minus its Vt (e.g., 3 V). For example, if Vb1+Vt is passed by the selector 472, the bit line voltage will be Vb1. This assumes the source line is at 0 V. The transistor 470 clamps the bit line voltage according to the control gate voltage and acts as a source-follower rather than a pass gate. The Vbl selector 462 may pass a relatively high voltage such as Vdd which is higher than the control gate voltage on the transistor 470 to provide the source-follower mode. During sensing, the transistor 470 thus charges up the bit line.

In one approach, the selector 472 of each sense amplifier can be controlled separately from the selectors of other sense amplifiers, to pass Vbl or Vdd. The Vbl selector 462 of each sense amplifier can also be controlled separately from the Vbl selectors of other sense amplifiers.

During sensing, the sense node 464 is charged up to an initial voltage such as Vsense_init=3 V. The sense node is then connected to the bit line via the transistor 470, and an amount of decay of the sense node is used to determine whether a memory cell is in a conductive or non-conductive state. In one embodiment, a current that flows in the bot line discharges the sense node (e.g., sense capacitor). The length of time that the sense node is allowed to decay may be referred to herein as an "integration time." The comparison circuit 466 is used to compare the sense node voltage to a trip voltage at a sense time. If the sense node voltage decays below the trip voltage Vtrip, the memory cell is in a conductive state and its Vt is at or below the voltage of the verification signal. If the sense node voltage does not decay below Vtrip, the memory cell is in a non-conductive state and its Vt is above the voltage of the verification signal. The sense amplifier 350(1) includes a trip latch 468 that is set by the comparison circuit 466 based on whether the memory cell is in a conductive or non-conductive state. The data in the trip latch can be a bit which is read out by the processor 482.

The managing circuit 480 comprises a processor 482, four example sets of data latches 484, 485, 486, 487 and an I/O Interface 488 coupled between the sets of data latches and data bus 332 (data bus may connect to the memory controller 102). One set of data latches, e.g., comprising individual latches LDL, LMDL, UMDL, and UDL, can be provided for each sense amplifier. In some cases, fewer or additional data latches may be used. LDL stores a bit for a lower page of data, LMDL stores a bit for a lower-middle page of data, UMDL stores a bit for an upper-middle page of data, and UDL stores a bit for an upper page of data. This is in a sixteen level or four bits per memory cell memory device. In one embodiment, there are eight levels or three bits per memory cell.

The processor 482 performs computations, such as to determine the data stored in the sensed memory cell and store the determined data in the set of data latches. Each set of data latches 484-487 is used to store data bits determined by processor 482 during a read operation, and to store data bits imported from the data bus 332 during a program operation which represent write data meant to be programmed into the memory. I/O interface 488 provides an interface between data latches 484-487 and the data bus 332.

The processor 482 may also be used to determine what voltage to apply to the bit line, based on the state of the latches.

During reading, the operation of the system is under the control of state machine 312 that controls the supply of different control gate voltages to the addressed memory cell. As it steps through the various predefined control gate voltages corresponding to the various memory states supported by the memory, the sense circuit may trip at one of these voltages and a corresponding output will be provided from sense circuit to processor 482 via the data bus 454. At that point, processor 482 determines the resultant memory state by consideration of the tripping event(s) of the sense circuit and the information about the applied control gate voltage from the state machine via input lines 490. It then computes a binary encoding for the memory state and stores the resultant data bits into data latches 484-487.

Some implementations can include multiple processors 482. In one embodiment, each processor 482 will include an output line (not depicted) such that each of the output lines is wired-OR'd together. In some embodiments, the output lines are inverted prior to being connected to the wired-OR line. This configuration enables a quick determination during a program verify test of when the programming process has completed because the state machine receiving the wired-OR can determine when all bits being programmed have reached the desired level. For example, when each bit has reached its desired level, a logic zero for that bit will be sent to the wired-OR line (or a data one is inverted). When all bits output a data 0 (or a data one inverted), then the state machine knows to terminate the programming process. Because each processor communicates with four sense amplifiers, the state machine needs to read the wired-OR line four times, or logic is added to processor 482 to accumulate the results of the associated bit lines such that the state machine need only read the wired-OR line one time. Similarly, by choosing the logic levels correctly, the global state machine can detect when the first bit changes its state and change the algorithms accordingly.

During program or verify operations for memory cells, the data to be programmed (write data) is stored in the set of data latches 484-487 from the data bus 332, in the LDL, LMDL, UMDL, and UDL latches, in a four-bit per memory cell implementation.

The program operation, under the control of the state machine, applies a set of programming voltage pulses to the control gates of the addressed memory cells. Each voltage pulse may be stepped up in magnitude from a previous program pulse by a step size in a processed referred to as incremental step pulse programming. Each program voltage is followed by a verify operation to determine if the memory cells has been programmed to the desired memory state. In some cases, processor 482 monitors the read back memory state relative to the desired memory state. When the two are in agreement, the processor 482 sets the bit line in a program inhibit mode such as by updating its latches. This inhibits the memory cell coupled to the bit line from further programming even if additional program pulses are applied to its control gate.

Each set of data latches 484-487 may be implemented as a stack of data latches for each sense amplifier. In one embodiment, there are three data latches per sense amplifier 350. In some implementations, the data latches are implemented as a shift register so that the parallel data stored therein is converted to serial data for data bus 332, and vice versa. All the data latches corresponding to the read/write block of memory cells can be linked together to form a block shift register so that a block of data can be input or output by serial transfer. In particular, the bank of read/write circuits is adapted so that each of its set of data latches will shift data in to or out of the data bus in sequence as if they are part of a shift register for the entire read/write block.

The data latches identify when an associated memory cell has reached certain mileposts in a program operation. For example, latches may identify that a memory cell's Vt is below a particular verify voltage. The data latches indicate whether a memory cell currently stores one or more bits from a page of data. For example, the LDL latches can be used to store a lower page of data. An LDL latch is flipped (e.g., from 0 to 1) when a lower page bit is stored in an associated memory cell. An LMDL, UMDL or UDL latch is flipped when a lower-middle, upper-middle or upper page bit, respectively, is stored in an associated memory cell. This occurs when an associated memory cell completes programming.

Figure 5A:
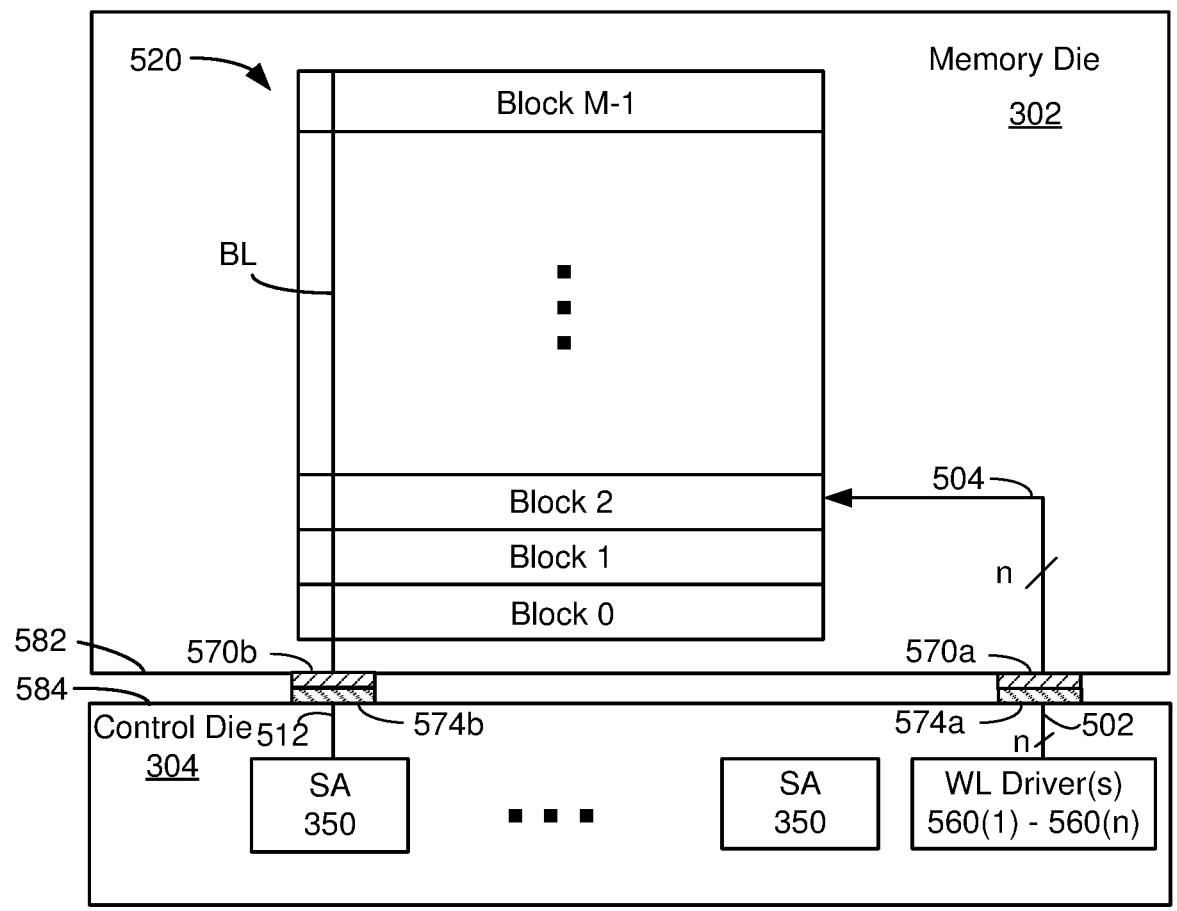
FIG. 5A is a block diagram of one embodiment of an integrated memory assembly.

FIG. 5A is a block diagram of one embodiment of an integrated memory assembly 104. FIG. 5A depicts further details of one embodiment of the integrated memory assembly 104 of FIG. 1A or 3A. Memory die 302 contains a plane 520 of memory cells. The memory die 302 may have additional planes. The plane is divided into M blocks. In one example, each plane has about 1040 blocks. However, different numbers of blocks can also be used. In one embodiment, a block comprising memory cells is a unit of erase.

That is, all memory cells of a block are erased together. In other embodiments, memory cells can be grouped into blocks for other reasons, such as to organize the memory structure 326 to enable the signaling and selection circuits. One representative bit line (BL) is depicted for each plane. There may be thousand or tens of thousands of such bit lines per each plane. Each block may be divided into a number of word lines, as will be described more fully below. In one embodiment, a block represents a groups of connected memory cells as the memory cells of a block share a common set of unbroken word lines and unbroken bit lines. In the structure of FIG. 5A, Block 0 and Block M−1 of plane 520 are at the edges of the memory structure (or otherwise referred to as being located in an edge region/section of the memory structure).

The control die 304 includes a number of sense amplifiers (SA) 350, in one embodiment. Each sense amplifier 350 is connected to one bit line, in this example. The sense amplifier contains a bit line driver, in one embodiment. Thus, the sense amplifier may provide a voltage to the bit line to which it is connected. The sense amplifier is configured to sense a condition of the bit line. In one embodiment, the sense amplifier is configured to sense a current that flows in the bit line. In one embodiment, the sense amplifier is configured to sense a voltage on the bit line.

The control die 304 includes a number of word line drivers 560(1)-560(n). The word line drivers 560 are configured to provide voltages to word lines. In this example, there are "n" word lines per block of memory cells. In one embodiment, one of the blocks in the plane 520 is selected at a time for a memory array operation. If the memory operation is a program or read, one word line within the selected block is selected for the memory operation, in one embodiment. If the memory operation is an erase, all of the word lines within the selected block are selected for the erase, in one embodiment. The word line drivers 560 provide voltages to the word lines in a first selected block (e.g., Block 2) in memory die 302. The control die 304 may also include charge pumps, voltage generators, and the like, which may be used to provide voltages for the word line drivers 560 and/or the bit line drivers.

The memory die 302 has a number of bond pads 570a, 570b on a first major surface 582 of memory die 302. There may be "n" bond pads 570a, to receive voltages from a corresponding "n" word line drivers 560(1)-560(n). There may be one bond pad 570b for each bit line associated with plane 520. The reference numeral 570 will be used to refer in general to bond pads on major surface 582.

In some embodiments, each data bit and each parity bit of a codeword are transferred through a different bond pad pair 570b, 574b. The bits of the codeword may be transferred in parallel over the bond pad pairs 570b, 574b. This provides for a very efficient data transfer relative to, for example, transferring data between the memory controller 102 and the integrated memory assembly 104. For example, the data bus between the memory controller 102 and the integrated memory assembly 104 may, for example, provide for eight, sixteen, or perhaps 32 bits to be transferred in parallel. However, the data bus between the memory controller 102 and the integrated memory assembly 104 is not limited to these examples.

The control die 304 has a number of bond pads 574a, 574b on a first major surface 584 of control die 304. There may be "n" bond pads 574a, to deliver voltages to a corresponding "n" word line drivers 560(1)-560(n) to memory die 302a. There may be one bond pad 574b for each bit line associated with plane 520. The reference numeral 574 will be used to refer in general to bond pads on major surface 582. Note that there may be bond pad pairs 570a/574a and bond pad pairs 570b/574b. In some embodiments, bond pads 570 and/or 574 are flip-chip bond pads.

The pattern of bond pads 570 matches the pattern of bond pads 574, in one embodiment. Bond pads 570 are bonded (e.g., flip chip bonded) to bond pads 574, in one embodiment. Thus, the bond pads 570, 574 electrically and physically couple the memory die 302 to the control die 304. Also, the bond pads 570, 574 permit internal signal transfer between the memory die 302 and the control die 304. Thus, the memory die 302 and the control die 304 are bonded together. Although FIG. 5A depicts one control die 304 bonded to one memory die 302, in one embodiment, one control die 304 is bonded to two memory dies 302.

Herein, "internal signal transfer" means signal transfer between the control die 304 and the memory die 302. The internal signal transfer permits the circuitry on the control die 304 to control memory operations in the memory die 302. Therefore, the bond pads 570, 574 may be used for memory operation signal transfer. Herein, "memory operation signal transfer" refers to any signals that pertain to a memory operation in a memory die 302. A memory operation signal transfer could include, but is not limited to, providing a voltage, providing a current, receiving a voltage, receiving a current, sensing a voltage, and/or sensing a current.

The bond pads 570, 574 may be formed for example of copper, aluminum and alloys thereof. There may be a liner between the bond pads 570, 574 and the major surfaces (582, 584). The liner may be formed for example of a titanium/titanium nitride stack. The bond pads 570, 574 and liner may be applied by vapor deposition and/or plating techniques. The bond pads and liners together may have a thickness of 720 nm, though this thickness may be larger or smaller in further embodiments.

Figure 10A:
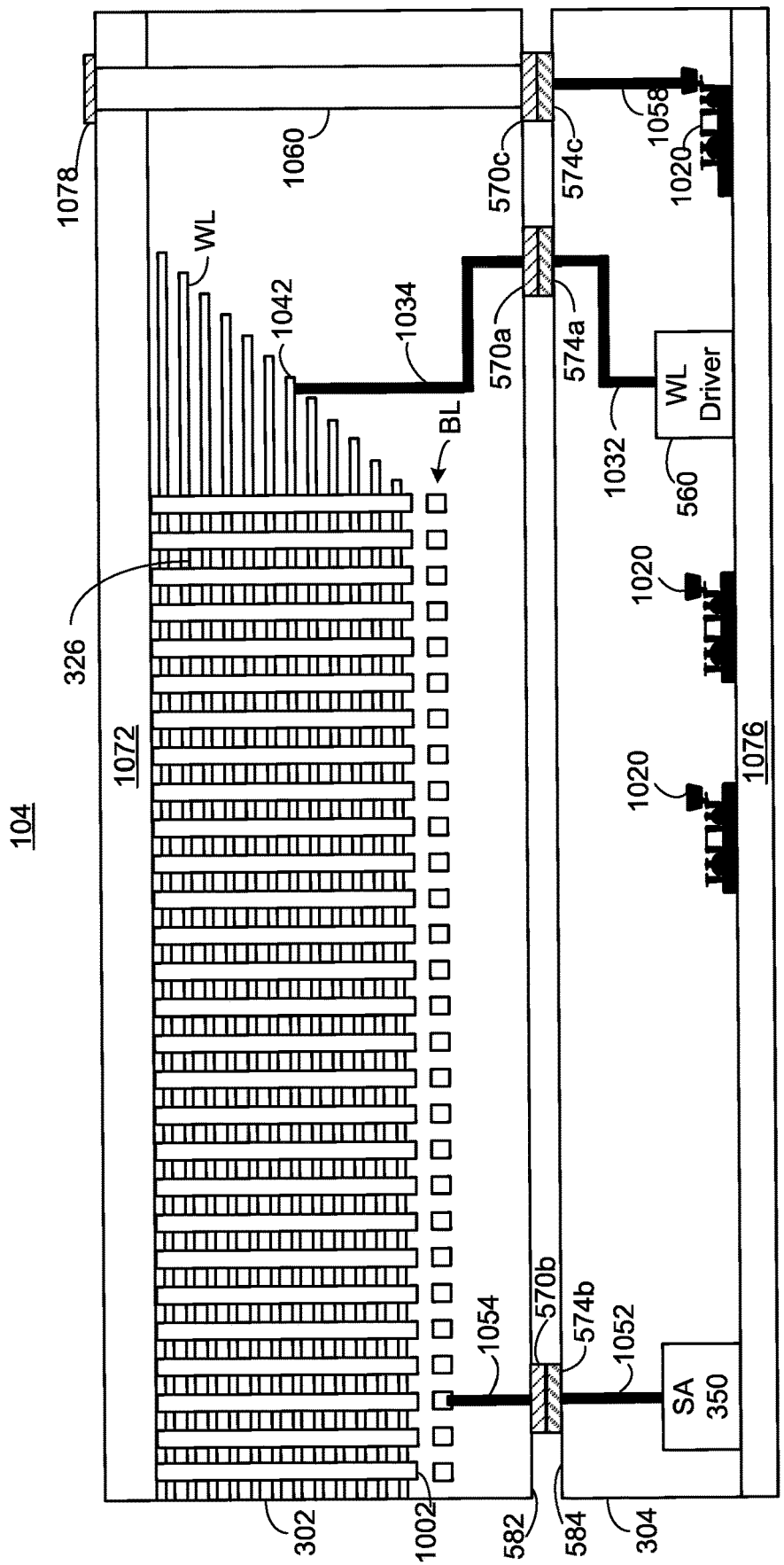
FIG. 10A is a diagram of one embodiment of an integrated memory assembly.

Metal interconnects and/or vias may be used to electrically connect various elements in the dies to the bond pads 570, 574. Several conductive pathways, which may be implemented with metal interconnects and/or vias are depicted. For example, a sense amplifier 350 may be electrically connected to bond pad 574b by pathway 512. There may be thousands of such sense amplifiers, pathways, and bond pads. Note that the BL does not necessarily make direct connection to bond pad 570b. The word line drivers 560 may be electrically connected to bond pads 574a by pathways 502. Note that pathways 502 may comprise a separate conductive pathway for each word line driver 560(1)-560(n). Likewise, there may be a separate bond pad 574a for each word line driver 560(1)-560(n). The word lines in block 2 of the memory die 302 may be electrically connected to bond pads 570a by pathways 504. In FIG. 5A, there are "n" pathways 504, for a corresponding "n" word lines in a block. There may be a separate pair of bond pads 570a, 574a for each pathway 504. FIG. 10A depicts further details of one embodiment of an integrated memory assembly 104 having metal interconnects and/or vias.

Figure 5B:
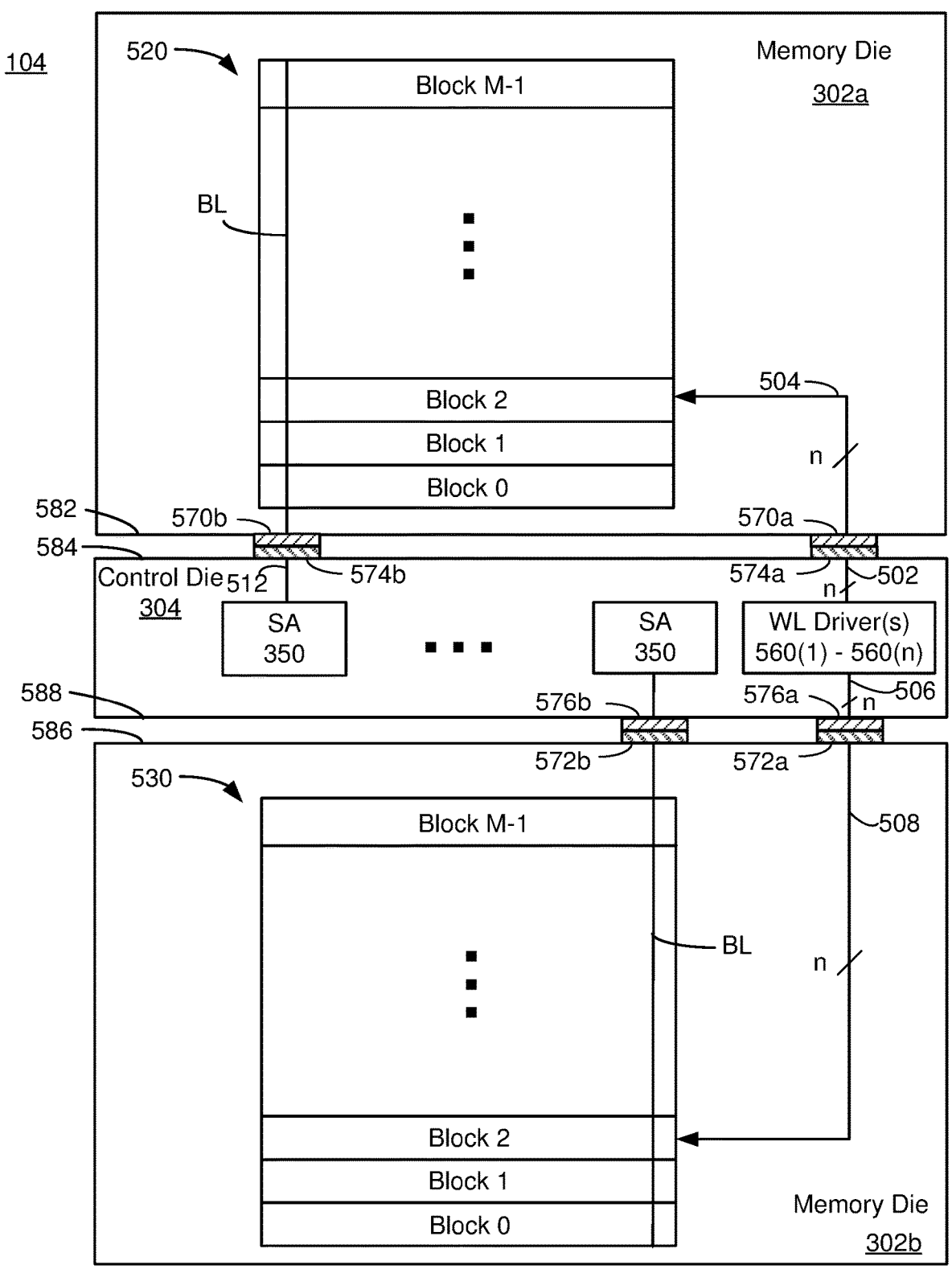
FIG. 5B is a block diagram of an embodiment of an integrated memory assembly in which a control die controls two memory dies.

FIG. 5B depicts another embodiment of an integrated memory assembly 104 in which one control die 304 may be used to control two memory die 302a, 302b. The control die 304 has a number of a number of bond pads 574(a), 574(b) on a first major surface 584, as discussed in connection with FIG. 5A. The control die 304 has a number of a number of bond pads 576(a), 576(b) on a second major surface 588. There may be "n" bond pads 576(a) to deliver voltages from a corresponding "n" word line drivers 560(1)-560(n) to memory die 302b. The word line drivers 560 may be electrically connected to bond pads 576a by pathways 506. There may be one bond pad 576b for each bit line associated with plane 530 on memory die 302b. The reference numeral 576 will be used to refer in general to bond pads on major surface 588.

The second memory die 302b has a number of bond pads 572(a), 572(b) on a first major surface 586 of second memory die 302b. There may be "n" bond pads 572(a), to receive voltages from a corresponding "n" word line drivers 560(1)-560(n). The word lines in plane 530 may be electrically connected to bond pads 572a by pathways 508. There may be one bond pad 572(b) for each bit line associated with plane 530. The reference numeral 572 will be used to refer in general to bond pads on major surface 586. Note that there may be bond pad pairs 572(a)/576(a) and bond pad pairs 572(b)/576(b). In some embodiments, bond pads 572 and/or 576 are flip-chip bond pads.

In an embodiment, the "n" word line drivers 560(1)-560(n) are shared between the two memory die 302a, 302b. For example, a single word line driver may be used to provide a voltage to a word line in memory die 302a and to a word line in memory die 302b. However, it is not required that the word line drivers 560 are shared between the memory dies 302a, 302b.

Figure 6A:
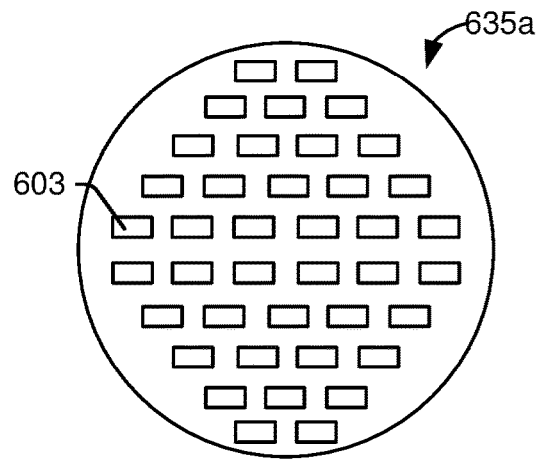
FIGS. 6A and 6B are top views of semiconductor wafers.

FIG. 6A is a top view of a semiconductor wafer 635a from which multiple control die 304 may be formed. The wafer 635a has numerous copies of integrated circuits 603. Each of the integrated circuits 603 contains the control circuitry 310 (see FIG. 3A), in one embodiment. The wafer 635a is diced into semiconductor dies, each containing one of the copies of the integrated circuits 603, in some embodiments. Therefore, numerous control semiconductor dies 304 may be formed from the wafer 635a. Also note that even before the wafer 635a is diced, as the term "control semiconductor die" is used herein, each region in which an integrated circuit 603 resides may be referred to as a control semiconductor die 304.

Figure 6B:
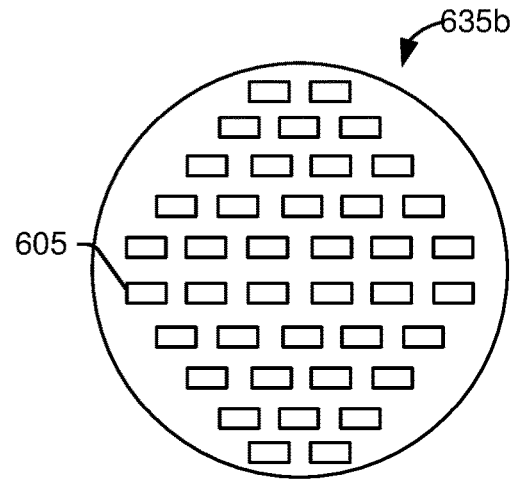

FIG. 6B is a top view of a semiconductor wafer 635b from which multiple memory die 302 may be formed. The wafer 635b has numerous copies of integrated circuits 605. Each of the integrated circuits 605 contains memory structure 326 (see FIG. 3A), in one embodiment. The wafer 635b is diced into semiconductor dies, each containing one of the copies of the integrated circuits 605, in some embodiments. Therefore, numerous memory semiconductor dies 302 may be formed from the wafer 635b. Also note that even before the wafer 635b is diced, as the term "memory semiconductor die" is used herein, each region in which an integrated circuit 605 resides may be referred to as a memory semiconductor die 302.

The semiconductor wafers 635 may start as an ingot of monocrystalline silicon grown according to either a CZ, FZ or other process. The semiconductor wafers 635 may be cut and polished on major surfaces to provide smooth surfaces. The integrated circuits 603, 605 may be formed on and/or in the major surfaces. Note that forming the integrated circuits 603, 605 on different wafers 635a, 635b facilitates use of different semiconductor fabrication processes on the different wafers 635a, 635b. For example, semiconductor fabrication processes may involve high temperature anneals. Such high temperature anneals may be needed for formation of some circuit elements, or may be useful for improving properties of circuit elements. For example, a high temperature anneal can desirably reduce the resistance of polysilicon on the memory dies 302. However, the high temperature anneal could be damaging to other circuit elements. For example, a high temperature anneal can potentially be damaging to CMOS transistors, such as the transistors that may be used on the semiconductor dies 304. In one embodiment, a high temperature anneal that is used when fabricating the integrated circuits 605 on wafer 635b is not used when fabricating the integrated circuits 603 on wafer 635a. For example, in one embodiment, a high temperature anneal that is used when fabricating the memory dies is not used when fabricating the control dies.

The dicing of the wafers 635 into semiconductor dies may occur before or after bonding. In one embodiment, the two wafers 635, 635b are bonded together. After bonding the two wafers together, dicing is performed. Therefore, numerous integrated memory assemblies 104 may be formed from the two wafers 635. In another embodiment, the two wafers 635a, 635b are diced into semiconductor dies 304, 302. Then, one of each of the semiconductor dies 304, 302 are bonded together to form an integrated memory assembly 104. Regardless of whether dicing occurs prior to or after bonding, it may be stated that the integrated memory assembly 104 contains a control semiconductor die 304, and a memory semiconductor die 302 bonded together.

Figure 7:
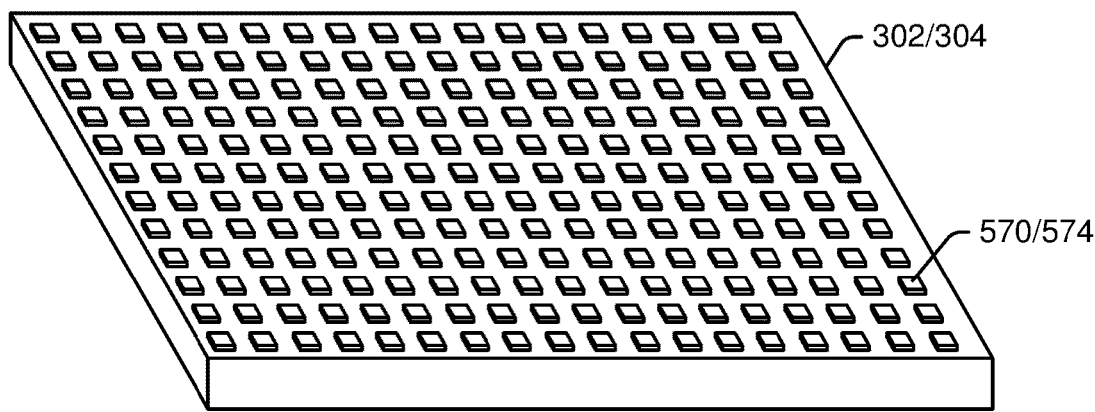
FIG. 7 depicts an example pattern of bond pads on a planar surface of a semiconductor die.

As has been discussed above, the control die 304 and the memory die 302 may be bonded together. Bond pads on each die 302, 304 may be used to bond the two dies together. Recall that FIG. 5A depicts one example of bonds 570 on the memory die 302, as well as bonds 574 on the semiconductor die 304. FIG. 7 depicts an example pattern of bond pads on a planar surface of a semiconductor die. The semiconductor die could be memory die 302 or control die 304. The bond pads could be any of bond pads 570 or 574, as appropriate for the semiconductor die. There may be many more bond pads than are depicted in FIG. 7. As one example, 100,000 or more interconnections may be required between two of the semiconductor die. In order to support such large numbers of electrical interconnections, the bond pads may be provided with a small area and pitch. In some embodiments, the bond pads are flip-chip bond pads.

The semiconductor dies 302, 304 in the integrated memory assembly 104 may be bonded to each other by initially aligning the bond pads 570, 574 on the respective dies 302, 304 with each other. Thereafter, the bond pads may be bonded together by any of a variety of bonding techniques, depending in part on bond pad size and bond pad spacing (i.e., bond pad pitch). The bond pad size and pitch may in turn be dictated by the number of electrical interconnections required between the first and second semiconductor dies 302 and 304.

In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 μm square and spaced from each other with a pitch of 5 μm to 5 μm. While this process is referred to herein as Cu-to-Cu bonding, this term may also apply even where the bond pads are formed of materials other than Cu.

When the area of bond pads is small, it may be difficult to bond the semiconductor dies together. The size of, and pitch between, bond pads may be further reduced by providing a film layer on the surfaces of the semiconductor dies including the bond pads. The film layer is provided around the bond pads. When the dies are brought together, the bond pads may bond to each other, and the film layers on the respective dies may bond to each other. Such a bonding technique may be referred to as hybrid bonding. In embodiments using hybrid bonding, the bond pads may be about 5 µm square and spaced from each other with a pitch of 1 µm to 5 µm. Bonding techniques may be used providing bond pads with even smaller sizes and pitches.

Some embodiments may include a film on surface of the dies 302, 304. Where no such film is initially provided, a space between the dies may be under filled with an epoxy or other resin or polymer. The under-fill material may be applied as a liquid which then hardens into a solid layer. This under-fill step protects the electrical connections between the dies 302, 304, and further secures the dies together. Various materials may be used as under-fill material, but in embodiments, it may be Hysol epoxy resin from Henkel Corp., having offices in California, USA.

Figure 8A:
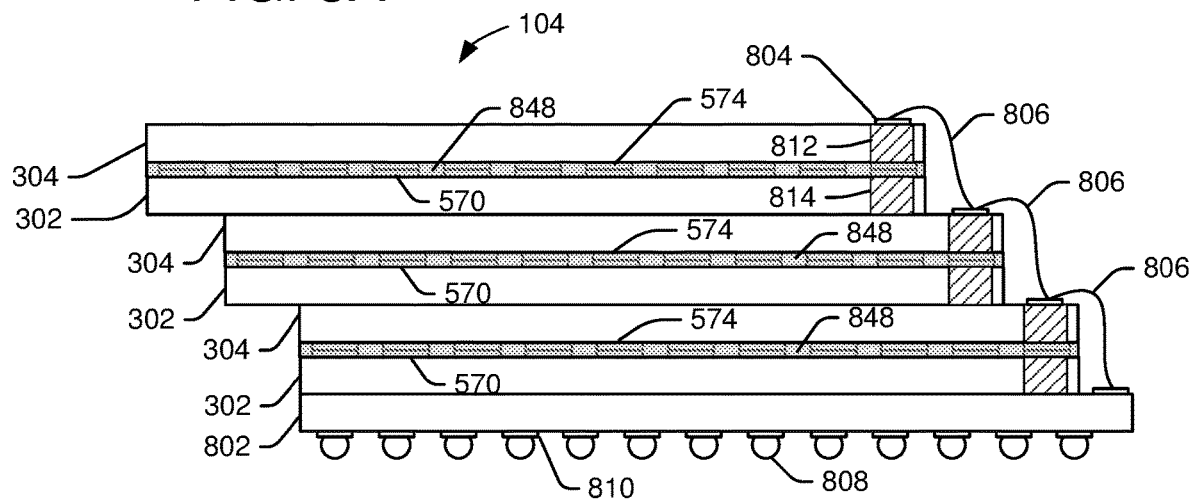
FIG. 8A depicts a side view of an embodiment of an integrated memory assembly stacked on a substrate.

As noted herein, there may be more than one control die 304 and more than one memory die 302 in an integrated memory assembly 104. In some embodiments, the integrated memory assembly 104 includes a stack of multiple control die 304 and multiple memory die 302. FIG. 8A depicts a side view of an embodiment of an integrated memory assembly 104 stacked on a substrate 802. The integrated memory assembly 104 has three control die 304 and three memory die 302. Each control die 304 is bonded to one of the memory die 302. Some of the bond pads 570, 574, are depicted. There may be many more bond pads. A space between two dies 302, 304 that are bonded together is filled with a solid layer 848, which may be formed from epoxy or other resin or polymer. This solid layer 848 protects the electrical connections between the dies 302, 304, and further secures the dies together. Various materials may be used as solid layer 848, but in embodiments, it may be Hysol epoxy resin from Henkel Corp., having offices in California, USA.

The integrated memory assembly 104 may for example be stacked with a stepped offset, leaving the bond pads 804 at each level uncovered and accessible from above. Wire bonds 806 connected to the bond pads 804 connect the control die 304 to the substrate 802. A number of such wire bonds may be formed across the width of each control die 304 (i.e., into the page of FIG. 8A).

A through silicon via (TSV) 812 may be used to route signals through a control die 304. A through silicon via (TSV) 814 may be used to route signals through a memory die 302. The TSVs 812, 814 may be formed before, during or after formation of the integrated circuits in the semiconductor dies 302, 304. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 808 may optionally be affixed to contact pads 810 on a lower surface of substrate 802. The solder balls 808 may be used to electrically and mechanically couple the integrated memory assembly 104 to a host device such as a printed circuit board. Solder balls 808 may be omitted where the integrated memory assembly 104 is to be used as an LGA package. The solder balls 808 may form a part of the interface between the integrated memory assembly 104 and the memory controller 102.

Figure 8B:
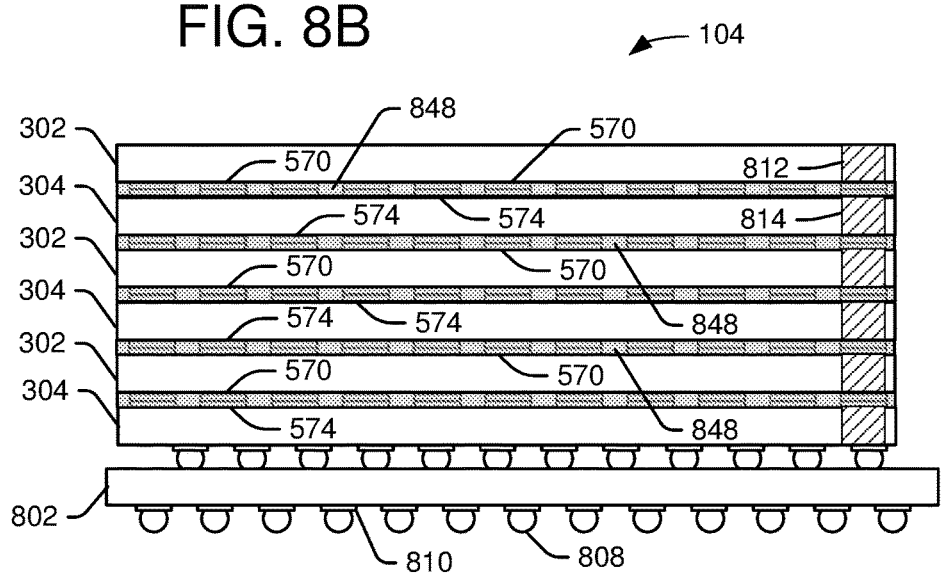
FIG. 8B depicts a side view of an embodiment of an integrated memory assembly stacked on a substrate.

FIG. 8B depicts a side view of an embodiment of an integrated memory assembly 104 stacked on a substrate 802. The integrated memory assembly 104 has three control die 304 and three memory die 302. In this example, each control die 304 is bonded to at least one memory die 302. Optionally, a control die 304 may be bonded to two memory die 302. For example, two of the control die 304 are bonded to a memory die 302 above the control die 304 and a memory die 302 below the control die 304.

Some of the bond pads 570, 574 are depicted. There may be many more bond pads. A space between two dies 302, 304 that are bonded together is filled with a solid layer 848, which may be formed from epoxy or other resin or polymer. In contrast to the example in FIG. 8A, the integrated memory assembly 104 in FIG. 8B does not have a stepped offset. A through silicon via (TSV) 812 may be used to route signals through a memory die 302. A through silicon via (TSV) 814 may be used to route signals through a control die 304.

Solder balls 808 may optionally be affixed to contact pads 810 on a lower surface of substrate 802. The solder balls 808 may be used to electrically and mechanically couple the integrated memory assembly 104 to a host device such as a printed circuit board. Solder balls 808 may be omitted where the integrated memory assembly 104 is to be used as an LGA package.

Figure 9:
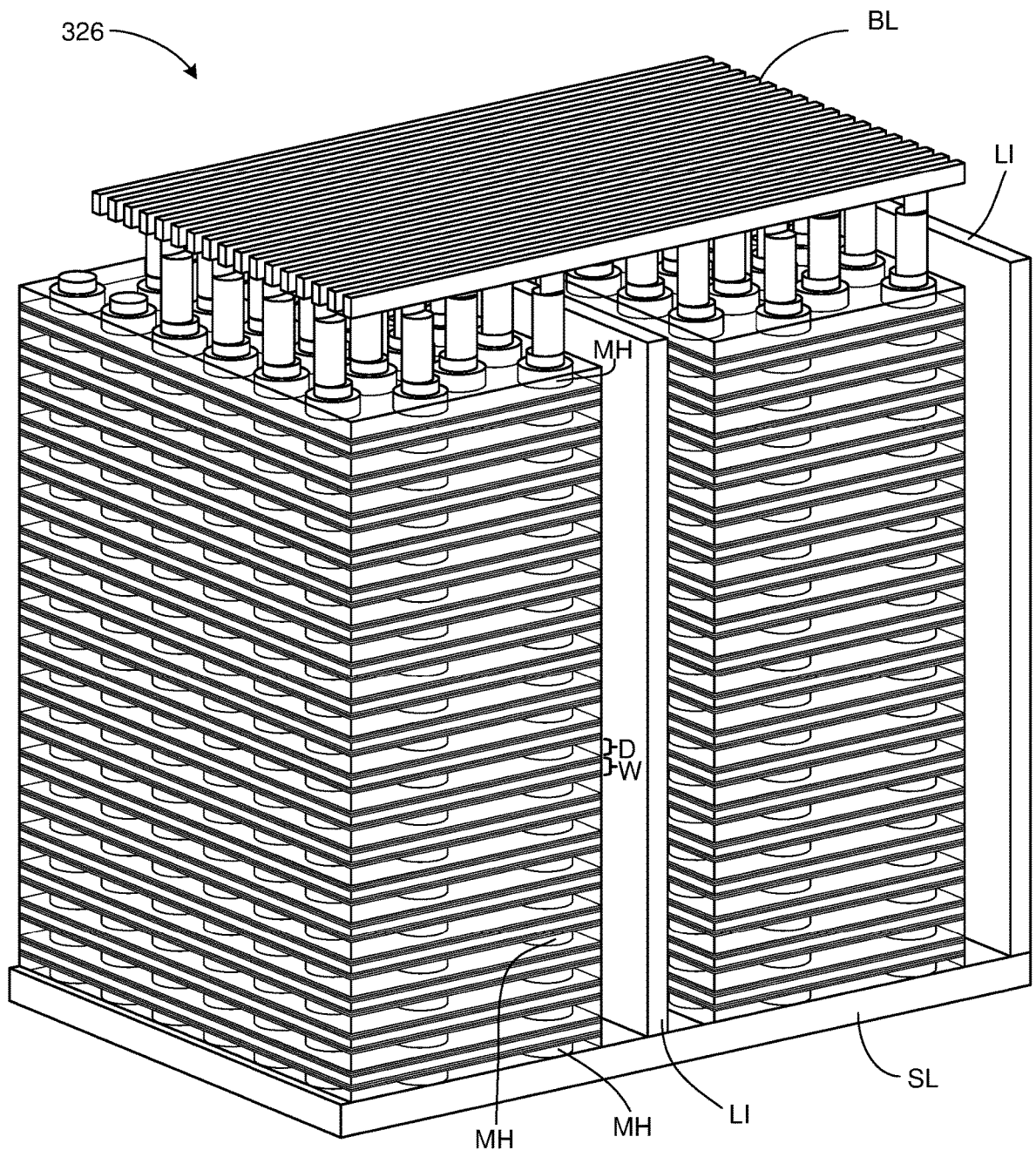
FIG. 9 is a perspective view of a portion of one example embodiment of a monolithic three dimensional memory array that can comprise memory structure.

FIG. 9 is a perspective view of a portion of one example embodiment of a monolithic three dimensional memory array that can comprise memory structure 326, which includes a plurality non-volatile memory cells. For example, FIG. 9 shows a portion of one block comprising memory. The structure depicted includes a set of bit lines BL positioned above a stack of alternating dielectric layers and conductive layers with vertical columns of materials extending through the dielectric layers and conductive layers. For example purposes, one of the dielectric layers is marked as D and one of the conductive layers (also called word line layers) is marked as W. The number of alternating dielectric layers and conductive layers can vary based on specific implementation requirements. One set of embodiments includes between 108-304 alternating dielectric layers and conductive layers. One example embodiment includes 96 data word line layers, 8 select layers, 6 dummy word line layers and 110 dielectric layers. More or fewer than 108-304 layers can also be used. The alternating dielectric layers and conductive layers are divided into four "fingers" or sub-blocks by local interconnects LI, in an embodiment. FIG. 9 shows two fingers and two local interconnects LI. Below the alternating dielectric layers and word line layers is a source line layer SL. Vertical columns of materials (also known as memory holes) are formed in the stack of alternating dielectric layers and conductive layers. For example, one of the vertical columns/memory holes is marked as MH. Note that in FIG. 9, the dielectric layers are depicted as see-through so that the reader can see the memory holes positioned in the stack of alternating dielectric layers and conductive layers. In one embodiment, NAND strings are formed by filling the vertical column/memory hole with materials including a charge-trapping material to create a vertical column of memory cells. Each memory cell can store one or more bits of data.

FIG. 10A is a diagram of one embodiment of an integrated memory assembly 104. In an embodiment depicted in FIG. 10A, memory die 302 is bonded to control die 304. This bonding configuration is similar to an embodiment depicted in FIG. 5A. Note that although a gap is depicted between the pairs of adjacent dies, such a gap may be filled with an epoxy or other resin or polymer. FIG. 10A shows additional details of one embodiment of pathways 352.

The memory die includes a memory structure 326. Memory structure 326 is adjacent to substrate 1072 of memory die 302. The substrate 1072 is formed from a portion of a silicon wafer, in some embodiments. In this example, the memory structure 326 include a three-dimensional memory array. The memory structure 326 has a similar structure as the example depicted in FIG. 9. There are a number of word line layers (WL), which are separated by dielectric layers. The dielectric layers are represented by gaps between the word line layers. Thus, the word line layers and dielectric layers form a stack. There may be many more word line layers than are depicted in FIG. 10A. As with the example of FIG. 9, there are a number of columns that extend through the stack. One column 1002 is referred to in each stack with reference numeral 1002. The columns contain memory cells. For example, each column may contain a NAND string. There are a number of bit lines (BL) adjacent to the stack.

Word line driver 560 concurrently provides voltages to a word line 1042 in memory die 302. The pathway from the word line driver 560 to the word line 1042 includes conductive pathway 1032, bond pad 574a, bond pad 570a, and conductive pathway 1034. In some embodiments, conductive pathways 1032, 1034 are referred to as a pathway pair. Conductive pathways 1032, 1034 may each include one or more vias (which may extend vertically with respect to the major surfaces of the die) and one or more metal interconnects (which may extend horizontally with respect to the major surfaces of the die). Conductive pathways 1032, 1034 may include transistors or other circuit elements. In one embodiment, the transistors may be used to, in effect, open or close the pathway. Other word line drivers (not depicted in FIG. 10A) provide voltages to other word lines. Thus, there are additional bond pad 574a, 570a in addition to bond pads 574a, 570a. As is known in the art, the bond pads may be formed for example of copper, aluminum and alloys thereof.

Sense amplifier 350 is in communication with a bit line in memory die 302. The pathway from the sense amplifier 350 to the bit line includes conductive pathway 1052, bond pad 574b, bond pad 570b, and conductive pathway 1054. In some embodiments, conductive pathways 1052, 1054 are referred to as a pathway pair. Conductive pathways 1052, 1054 may include one or more vias (which may extend vertically with respect to the major surfaces of the die) and one or more metal interconnects (which may extend horizontally with respect to the major surfaces of the die). The metal interconnects may be formed of a variety of electrically conductive metals including for example copper and copper alloys as is known in the art, and the vias may be lined and/or filled with a variety of electrically conductive metals including for example tungsten, copper and copper alloys as is known in the art. Conductive pathways 1052, 1054 may include transistors or other circuit elements. In one embodiment, the transistors may be used to, in effect, open or close the pathway.

The control die 304 has a substrate 1076, which may be formed from a silicon wafer. The sense amplifiers 350, word line driver(s) 560, and other circuitry 1020 may be formed on and/or in the substrate 1076. The circuitry 1020 may include some or all of the control circuitry 310 (see FIG. 3A). In some embodiments, sense amplifiers 350, word line driver(s) 560, and/or other circuitry 1020 comprise CMOS circuits.

There is an external signal path that allows circuitry on the control die 304 to communicate with an entity external to the integrated memory assembly 104, such as memory controller 102. Therefore, circuitry 1020 on the control die 304 may communicate with, for example, memory controller 102 (see FIG. 3A). Optionally, circuitry on the control die 304 may communicate with, for example, host 120. The external pathway includes via 1058 in control die 304, bond pad 574c, bond pad 570c, through silicon via (TSV) 1060, and external pad 1078. The TSV 1060 extends through substrate 1072.

The TSV 1060, may be formed before, during or after formation of the integrated circuits in the semiconductor dies 302, 304. The TSV may be formed by etching holes through the wafers. For example, holes may be etched through substrate 1072. The holes also may be etched through material adjacent to the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Numerous modifications to an embodiment depicted in FIG. 10A are possible. One modification is for sense amplifiers 350 to be located on memory die 302.

Figure 10B:
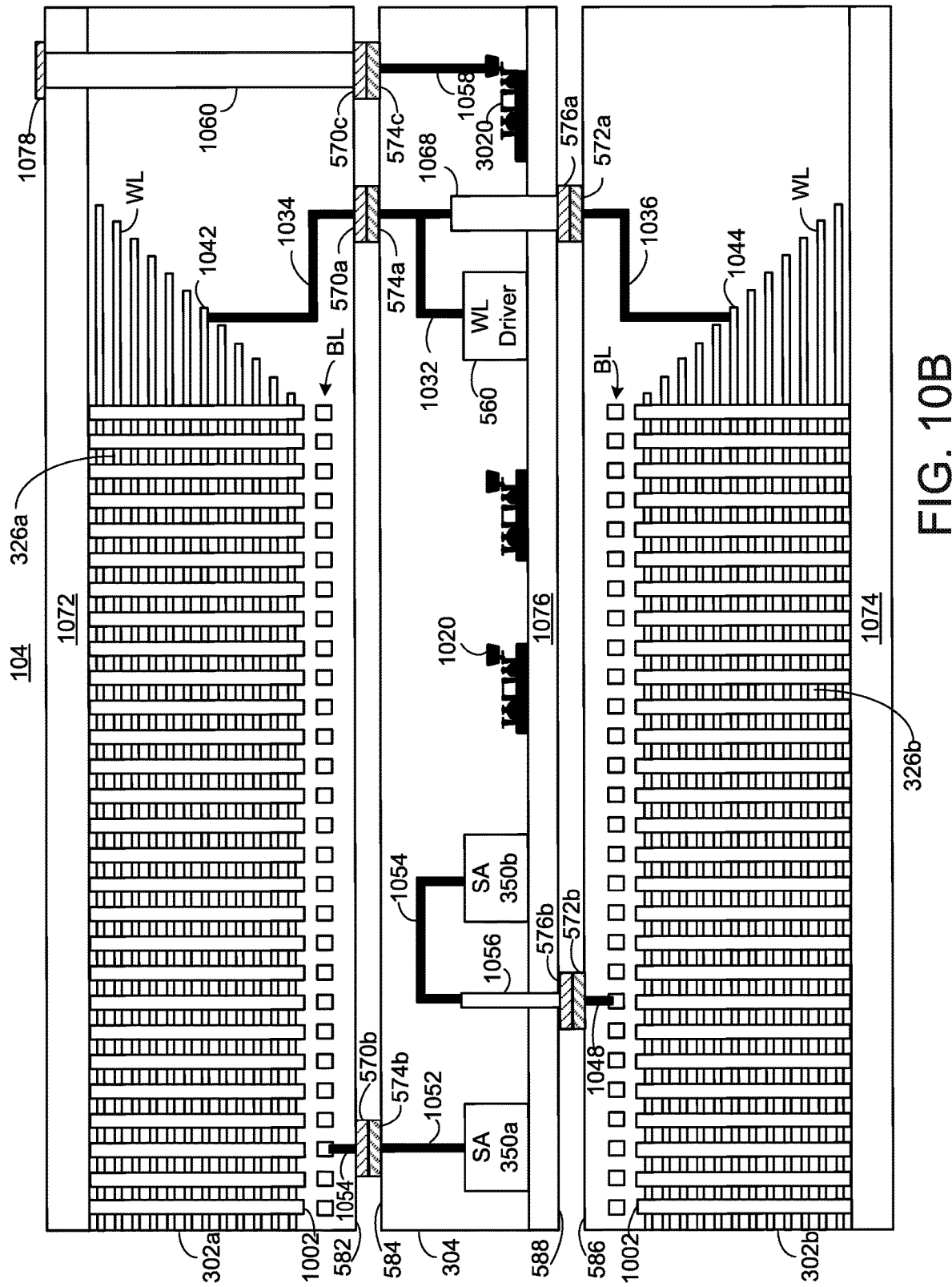
FIG. 10B is a diagram of one embodiment of an integrated memory assembly in which one control die controls two memory die.

FIG. 10B is a diagram of one embodiment of an integrated memory assembly 104. This bonding configuration is similar to an embodiment depicted in FIG. 5B. The configuration in FIG. 10B adds an extra memory die relative to the configuration in FIG. 10A. Hence, similar reference numerals are used for memory die 302a in FIG. 10B, as were used for memory die 302 in FIG. 10A. In an embodiment depicted in FIG. 10B, first memory die 302a is bonded to control die 304, and control die 304 is bonded to second memory die 302b. Note that although a gap is depicted between the pairs of adjacent dies, such a gap may be filled with an epoxy or other resin or polymer.

Each memory die 302a, 302b includes a memory structure 326. Memory structure 326a is adjacent to substrate 1072 of memory die 302a. Memory structure 326b is adjacent to substrate 1074 of memory die 302b. The substrates 1072, 1074 are formed from a portion of a silicon wafer, in some embodiments. In this example, the memory structures 326 each include a three-dimensional memory array.

Word line driver 560 concurrently provides voltages to a first word line 1042 in memory die 302a and a second word line 1044 in memory die 302b. The pathway from the word line driver 560 to the second word line 1044 includes conductive pathway 1032, through silicon via (TSV) 1068, bond pad 576a, bond pad 572a, and conductive pathway 1036. Other word line drivers (not depicted in FIG. 10B) provide voltages to other word lines.

Sense amplifier 350a is in communication with a bit line in memory die 302a. The pathway from the sense amplifier 350a to the bit line includes conductive pathway 1052, bond pad 574b, bond pad 570b, and conductive pathway 1054. Sense amplifier 350b is in communication with a bit line in memory die 302b. The pathway from the sense amplifier 350b to the bit line includes conductive pathway 1054, TSV 1056, bond pad 576b, bond pad 572b, and conductive pathway 1048.

Numerous modification to an embodiment depicted in FIG. 10B are possible. One modification is for sense amplifiers 350a to be located on first memory die 302a, and for sense amplifiers 350b to be located on second memory die 302b.

Figure 11:
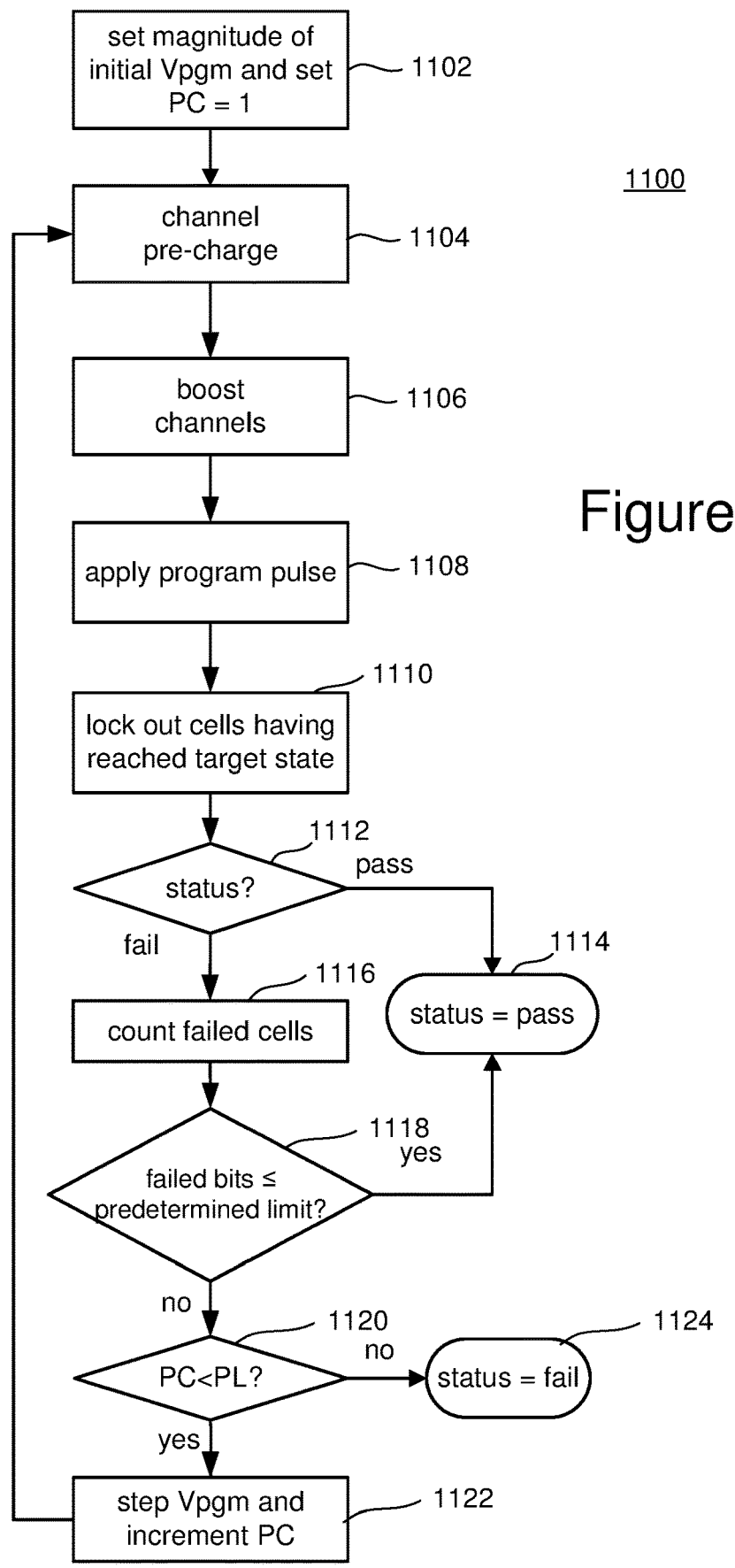
FIG. 11 is a flowchart describing one embodiment of a process for programming NAND strings of memory cells organized into an array.

FIG. 11 is a flowchart describing one embodiment of a process 1100 for programming NAND strings of memory cells organized into an array. In one example embodiment, the process of FIG. 11 is performed on integrated memory assembly 104 using the control circuitry 310 discussed above. For example, the process of FIG. 11 can be performed at the direction of state machine 312. In one embodiment, process 1100 is used to program a codeword into memory structure 326.

In many implementations, the magnitude of the program pulses is increased with each successive pulse by a predetermined step size. In step 1102 of FIG. 11, the programming voltage (Vpgm) is initialized to the starting magnitude (e.g., ~12-16V or another suitable level) and a program counter PC maintained by state machine 312 is initialized at 1.

In one embodiment, the group of memory cells selected to be programmed (referred to herein as the selected memory cells) are programmed concurrently and are all connected to the same word line (the selected word line). There will likely be other memory cells that are not selected for programming (unselected memory cells) that are also connected to the selected word line. That is, the selected word line will also be connected to memory cells that are supposed to be inhibited from programming. Additionally, as memory cells reach their intended target data state, they will be inhibited from further programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming. To assist in the boosting, in step 1104 the memory system will pre-charge channels of NAND strings that include memory cells connected to the selected word line that are to be inhibited from programming.

In step 1106, NAND strings that include memory cells connected to the selected word line that are to be inhibited from programming have their channels boosted to inhibit programming. Such NAND strings are referred to herein as "unselected NAND strings." In one embodiment, the unselected word lines receive one or more boosting voltages (e.g., ~7-11 volts) to perform boosting schemes. A program inhibit voltage is applied to the bit lines coupled the unselected NAND string.

In step 1108, a program pulse of the program signal Vpgm is applied to the selected word line (the word line selected for programming). If a memory cell on a NAND string should be programmed, then the corresponding bit line is biased at a program enable voltage, in one embodiment. Herein, such a NAND string is referred to as a "selected NAND string."

In step 1108, the program pulse is concurrently applied to all memory cells connected to the selected word line so that all of the memory cells connected to the selected word line are programmed concurrently (unless they are inhibited from programming). That is, they are programmed at the same time or during overlapping times (both of which are considered concurrent). In this manner all of the memory cells connected to the selected word line will concurrently have their threshold voltage change, unless they are inhibited from programming.

In step 1110, memory cells that have reached their target states are locked out from further programming. Step 1110 may include performing verifying at one or more verify reference levels. In one embodiment, the verification process is performed by testing whether the threshold voltages of the memory cells selected for programming have reached the appropriate verify reference voltage.

In step 1110, a memory cell may be locked out after the memory cell has been verified (by a test of the Vt) that the memory cell has reached its target state.

If, in step 1112, it is determined that all of the memory cells have reached their target threshold voltages (pass), the programming process is complete and successful because all selected memory cells were programmed and verified to their target states. A status of "PASS" is reported in step 1114. Otherwise if, in step 1112, it is determined that not all of the memory cells have reached their target threshold voltages (fail), then the programming process continues to step 1116.

In step 1116, the memory system counts the number of memory cells that have not yet reached their respective target threshold voltage distribution. That is, the system counts the number of memory cells that have, so far, failed to reach their target state. This counting can be done by the state machine, the memory controller 102, or other logic. In one implementation, each of the sense blocks will store the status (pass/fail) of their respective cells. In one embodiment, there is one total count, which reflects the total number of memory cells currently being programmed that have failed the last verify step. In another embodiment, separate counts are kept for each data state.

In step 1118, it is determined whether the count from step 1116 is less than or equal to a predetermined limit. In one embodiment, the predetermined limit is the number of bits that can be corrected by error correction codes (ECC) during a read process for the page of memory cells. If the number of failed cells is less than or equal to the predetermined limit, than the programming process can stop and a status of "PASS" is reported in step 1114. In this situation, enough memory cells programmed correctly such that the few remaining memory cells that have not been completely programmed can be corrected using ECC during the read process. In some embodiments, the predetermined limit used in step 1118 is below the number of bits that can be corrected by error correction codes (ECC) during a read process to allow for future/additional errors. When programming less than all of the memory cells for a page, or comparing a count for only one data state (or less than all states), than the predetermined limit can be a portion (pro-rata or not pro-rata) of the number of bits that can be corrected by ECC during a read process for the page of memory cells. In some embodiments, the limit is not predetermined. Instead, it changes based on the number of errors already counted for the page, the number of program-erase cycles performed or other criteria.

If the number of failed memory cells is not less than the predetermined limit, than the programming process continues at step 1120 and the program counter PC is checked against the program limit value (PL). Examples of program limit values include 6, 12, 16, 19 and 30; however, other values can be used. If the program counter PC is not less than the program limit value PL, then the program process is considered to have failed and a status of FAIL is reported in step 1124. If the program counter PC is less than the program limit value PL, then the process continues at step 1122 during which time the Program Counter PC is incremented by 1 and the program voltage Vpgm is stepped up to the next magnitude. For example, the next pulse will have a magnitude greater than the previous pulse by a step size (e.g., a step size of 0.1-1.0 volts). After step 1122, the process loops back to step 1104 and another program pulse is applied to the selected word line so that another iteration (steps 1104-1122) of the programming process of FIG. 11 is performed.

At the end of a successful programming process, the threshold voltages of the memory cells should be within one or more distributions of threshold voltages for programmed memory cells or within a distribution of threshold voltages for erased memory cells, as appropriate. FIG. 12A illustrates example threshold voltage distributions for the memory array when each memory cell stores three bits of data. Other embodiments, however, may use other data capacities per memory cell (e.g., such as one, two, four, or five bits of data per memory cell). FIG. 12A shows eight threshold voltage distributions, corresponding to eight data states. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected.

FIG. 12A shows seven read reference voltages, VrA, VrB, VrC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, . . . ) a memory cell is in.

FIG. 12A also shows seven verify reference voltages, VvA, VvB, VvC, VvD, VvE, VvF, and VvG. In some embodiments, when programming memory cells to data state A, the system will test whether those memory cells have a threshold voltage greater than or equal to VvA. When programming memory cells to data state B, the system will test whether the memory cells have threshold voltages greater than or equal to VvB. When programming memory cells to data state C, the system will determine whether memory cells have their threshold voltage greater than or equal to VvC. When programming memory cells to data state D, the system will test whether those memory cells have a threshold voltage greater than or equal to VvD. When programming memory cells to data state E, the system will test whether those memory cells have a threshold voltage greater than or equal to VvE. When programming memory cells to data state F, the system will test whether those memory cells have a threshold voltage greater than or equal to VvF. When programming memory cells to data state G, the system will test whether those memory cells have a threshold voltage greater than or equal to VvG. FIG. 12A also shows Vev, which is a voltage level to test whether a memory cell has been properly erased.

In one embodiment, known as full sequence programming, memory cells can be programmed from the erased data state Er directly to any of the programmed data states A-G. For example, a population of memory cells to be programmed may first be erased so that all memory cells in the population are in erased data state Er. Then, a programming process is used to program memory cells directly into data states A, B, C, D, E, F, and/or G. For example, while some memory cells are being programmed from data state ER to data state A, other memory cells are being programmed from data state ER to data state B and/or from data state ER to data state C, and so on. The arrows of FIG. 12A represent the full sequence programming. In some embodiments, data states A-G can overlap, with control die 304 and/or memory controller 102 relying on error correction to identify the correct data being stored.

The technology described herein can also be used with other types of programming in addition to full sequence programming (including, but not limited to, multiple stage/ phase programming). In one embodiment of multiple stage/ phase programming, all memory cells to end up in any of data states D-G are programmed to an intermediate state that is no higher than D in a first phase. Memory cells to end up in any of data states Er-C do not receive programming in the first phase. In a second phase, memory cells to end up in either data state B or C are programmed to a state that is no higher than B; memory cells to end up in either data state F or G are programmed to a state that is no higher than F. In at third phase, the memory cells are programmed to their final states. In one embodiment, a first page is programmed in the first phase, a second page is programmed in the second phase, and a third page is programmed in the third phase. Herein, once on page has been programmed into a group of memory cells, the memory cells can be read back to retrieve the page. Hence, the intermediate states associated with multi-phase programming are considered herein to be programmed states.

In general, during verify operations and read operations, the selected word line is connected to a voltage (one example of a reference signal), a level of which is specified for each read operation (e.g., see read compare levels VrA, VrB, VrC, VrD, VrE, VrF, and VrG, of FIG. 12A) or verify operation (e.g. see verify target levels VvA, VvB, VvC, VvD, VvE, VvF, and VvG of FIG. 12A) in order to determine whether a threshold voltage of the concerned memory cell has reached such level. After applying the word line voltage, the conduction current of the memory cell is measured to determine whether the memory cell turned on (conducted current) in response to the voltage applied to the word line. If the conduction current is measured to be greater than a certain value, then it is assumed that the memory cell turned on and the voltage applied to the word line is greater than the threshold voltage of the memory cell. If the conduction current is not measured to be greater than the certain value, then it is assumed that the memory cell did not turn on and the voltage applied to the word line is not greater than the threshold voltage of the memory cell. During a read or verify process, the unselected memory cells are provided with one or more read pass voltages (also referred to as bypass voltages) at their control gates so that these memory cells will operate as pass gates (e.g., conducting current regardless of whether they are programmed or erased).

There are many ways to measure the conduction current of a memory cell during a read or verify operation. In one example, the conduction current of a memory cell is measured by the rate it discharges or charges a dedicated capacitor in the sense amplifier. In another example, the conduction current of the selected memory cell allows (or fails to allow) the NAND string that includes the memory cell to discharge a corresponding bit line. The voltage on the bit line is measured after a period of time to see whether it has been discharged or not. Note that the technology described herein can be used with different methods known in the art for verifying/reading. Other read and verify techniques known in the art can also be used.

FIG. 12B depicts threshold voltage distributions when each memory cell stores four bits of data. FIG. 12B depicts that there may be some overlap between the data states S0-S15. The overlap may occur due to factors such as memory cells losing charge (and hence dropping in threshold voltage). Program disturb can unintentionally increase the threshold voltage of a memory cell. Likewise, read disturb can unintentionally increase the threshold voltage of a memory cell. Over time, the locations of the threshold voltage distributions may change. Such changes can increase the bit error rate, thereby increasing decoding time or even making decoding impossible. Changing the read reference voltages can help to mitigate such effects.

As noted, FIG. 12B depicts an example in which four bits are stored per memory cell. Thus, four pages may be stored in a set of memory cells. The set of memory cells may be connected to the same word line. These pages may be referred to as a lower page, lower-middle page, upper-middle page, and upper page. In one embodiment, in order to read the lower page, the memory cells are sensed using four different read reference voltages. For example, the memory cells may be sensed at Vr1, Vr4, Vr6, and Vr11. In some embodiments, the read reference voltages that are used to read a page are adjusted from time to time. In some embodiments, a tiered approach is taken in which the control die 304 uses one or more techniques to seek new read reference voltages. If the control die is unsuccessful at finding satisfactory read reference voltages, the memory controller 102 may seek new read reference voltages.

In some embodiments, hard bit decoding is used. Hard bit decoding may be based on one sense operation per read level. For example, sensing at Vr1, Vr4, Vr6, and Vr11 may be used to produce a hard bit for the lower page. In some embodiments, soft bit decoding is used. Soft bit decoding may be based on multiple sense operations per read level. For example, sensing at the various read levels Vr1−3Δ, Vr1−2Δ, Vr1−Δ, Vr1+Δ, Vr1+2Δ, Vr1+3Δ may be used to provide soft bit information, which may be used by a soft bit decoder.

Figure 13A:
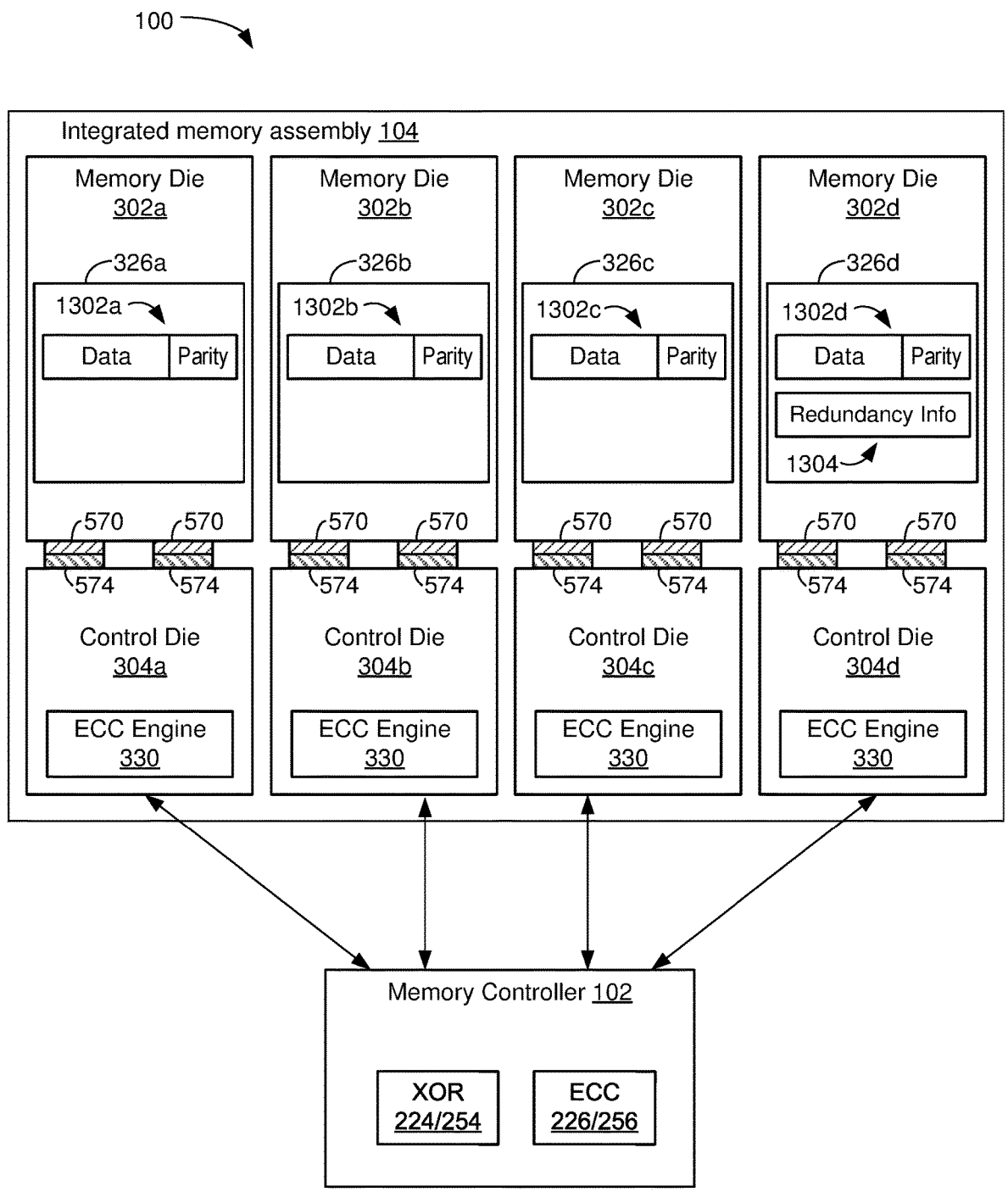
FIG. 13A is a diagram of one embodiment of a memory system.

In some embodiments, the memory system 100 is able to recover data bits of codewords when one or more of codewords in a set is not successfully decoded using an ECC decoder. FIG. 13A is a diagram of one embodiment of a memory system 100. The memory system stores redundancy information that may be used to recover data bits of codewords when at least one of the codewords were not successfully decoded using an ECC decoder. The memory system 100 has an integrated memory assembly 104, which has four memory die 302a, 302b, 302c, 302d, as well as four control die 304a, 304b, 304c, 304d. The integrated memory assembly 104 stores a set of codewords, as well as redundancy information for the set of codewords.

Memory structure 326a on memory die 302a stores codeword 1302a; memory structure 326b on memory die 302b stores codeword 1302b; memory structure 326c on memory die 302c stores codeword 1302c; and memory structure 326d on memory die 302d stores codeword 1302d. Each codeword has data bits and parity bits. Each codeword 1302 is decodeable independent of the other codewords, using an ECC decoder in the ECC engine 330. The reference numeral 1302 may be used to refer to an individual codeword or to the set of codewords, depending on the context.

Redundancy information 1304 is stored in memory structure 326d. In one embodiment, the control die 304a receives the redundancy information 1304 from memory controller 102. The control die 304a stores the redundancy information 1304 in memory structure 326d. In one embodiment, the control die 304a accesses the redundancy information 1304 from memory structure 326d in response to a request from the memory controller 102 for the redundancy information 1304.

The redundancy information 1304 is formed from information in each of the codewords in the XOR stripe. The redundancy information 1304 could be formed from each entire codeword 1302a-1302d, or a portion of each codeword 1302a-1302d. One example of redundancy information 1304 is XOR information. In one embodiment, the redundancy information 1304 comprises a bitwise XOR of the corresponding data bits and parity bits in each codeword 1302a-1302d to form an XOR codeword. In this example, the XOR codeword has the same number of bits as each codeword 1302. As one example, each codeword 1302 could be 4 kilobytes. The set of codewords 1302 and the redundancy information 1304 are referred to herein as a stripe. In some embodiment, the stripe is referred to as an XOR stripe. In some embodiments, the redundancy information 1304 is formed from a portion of each codeword 1302a-1302d (here, portion means less than the entire codeword). For example, a bitwise XOR could be performed on a portion of each codeword 1302a-1302d.

In some embodiments, the redundancy information 1304 is based on bits that are not expressly represented in each individual codeword 1302. In one "global parity bit" embodiment, a second set of parity bits are generated for each codeword 1302. Then, a bitwise XOR is formed from the second set of parity bits. For example, the second set of parity bits might include 400 bytes for each codeword. These are not the same parity bits that are in the codewords 1302. The bitwise XOR results in 400 bytes of information for the redundancy information 1304, which may be considerably smaller than the size of each individual codeword. For example, each codeword could be 4 kilobytes, as noted above. Herein, the redundancy information 1304 that is formed from the bitwise XOR of the second set of parity bits for each codeword may be referred to as "global parity bits."

Note that the redundancy information 1304 differs from the parity bits of a codeword 1302 in that the redundancy information 1304 is formed based on information in each of the codewords 1302. In contrast, the parity bits for a given codeword 1302 are only based on the data bits of that codeword 1302. Thus, an ECC decoder is able to decode a single codeword based only on the user bits and parity bits for that codeword. However, to use the redundancy information 1304 to recover a failed codeword, the other codewords in the stripe are used by, for example, an XOR engine.

Each control die 304 has an ECC engine 330 such that it is able to decode codewords stored in the memory die 302 to which it is bonded. The ECC engine 330 was discussed in connection with FIG. 3A. For the sake of illustration two pairs 570, 574 of die bonds are shown for each control die/memory die pair. However, there are typically many more die bonds, as previously discussed. In some embodiments, each data bit and each parity bit of a codeword are transferred over a different die bond pair 570, 574. Thus, transferring a codeword over the die bond pairs 570, 574 may be much more efficient than transferring a codeword from the integrated memory assembly 104 to the memory controller 102. However, in many cases, the parity bits of the codeword need not be transferred from the integrated memory assembly 104 to the memory controller 102.

The memory controller 102 has ECC engine 226/256. In some embodiments, the ECC engine 226/256 is used to attempt to decode codewords for which decoding failed on the integrated memory assembly 104.

The memory controller 102 has XOR engine 224/254. The XOR engine 224/226 is able to recover the data bits for the set of codewords based on the redundancy information 1304. The XOR engine 224/226 is able to form the redundancy information 1304 for the set of codewords 1302. The memory controller 102 may provide the redundancy information 1304 to, for example, control die 304*d* to store in memory structure 326.

Figure 13B:
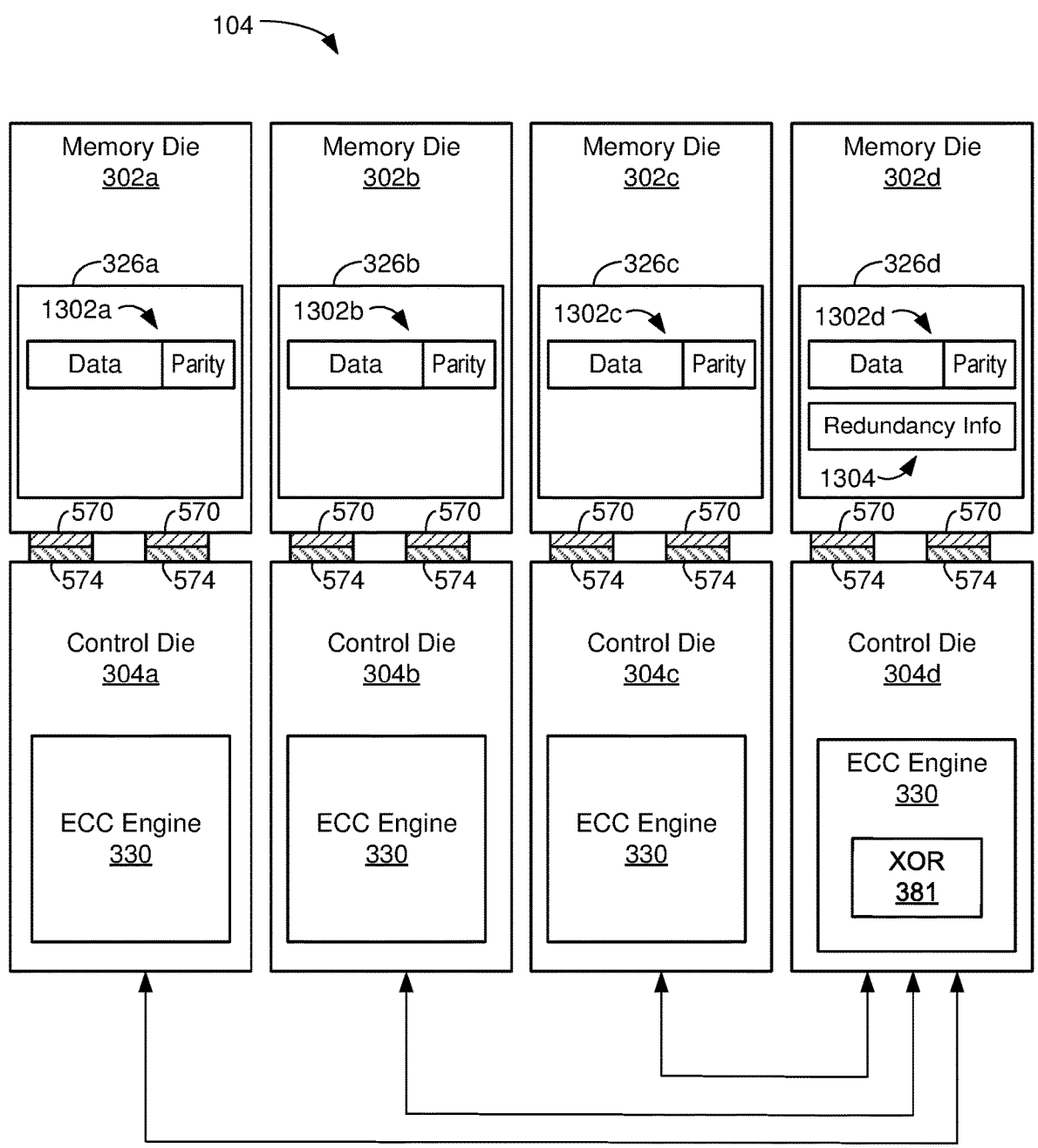
FIG. 13B is a diagram of one embodiment of an integrated memory assembly having a control die with an XOR engine.

It is not required that the XOR engine be located on the memory controller 102. In one embodiment, the XOR engine is located on one of the control dies 304. FIG. 3B, discussed above, shows one embodiment of an ECC engine 330 on a control die 304 having an XOR engine 381. FIG. 13B is a diagram of one embodiment of an integrated memory assembly 104 in which one of the control dies 304 has an XOR engine 381. Specifically, control die 304*d* has an XOR engine 381 as part of its ECC engine 330. Control die 304*d* is in communication with the other control dies 304*a*, 304*b*, 304*c*, such that control die 304*d* is able to recover the data bits of the codewords 1302 in the event of a decode failure.

Figure 13C:
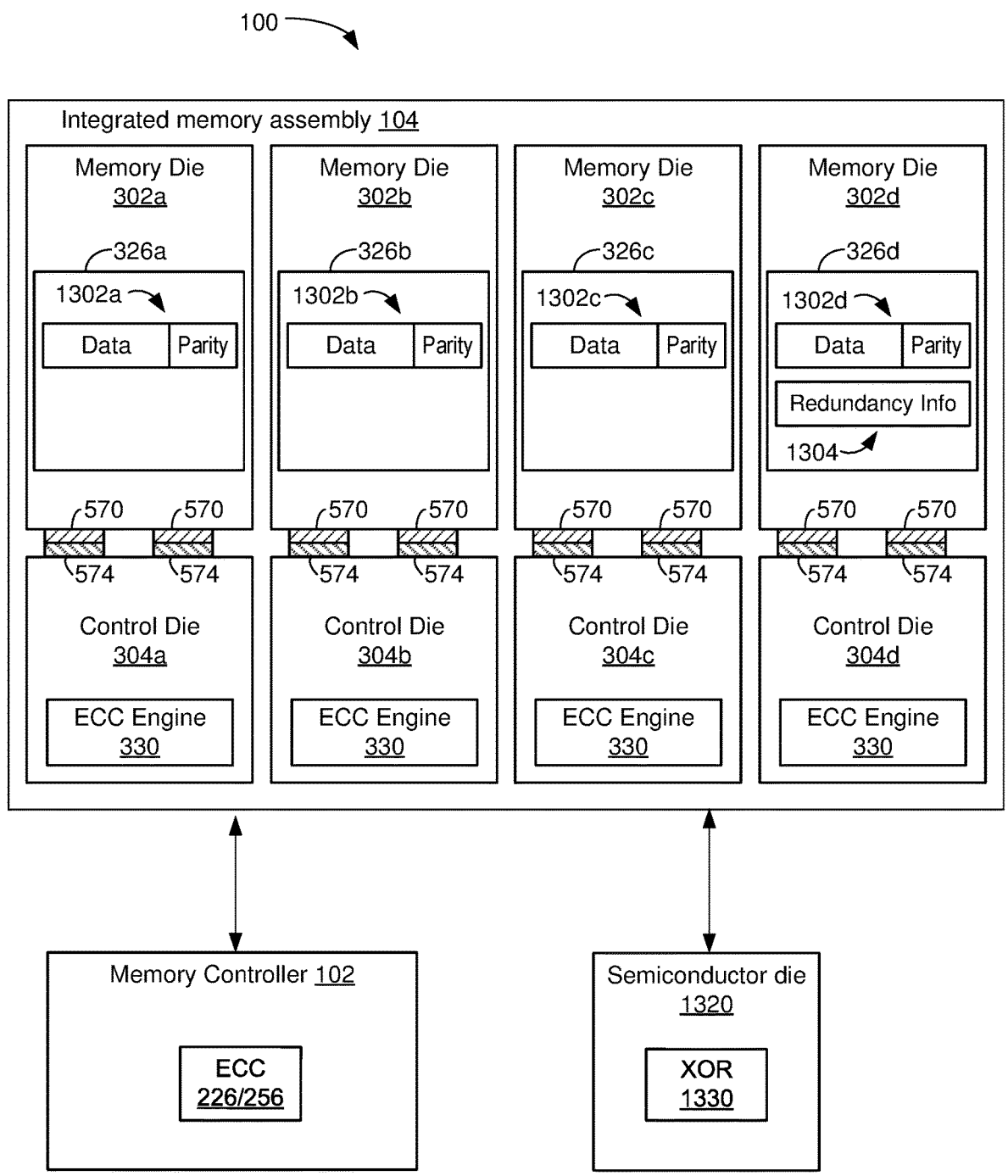
FIG. 13C is a diagram of one embodiment of an integrated memory assembly having a semiconductor die with an XOR engine.

An alternative to the architectures in FIGS. 13A and 13B is to have the XOR engine located on a semiconductor die or application specific circuit that is not a memory controller and is not a control die. FIG. 13C depicts one embodiment of a memory system 100 having a special die with an XOR engine. Specifically, semiconductor die 1320 has XOR engine 1330. The XOR engine 1330 is able to recover data bits from the codewords 1302 in the event that decoding of one of more of the codewords fails. Semiconductor die 1320 is not a control die 304 because it does not control memory operations (e.g., read, write, erase) on any of the memory dies 302. Also, semiconductor die 1320 is not required to be bonded to any of the memory dies 302 vie bond pad pairs 570, 574.

The XOR engine 224/254 is not depicted on the memory controller 102, but the memory controller 102 may have XOR engine 224/254. The memory controller 102 is shown as having ECC engine 226/256. Optionally, semiconductor die 1320 may have an ECC engine.

Figure 13D:
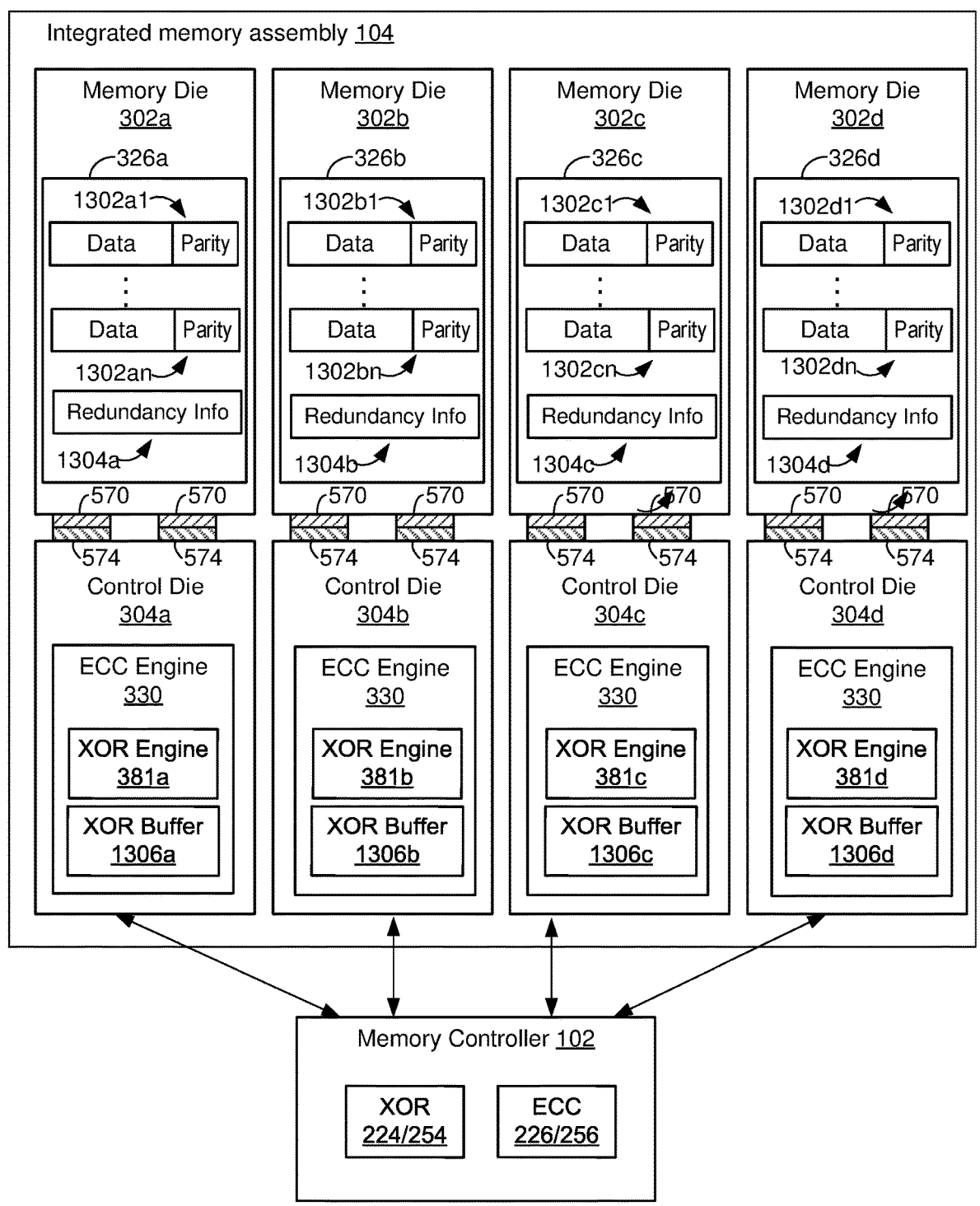
FIG. 13D is a diagram of one embodiment of an integrated memory assembly in which each semiconductor die has an XOR engine.

In yet another embodiment, each control die 304 has an XOR engine 381. FIG. 13D depicts a memory system 100 in which each control die 304 has an XOR engine 381. In one embodiment, each memory die 302 stores both a codeword and the redundancy information 1304 for the stripe (e.g., XOR stripe). For example, control die 304*a* uses XOR engine 381*a* to form redundancy information 1304*a* from codewords 1302*a*1 to 1302*an*. In the event that there is a failure to decode one or more of the codewords 1302*a*1 to 1302*an*, the control die 304*a* uses XOR engine 381*a* to recover the failed codeword. The XOR buffer 1306*a* is used to store results of various logical operations during the XOR recovery process. In a similar manner, control die 304*b* uses XOR engine 381*b* and XOR buffer 1306*b* to recover a failed codeword from the set 1302*b*1 to 1302*bn* based on the redundancy information 1304*b*; control die 304*c* uses XOR engine 381*c* and XOR buffer 1306*c* to recover a failed codeword from the set 1302*c*1 to 1302*cn* based on the redundancy information 1304*cn*; and control die 304*d* uses XOR engine 381*d* and XOR buffer 1306*d* to recover a failed codeword from the set 1302*d*1 to 1302*dn* based on the redundancy information 1304*d*. Further details are discussed below in connection with FIGS. 18-21.

Figure 14:
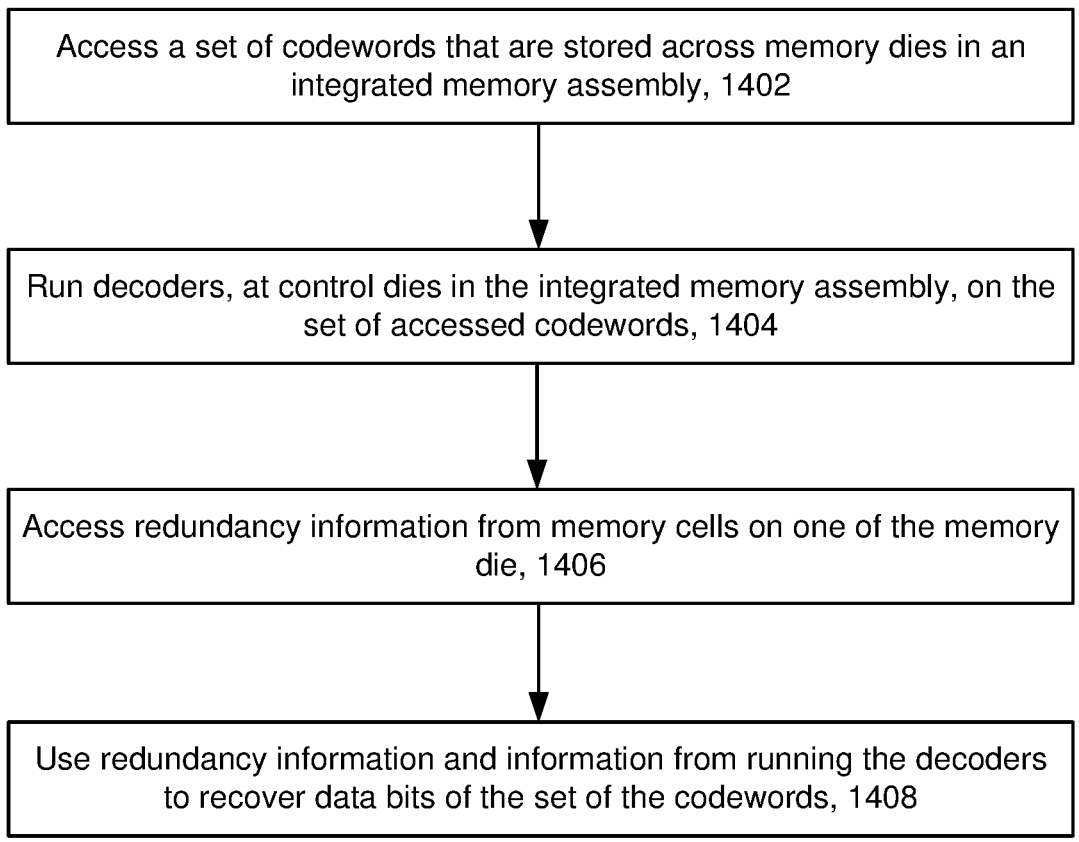
FIG. 14 depicts a flowchart of one embodiment of a process of recovering data that was stored in non-volatile memory cells.

FIG. 14 depicts a flowchart of one embodiment of a process 1400 of recovering data that was stored in non-volatile memory cells. The process 1400 may be used to recover data bits for at least one codeword in a set of codewords. For example, process 1400 may be used to recover a failed codeword. In some embodiments, the set of codewords are part of an XOR stripe. Reference will be made to FIG. 13A to facilitate explanation; however, process 1400 is not limited to the memory system 100 of FIG. 13A.

Step 1402 includes accessing a set of codewords that are stored across memory dies 302 in an integrated memory assembly 104. For example, codeword 1302*a* may be accessed from memory die 302*a* by control die 304*a*. Likewise, codeword 1302*b* may be accessed from memory die 302*b* by control die 304*b*, codeword 1302*c* may be accessed from memory die 302*c* by control die 304*c*, and codeword 1302*d* may be accessed from memory die 302*d* by control die 304*d*. It may be stated that collectively the various control dies 304*a*, 304*b*, 304*c*, 304*d* access the set of codewords in step 1402.

Step 1404 include running decoders 390 on the set of accessed codewords. Step 1404 is performed at control dies 304 in the integrated memory assembly 104. For example, control die 304*a* runs its ECC engine 330 to attempt to decode codeword 1302*a*. Likewise, control die 304*b* runs its ECC engine 330 to attempt to decode codeword 1302*b*, control die 304*c* runs its ECC engine 330 to attempt to decode codeword 1302*c*, and control die 304*d* runs its ECC engine 330 to attempt to decode codeword 1302*d*.

Step 1404 generates decoding information at each of the control dies 304. In the event that the decoding is successful, the decoding information could include the data bits and the parity bits of the codeword. In the event that the decoding is not successful, the decoding information could a syndrome weight of the codeword. In one embodiment, this is the initial syndrome weight. For example, this is the syndrome weight before decoding using an iterative message passing decoder. In one embodiment, this is the syndrome weight at the point when decoding of the codeword was halted. In the event that the decoding is not successful, the decoding information could the codeword itself, as it was accessed from the memory die 302. In the event that the decoding is not successful, the decoding information could be a partially decoded codeword.

Step 1406 includes accessing redundancy information from memory cells on one of the memory die 302. For example, control die 304*d* may access redundancy information 1304 from memory die 302*d*. Control die 304*d* may access the redundancy information 1304 in response to a request from the memory controller 102. Control die 304*d* may send the redundancy information 1304 to the memory controller 102.

Step 1408 includes using the redundancy information, as well as information from running the decoders 390, to recover the data bits of the set of codewords. In one embodiment, the XOR engine 224/254 on the memory controller 102 is used to recover the data bits. In one embodiment, the XOR engine 381 on a control die (e.g., control die 304*d*) is used to recover the data bits. In one embodiment, the XOR engine 1330 on a semiconductor die 1320 is used to recover the data bits.

Figure 15:
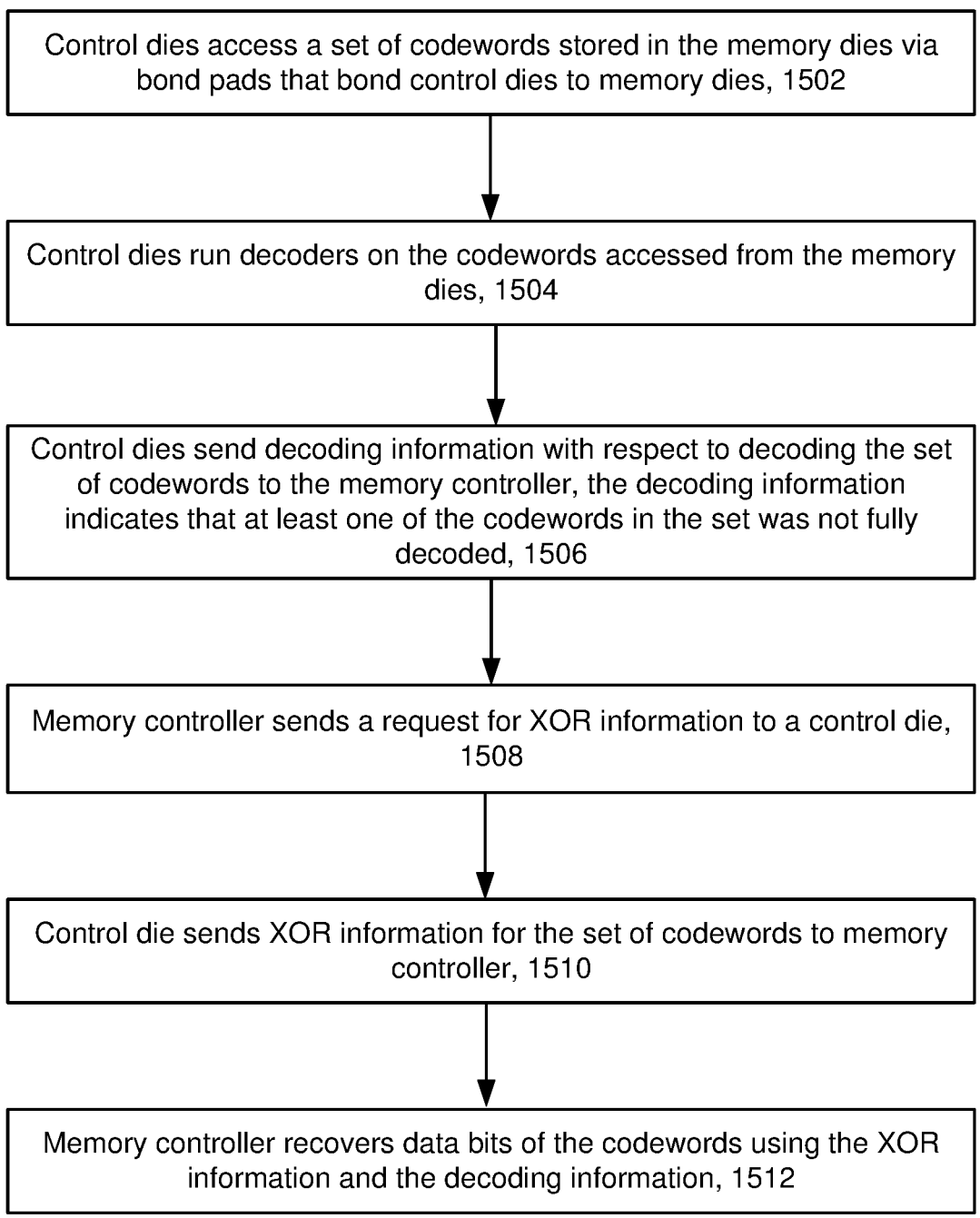
FIG. 15 depicts a flowchart of one embodiment of a process of recovering data that was stored in non-volatile memory cells.

FIG. 15 depicts a flowchart of one embodiment of a process 1500 of recovering data that was stored in non-volatile memory cells. The process 1500 may be used to recover a failed codeword in an XOR stripe. Process 1500 provides further details of one embodiment of process 1400. Reference will be made to FIG. 13A to facilitate explanation; however, process 1500 is not limited to the memory system 100 of FIG. 13A.

Step 1502 includes accessing a set of codewords that are stored across memory dies 302 in an integrated memory assembly 104. The access may be made through bond pads 570, 574 that bond a memory die 302 to a control die 304. In some embodiments, each data bit and each parity bit of a codeword is transferred through a different bond pad pair 570, 574. For example, codeword 1302a is accessed from memory die 302a through bond pad pairs 570, 574 by control die 304a. Likewise, codeword 1302b is accessed from memory die 302b through bond pad pairs 570, 574 by control die 304b, codeword 1302c is accessed from memory die 302c through bond pad pairs 570, 574 by control die 304c, and codeword 1302d is accessed from memory die 302d through bond pad pairs 570, 574 by control die 304d. Note that while only two bond pad pair 570, 574 are depicted in FIG. 13A per each control die/memory die pair, there are typically many more bond pad pair 570, 574.

Step 1504 include running decoders 390 on the set of codewords in the XOR stripe. Step 1504 is performed at control dies 304 in the integrated memory assembly 104. For example, control die 304a runs its ECC engine 330 to attempt to decode codeword 1302a. Likewise, control die 304b runs its ECC engine 330 to attempt to decode codeword 1302b, control die 304c runs its ECC engine 330 to attempt to decode codeword 1302c, and control die 304d runs its ECC engine 330 to attempt to decode codeword 1302d.

Step 1506 includes the control dies 304 sending decoding information to the memory controller 102. The decoding information indicates that at least one of the codewords was not fully (i.e., successfully) decoded.

In the event that the decoding is successful, the decoding information could include the data bits and the parity bits of the codeword. Optionally, in the event that the decoding is successful, the decoding information could include only the data bits of the codeword. In the event that the decoding is not successful, the decoding information could be a syndrome weight of the codeword. In one embodiment, this is the initial syndrome weight. For example, this is the syndrome weight before decoding using an iterative message passing decoder. In one embodiment, this is the syndrome weight at the point when decoding of the codeword was halted. In the event that the decoding is not successful, the decoding information could the codeword itself, as it was accessed from the memory die 302. In the event that the decoding is not successful, the decoding information could a partially decoded codeword.

Step 1508 includes the memory controller 102 sending a request for XOR information to one of the control dies 304. In one embodiment, the memory controller 102 sends the request in response to being unable to decode the codeword that was not fully decoded at the control die 304. In one embodiment, the memory controller 102 may also request additional information, such as parity bits of codewords that were successfully decoded at the control dies 304.

Step 1510 includes the control die sending the XOR information to the memory controller 102. Note that because the codewords do not need to be transferred with the XOR information, significantly less information needs to be transferred to the memory controller 102. Optionally, the controls dies 304 that were able to successfully decode their respective codewords may send the parity bits for the successfully decoded codewords (note that the memory controller may already have the data bits for those codewords). In this option, the parity bits may be considered to be part of the decoding information discussed in step 1506.

Step 1512 includes the memory controller 102 using the XOR information, as well as the decoding information, to recover the data bits of the set of codewords. In one embodiment, the XOR engine 224/254 on the memory controller 102 is used to recover the data bits.

Figure 16:
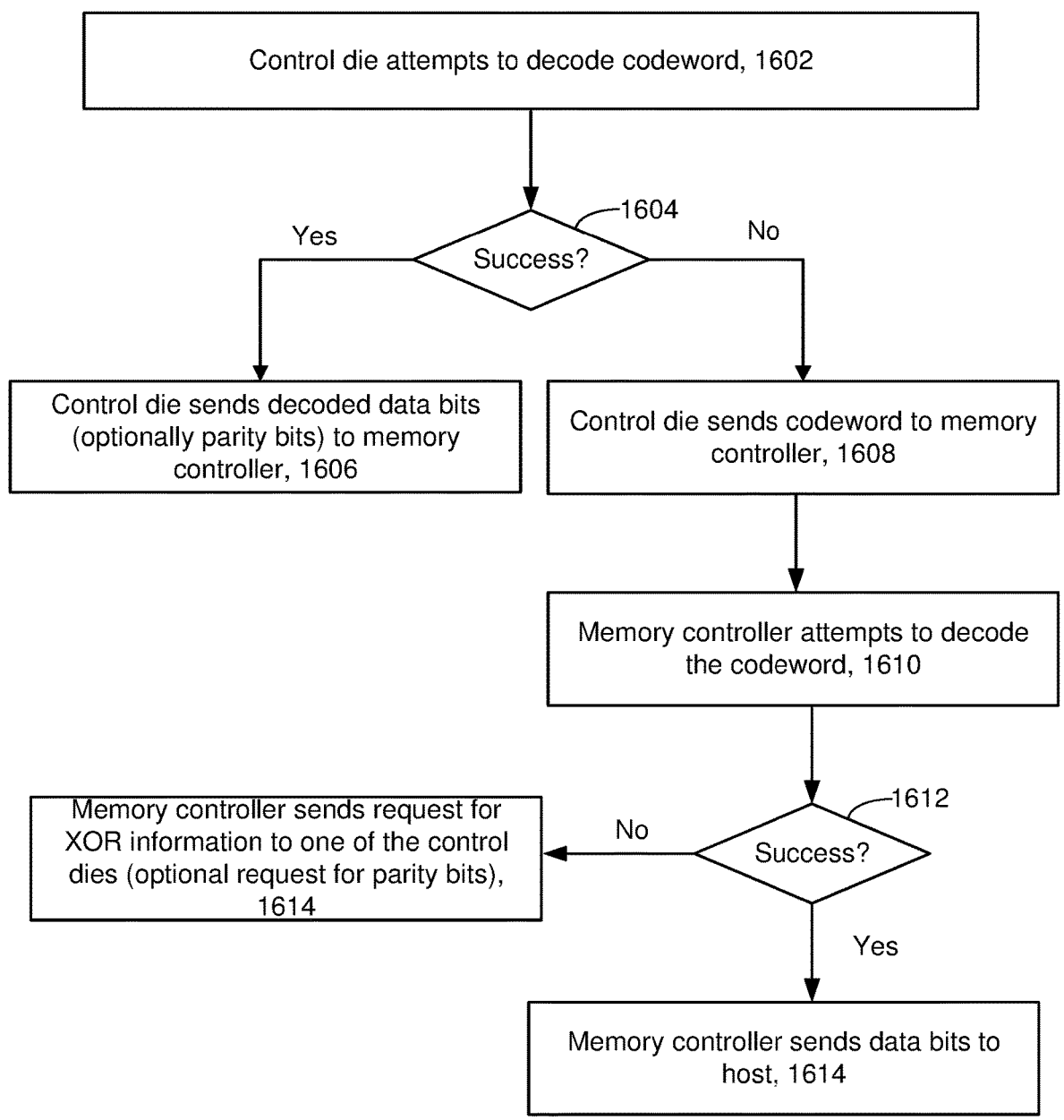
FIG. 16 depicts a flowchart that shows further details of one embodiment of actions performed by a control die and the memory controller.

FIG. 16 depicts a flowchart that shows further details of one embodiment of actions performed by a control die 304 and the memory controller 102 in connection with decoding a codeword. The process 1600 involves actions surrounding the decoding of one codeword in a set of codewords. Some of the steps refer to a control die, which might be any of the control dies in FIG. 13A, for example. The process 1600 may be performed for each of the codewords in the set of codewords.

Step 1602 includes a control die 304 attempting to decode a codeword. In one embodiment, the control die 304 uses a low-density parity check (LDPC) decoder. In one embodiment, the control die 304 uses an iterative message passing decoder. In one embodiment, the control die 304 uses a hard bit decoder. In one embodiment, the control die 304 uses a bit flipping decoder. Optionally, the control die 304 could attempt to decode the codeword using more than one technique. For example, the control die 304 could use a soft bit decoder, if decoding with a hard bit decoder fails. As another example, the control die 304 could use an iterative message passing soft decoder if a bit flipping decoder fails.

Step 1604 includes a determination of whether decoding was successful. If the codeword is successfully decoded then correct data bits of the codeword are produced.

If the codeword was successfully decoded, then the control die 304 sends the correct data bits to the memory controller 102. The control die 304 could optionally send the parity bits, but sending the parity bits is not required. Not sending the parity bits improves communication efficiency between the control die 304 and the memory controller 102. Note that the control die 304 and the memory controller 102 may communicate over a data bus have a fairly limited bus width (e.g., 8 bits, 16 bits, 32 bits). However, the data bus is not limited to these examples.

If the codeword was not successfully decoded, then the control die 304 sends the codeword to the memory controller 102, in step 1608. The control die 304 could send the codeword in the form in which it was read from the memory die 302. Alternatively, the control die 304 could send a partially decoded codeword. A codeword that is in the process of being decoded may be referred to as a partially decoded codeword. For example, an iterative message passing decoder may, for example, flip one or more bits in the codeword with each iteration. Thus the format of the codeword may change during decoding. Whether the control die 304 sends the raw codeword or a partially decoded codeword, the codeword is referred to herein as an "un-decoded codeword."

Step 1610 includes the memory controller 102 attempting to decode the codeword. The memory controller 102 may use a different technique than was used by the control die 304.

Step 1612 includes a determination of whether the codeword was successfully decoded. If the codeword was successfully decoded, then the memory controller 102 sends the data bits to the host 120, in step 1614. If the codeword was not successfully decoded, then the memory controller 102 sends a request for XOR information to one of the control die 304, in step 1614. As noted in the discussion of step 1606, the control die 304 is not required to send the parity bits when the codeword was successfully decoded. Thus, if the memory controller 102 does not have the parity bits for such successfully decoded codewords, the memory controller 102 could request the parity bits in step 1614.

Figure 17:
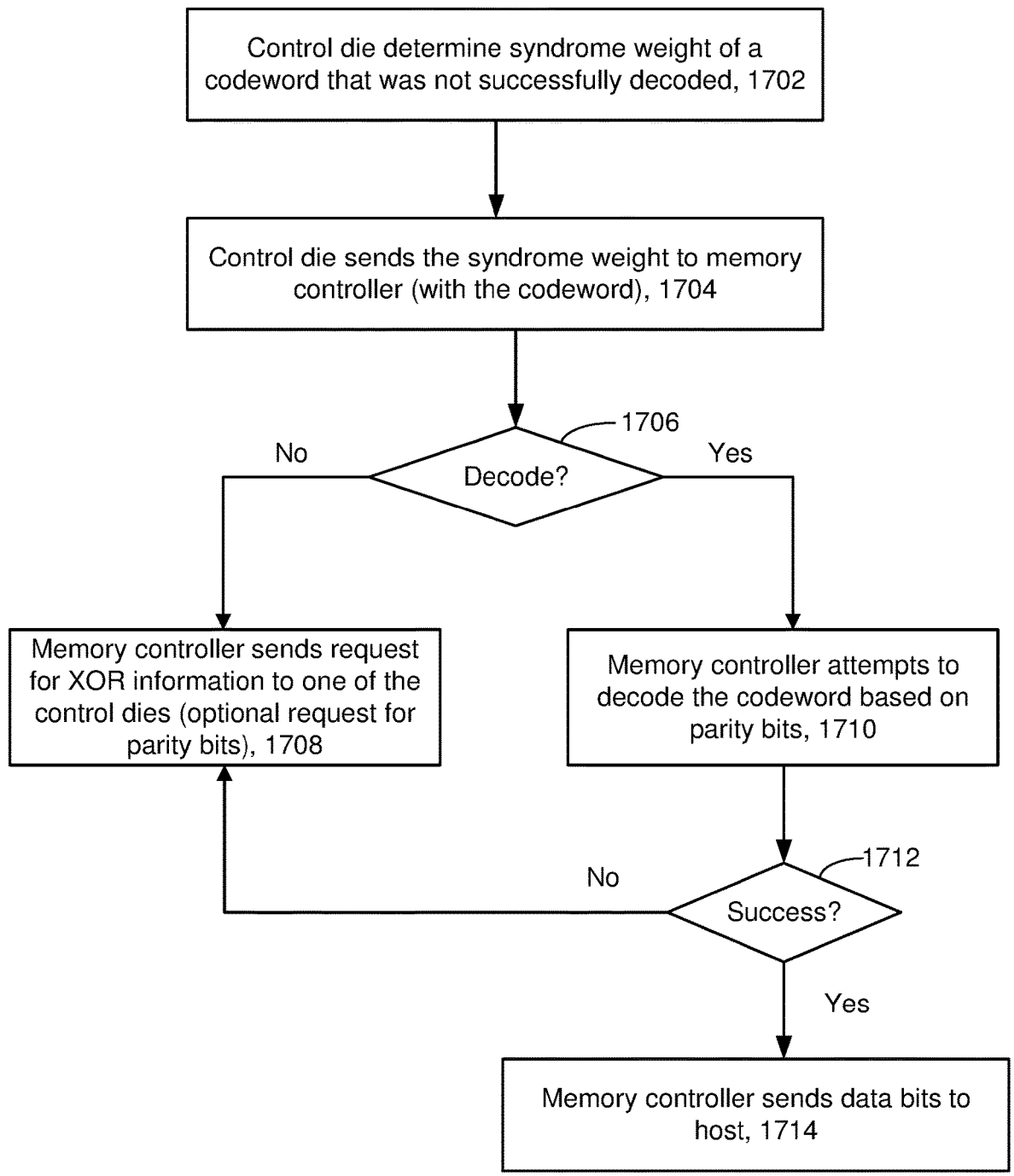
FIG. 17 depicts a flowchart of one embodiment of a process of a memory controller using decoding information to determine whether to attempt to decode a codeword.

In one embodiment, the control dies 304 send decoding information to the memory controller 102 that may be used to decide whether to attempt to decode a codeword at the memory controller 102. This can help to save time and/or power in the event it is unlikely that the memory controller 102 will be successful at decoding. FIG. 17 depicts a flowchart of one embodiment of a process 1700 of a memory controller 102 using decoding information to determine whether to attempt to decode a codeword. Process 1700 refers to one of the control die 304 in steps 1702-1704. Each control die 304 may separately perform these steps for a different codeword in a set of codewords that is stored across the memory dies 302. For example, steps 1702-1704 may be performed separately by each of control dies 304*a*, 304*b*, 304*c*, 304*d* when the memory system 100 is reading the set of codewords 1302*a*, 1302*b*, 1302*c*, 1302*d*.

Step 1702 includes a control die 304 determining a syndrome weight of a codeword that was not successfully decoded. In one embodiment, the syndrome weight is the initial syndrome weight. In one embodiment, the initial syndrome weight is the number of parity check equations that are unsatisfied before decoding using an iterative message passing decoder. In one embodiment, the syndrome weight is the final syndrome weight. In one embodiment, the final syndrome weight is the number of parity check equations that are unsatisfied after the final iteration of an iterative message passing decoder. The syndrome weight is not limited to these two examples. That is, the syndrome weight could be somewhere between the initial and final syndrome weight.

Step 1704 includes the control die 304 sending the syndrome weight to the memory controller 102. The control die 304 could send one or more syndrome weights for the codeword, such as an initial syndrome weight and a final syndrome weight. The control die 304 may also send the codeword. This could be the raw (un-decoded) codeword, or a partially decoded codeword.

Step 1706 includes a determination by the memory controller 102 of whether to attempt to decode the codeword. In one embodiment, the memory controller 102 attempts to decode the codeword if the syndrome weight is below a threshold. The threshold is based on the likelihood that the memory controller 102 would be able to decode the codeword using a decoding technique available to the memory controller.

If the memory controller determines not to decode the codeword (step 1706 is no), then the memory controller 102 sends a request for XOR information to one of the control dies 304, in step 1708. This is not necessarily the control die 304 referenced in steps 1702-1704. For example, control die 304*a* may have failed to decode codeword 1302*a*, but the request for XOR information may be sent to control die 304*d*. Optionally, the memory controller 102 may request parity bits for codewords, in step 1708. The memory controller 102 may request that each control die 304 that successfully decoded a codeword in the set to provide the parity bits for its codeword.

If the memory controller determines to decode the codeword (step 1706 is yes), then the memory controller 102 attempts to decode in step 1710. In one embodiment, the memory controller 102 determines which decoder to use based on the syndrome weight. For example, the memory controller 102 may first use ECC mode A 226*a* if the syndrome weight is lower than a threshold. If decoding with ECC mode A 226*a* fails, then the memory controller can used ECC mode B 222*b*. If, however, the syndrome weight is above the threshold, then the memory controller 102 may skip using ECC mode A 226*a* and go straight to ECC mode B 226*b*. Thus, time and/or power can be saved by not attempting to decode using ECC mode A 226*a* if decoding with that mode is does not have a high enough probability of success.

If decoding was successful (step 1712 is yes), then the memory controller 102 sends the data bits to the host 120, in step 1714. If decoding was not successful (step 1712 is no), then the sends a request for XOR information to one of the control dies 304, in step 1708.

Some embodiments discussed above show or describe the memory controller 102 as having the XOR engine 224/254. As noted, the XOR engine is not required to be located on the memory controller 102. Various processes described herein may be modified such that actions performed at a memory controller 102 could be performed at a control die having an XOR engine 381, such as control die 304*d*. Various processes described herein may be modified such that actions performed at a memory controller 102 could be performed at semiconductor die 1320 having an XOR engine 1330. For example, processes 1500, 1600, and/or 1700 may be modified as just described.

Figure 18:
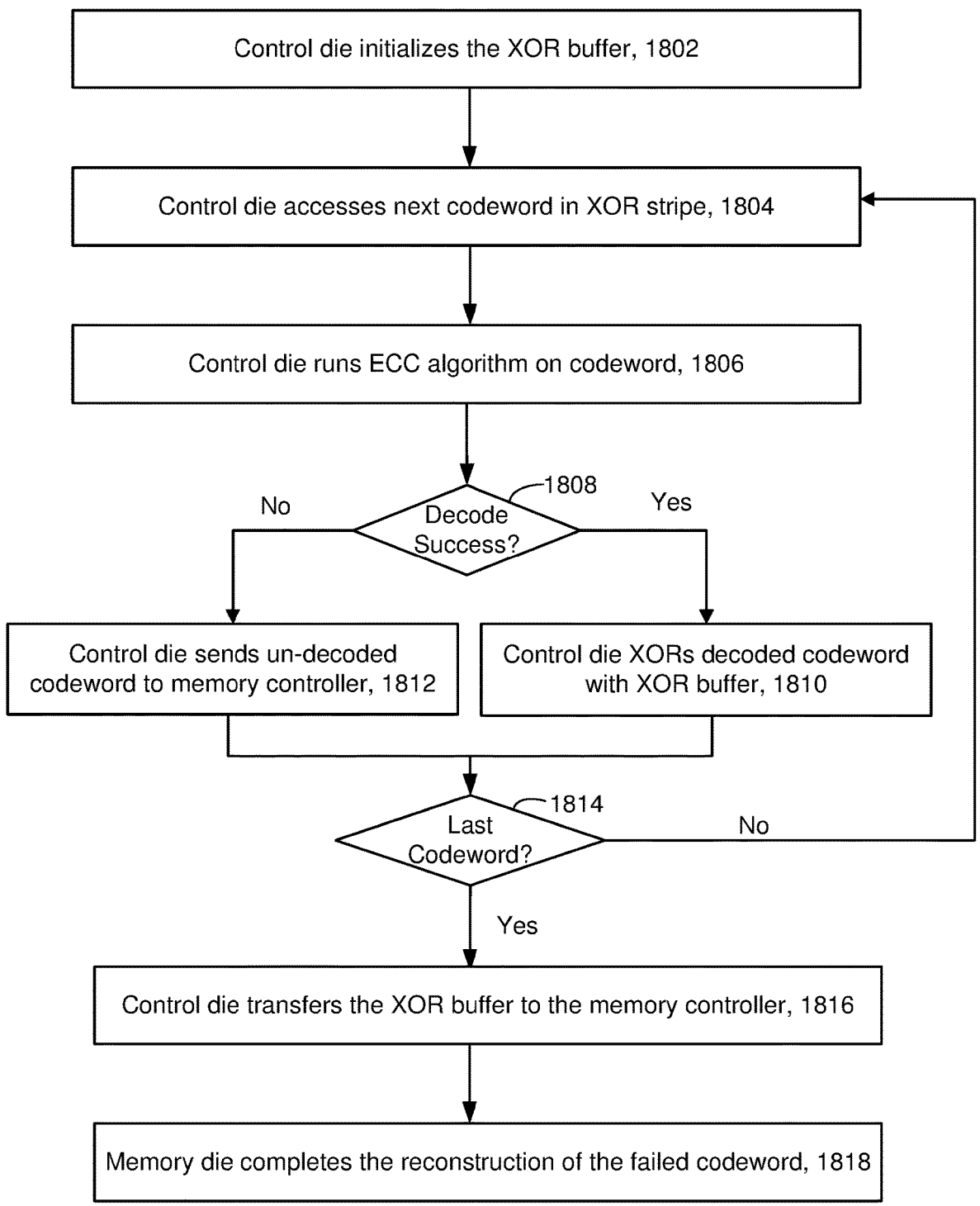
FIG. 18 depicts a flowchart that shows further details of one embodiment of a control die performing an XOR recovery of a failed codeword.

As noted above, in some embodiments, the control die 304 has an XOR engine 381. FIG. 18 depicts a flowchart that shows further details of one embodiment of a control die 304 performing an XOR recovery of a failed codeword. This process 1800 may be performed after attempts to decode the codeword using one or more ECC decoders have failed. In some embodiments, first an attempt is made to decode a codeword at the control die 304 with a relatively low power ECC decoder. If decoding at the control die 304 fails, then the memory controller 102 may use one or more ECC decoders to attempt to decode the codeword. In one embodiment, if the memory controller 102 fails to decode the codeword (hence a UECC error), then process 1800 may be performed to recover data for the failed codeword. However, it is not required for the memory controller 102 to use every ECC decoder at its disposal prior to using process 1800. To help illustrate process 1800, an example will be discussed with reference to control die 304*a* in FIG. 13D.

Step 1802 includes the control die 304*a* initializing the XOR buffer 1306*a*. The XOR buffer 1306*a* is used to store the present result of various XOR operations that are performed in process 1800. In one embodiment, initially the redundancy information 1304*a* is accessed from the memory die 302*a* and stored into the XOR buffer 1306*a*. In one embodiment, the redundancy information 1304*a* is an XOR codeword. In other words, the XOR codeword was formed by performing a bitwise XOR successively on each codeword in the XOR stripe.

Step 1804 includes the control die 302 accessing the next codeword in the XOR stripe. There could be any number of codewords in the XOR stripe, but for the sake of discussion, an example in which there are 128 codewords in the XOR stripe will be discussed. Thus, process 1800 will operate on each of these 128 codewords, except the failed codeword.

Step 1806 includes the control die 304 running an ECC algorithm on the codeword that was accessed in step 1804. In one embodiment, the control die 304 uses a low-density parity check (LDPC) decoder. In one embodiment, the control die 304 uses an iterative message passing decoder. In one embodiment, the control die 304 uses a bit flipping decoder. In one embodiment, the control die 304 uses a hard bit decoder. Optionally, the control die 304 could attempt to decode the codeword using more than one technique. For example, the control die 304 could use a soft bit decoder, if decoding with a hard bit decoder fails.

Step 1808 includes a determination of whether decoding was successful. If the codeword is successfully decoded, then control passes to step 1810. Step 1810 includes XOR-ing the decoded codeword with present contents in the XOR buffer 1306a. The result of the XOR operation is stored into the XOR buffer 1306a.

If the codeword is not successfully decoded (step 1808 is no), then step 1812 is performed. Step 1812 includes sending the un-decoded codeword to the memory controller 102. In other words, the control die 304 sends the codeword in its raw form, as it was accessed from the memory die 302. This includes sending both data bit and parity bits of the codeword.

Step 1814 includes a determination of whether this is the last codeword in the XOR stripe. If not, control passes to step 1804 to access the next codeword in the XOR stripe. With each iteration of process 1800 either the decoded codeword is XORed with the content of the XOR buffer 1306a (in step 1810) or the un-decoded codeword is sent to the memory controller 102 (in step 1812). When all codewords have been processed (Step 1814 is yes), control passes to step 1816.

Step 1816 includes the control die 304 transferring the contents of the XOR buffer 1306a to the memory controller 102. Step 1818 includes the memory controller 102 completing the reconstruction of the failed codeword. If there were any un-decoded codewords sent in step 1812, then the memory controller 102 may use a stronger ECC decoder, such as a soft bit decoder on the un-decoded codewords sent in step 1812. The memory controller 102 then completes the XOR recovery by performing an XOR with the now decoded codeword and contents in the XOR buffer.

Note that the contents of the XOR buffer is, in one embodiment, the size of a codeword in the XOR stripe. In some cases, there may be a need to transfer an un-decoded codeword in step 1812; however, typically this is quite rare. Thus, transferring just the contents of the XOR buffer (and possibly a small number of un-decoded codewords) is far more efficient than transferring all codewords to the memory controller 102 (to allow the memory controller 102 to perform the XOR recovery). For example, there could be a large number of codewords in the XOR stripe. One example is to have 128 codewords in the XOR stripe, but there could be more or fewer.

In some embodiments, a joint XOR and LDPC recovery (JLX recovery) is performed. A JLX recovery is an ECC algorithm that uses both ECC parity and the XOR information to attempt to recover multiple UECC failures in an XOR stripe. In some embodiments, an XOR recover is only able to recover from one UECC failure. Some of the calculations are performed on the control dies 304, which allows such calculations to be performed in parallel. Also, performing calculations on the control dies 304 significantly reduced data transfer from the control dies 304 to the memory controller 102.

Figure 19:
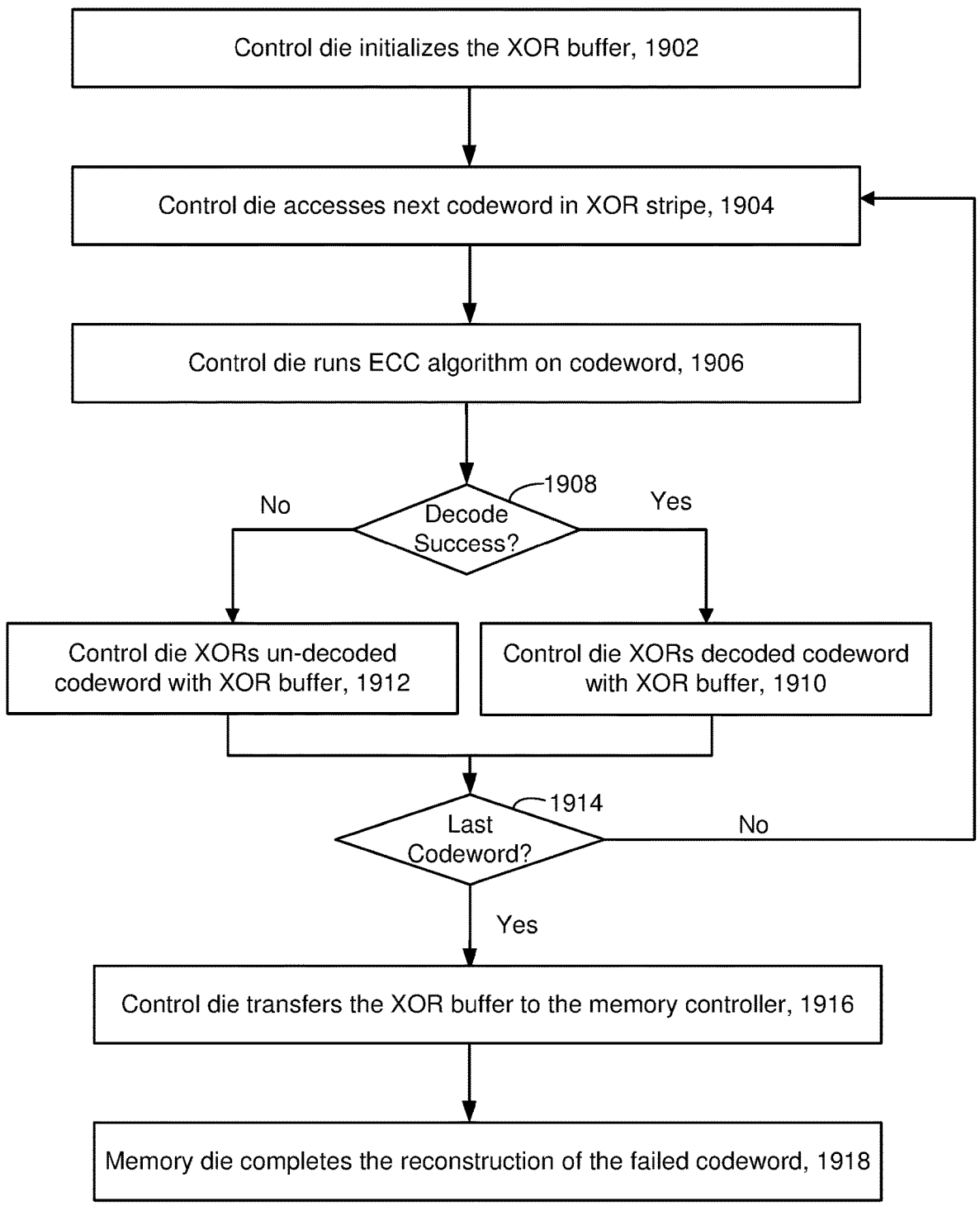
FIG. 19 depicts a flowchart of one embodiment of a process of JLX recovery.

The JLX recovery may be used as an extension of the XOR recovery described in process 1800. For purpose of discussion, the failed codeword for which XOR recovery was originated in process 1800 will be referred to as a first failed codeword. FIG. 19 depicts a flowchart of one embodiment of a process 1900 of JLX recovery. Process 1900 may be used when there is a second or more failed codeword in the XOR stripe. Thus, process 1900 may be triggered in response to an ECC decoding failure of a second (or more) codeword in an XOR stripe. In other words, process 1900 may be triggered in response to an ECC decoding failure of a codeword in an XOR stripe other than the codeword for which XOR recovery was originated. For example, process 1900 may be triggered in the event that the memory controller 102 is not able to decode a codeword (using an ECC decoder) that was sent in step 1812 of process 1800.

Process 1900 primarily differs from process 1800 in the action performed when decoding a codeword with the ECC decoder at the control die 304 fails. Recall that in step 1812 of process 1800, when decoding of a codeword with the ECC decoder fails, the un-decoded codeword is sent to the memory controller 102. Process 1900 differs in that the control die XORs the un-decoded codeword with the content of the XOR buffer 1306, in step 1912.

Some of the steps in process 1900 will be discussed only briefly due to the similarity with process 1800. Step 1902 includes the control die 304a initializing the XOR buffer 1306a, which may be performed as described in step 1802. Step 1904 includes the control die 302 accessing the next codeword in the XOR stripe, which may be performed as described in step 1804. Step 1906 includes the control die 304 running an ECC algorithm on the codeword, which may be performed as described in step 1806.

Step 1908 includes a determination of whether decoding was successful. If the codeword is successfully decoded, then control passes to step 1910. Step 1910 includes XOR-ing the decoded codeword with present contents in the XOR buffer 1306a. The result of the XOR operation is stored into the XOR buffer 1306a.

If the codeword is not successfully decoded (step 1908 is no), then control passes to step 1912. Step 1912 is similar to step 1910, but is performed using the un-decoded codeword due to the failure to decode the codeword. Thus, step 1912 includes XORing the un-decoded codeword with the present contents in the XOR buffer 1306a. The result of the XOR operation is stored into the XOR buffer 1306a.

Step 1914 includes a determination of whether this is the last codeword in the XOR stripe. If not, control passes to step 1904 to access the next codeword in the XOR stripe. With each iteration of process 1900 either the decoded codeword is XORed with the content of the XOR buffer 1306a (in step 1910) or the un-decoded codeword is XORed with the content of the XOR buffer 1306a (in step 1912). When all codewords have been processed (Step 1914 is yes), control passes to step 1916.

Step 1916 includes the control die 304 transferring the contents of the XOR buffer 1306a to the memory controller 102. As noted above, the contents of the XOR buffer is, in one embodiment, the size of a codeword in the XOR stripe. In process 1900, there no need to transfer any un-decoded codewords in step 1912. Thus, transferring just the contents of the XOR buffer 1306 is far more efficient than transferring all codewords to the memory controller 102 (to allow the memory controller 102 to perform the XOR recovery).

Step 1918 includes the memory controller 102 completing the reconstruction of the failed codeword. The recovery process at the memory controller in 1918 will be different from that recovery in step 1818 due to the fact that the memory controller 102 does not have a clean (decoded) copy of the second failed codeword. In one embodiment, the recovery process at the memory controller 102 is to first produce what will be referred to as a "second copy" of the first failed codeword. In one embodiment, the second copy of the first failed codeword is the contents of the XOR buffer that was sent to the memory controller in step 1916. The memory controller 102 then uses this second copy of the first failed codeword as additional information to input to an ECC decoder. In one embodiment, the second copy of the first failed codeword is input to a soft bit decoder, along with hard bits and/or soft bits for the raw first failed codeword. The raw first failed codeword refers to the first failed codeword as it was read from the memory die 302 (note that this may include reading at hard bit levels and/or soft bit levels, as depicted in, for example, FIG. 12B). In one embodiment, hard bits for the raw first failed codeword, soft bits for the raw first failed codeword, and the second copy of the first failed codeword are input to an LDPC decoder. The additional information of the second copy of the first failed codeword may allow recovery of the first failed codeword. Moreover, note that if the first failed codeword is recovered, then the recovered (or clean) first failed codeword may be used to assist in recovering the second failed codeword.

Note that in some embodiments, process 1800 and/or 1900 are performed in an architecture depicted in FIG. 13D, in which the XOR stripe is stored in a single memory die 302. However, in some embodiments, process 1800 and/or 1900 are performed in an architecture depicted in FIG. 13B, in which the XOR stripe is stored across multiple memory dies 302. In this option, one of the control dies (e.g., control die 304*d*) acts a master that performs the XOR operation. Also note that even in the cases in which the XOR stripe is stored across multiple memory dies 302, each control die 304 could have an XOR engine 381, which allows a choice of which control die 304 is to perform the XOR recovery for the XOR stripe.

Many alternatives and enhancements to performing XOR recovery on the control die 304 are possible. In some embodiments, an iterative approach is used, which can also help to recover more than one failed codeword in an XOR stripe. The iterative approach may be used if performing process 1900 fails to recover the first failed codeword. [Note that a non-iterative embodiment of process 1900 may also be used to recover more than one failed codeword. However, an iterative approach can have a greater chance of success, at the expense of being more complex.] In that event, a second copy of the second failed codeword may be constructed in an attempt to decode the second failed codeword. For example, process 1900 may be performed on the second failed codeword. If the second failed codeword is recovered using process 1900, then the XOR buffer 1306 is improved by using the clean copy of the second failed codeword. Basically stated, if the content in the XOR buffer 1306 was formed using a "dirty" copy (e.g., the un-decoded version), of the second failed codeword, that dirty information is removed from the XOR buffer 1306 and replaced with clean information. Then, this cleaner version of the XOR buffer may be used to attempt to recover the first failed codeword, or even a third failed codeword in the XOR stripe.

Figure 20:
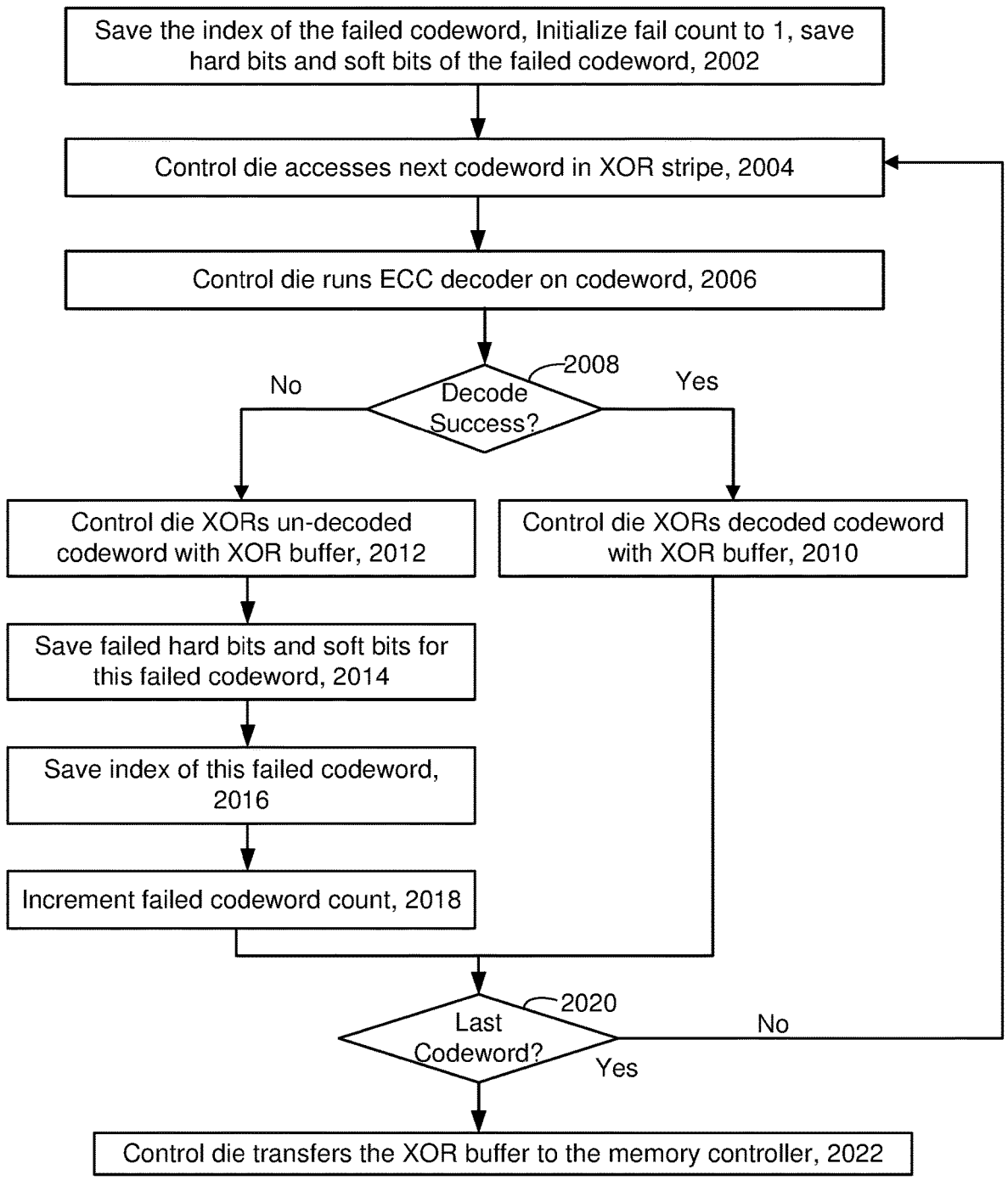
FIG. 20 depicts a flowchart of one embodiment of a process of a control die performing an initial phase of an iterative JLX recovery.

FIG. 20 depicts a flowchart of one embodiment of a process 2000 of a control die 302 performing an initial phase of an iterative JLX recovery. Step 2002 includes the control die 304 saving the index of the first failed codeword. Step 2002 also includes initializing a fail count to 1. The fail count refers to the total number of failed codewords in the XOR stripe. The fail count is set to 1 to represent the original (or first) failed codeword for which recovery is sought. Step 2002 also includes saving hard bits and soft bits for the failed codeword. Step 2002 may also include the control die 304*a* initializing the XOR buffer 1306, which may be performed as described in step 1802.

Step 2004 includes the control die 304 accessing the next codeword in the XOR stripe, which may be performed as described in step 1804. Step 2006 includes the control die 304 running an ECC decoder on the codeword, which may be performed as described in step 1806. Step 2008 includes a determination of whether decoding was successful. If the codeword is successfully decoded, then control passes to step 2010. Step 2010 includes XORing the decoded codeword with the present content in the XOR buffer 1306. The result of the XOR operation is stored into the XOR buffer 1306.

If the codeword is not successfully decoded (step 2008 is no), then control passes to step 2012. Step 2012 is similar to step 2010, but is performed using the un-decoded codeword due to the failure to decode the codeword. Thus, step 2012 includes XORing the un-decoded codeword with the present contents in the XOR buffer 1306. The result of the XOR operation is stored into the XOR buffer 1306.

Step 2014 includes saving the hard bits and the soft bits for this failed codeword (i.e., the codeword that failed to decode in step 2006). Step 2016 includes saving the index for this failed codeword. Step 2018 includes incrementing the failed codeword count.

Step 2020 includes a determination of whether this is the last codeword in the XOR stripe. If not, control passes to step 2004 to access the next codeword in the XOR stripe. When all codewords have been processed (Step 2020 is yes), control passes to step 2022.

Step 2022 includes the control die 304 transferring the contents of the XOR buffer 1306 to the memory controller 102. The control die 302 may also send the index for each of the failed codewords, as well as the hard bits and the soft bits for each of the failed codewords. The control die 302 may also send the fail bit count to the memory controller 102. In other option, the control die 302 sends the index for just one of the failed codewords, as well as the hard bits and the soft bits for that failed codewords at this time. The control die 302 may send the index for the other failed codewords, as well as the hard bits and the soft bits for the other failed codewords at a later time.

Note that if the path of steps 2012-2108 was taken, this means that the XOR buffer 1306 contains some "dirty information". This dirty information refers to the fact that the control die XORed the un-decoded codeword in step 2012. However, as will be discussed in connection with FIG. 21, the dirty information can be replaced by "clean information." The clean information refers to what is done in step 2010 when a decoded (or clean) codeword is XORed with the contents of the XOR buffer 1306. This process of cleaning the XOR buffer 1306 can assist in recovering failed codewords.

As noted above, the contents of the XOR buffer is, in one embodiment, the size of a codeword in the XOR stripe. In process 2000, there no need to transfer any un-decoded codewords to the memory controller 102. Thus, transferring just the contents of the XOR buffer 1306 is very efficient relative to transferring all codewords to the memory controller 102.

Figure 21:
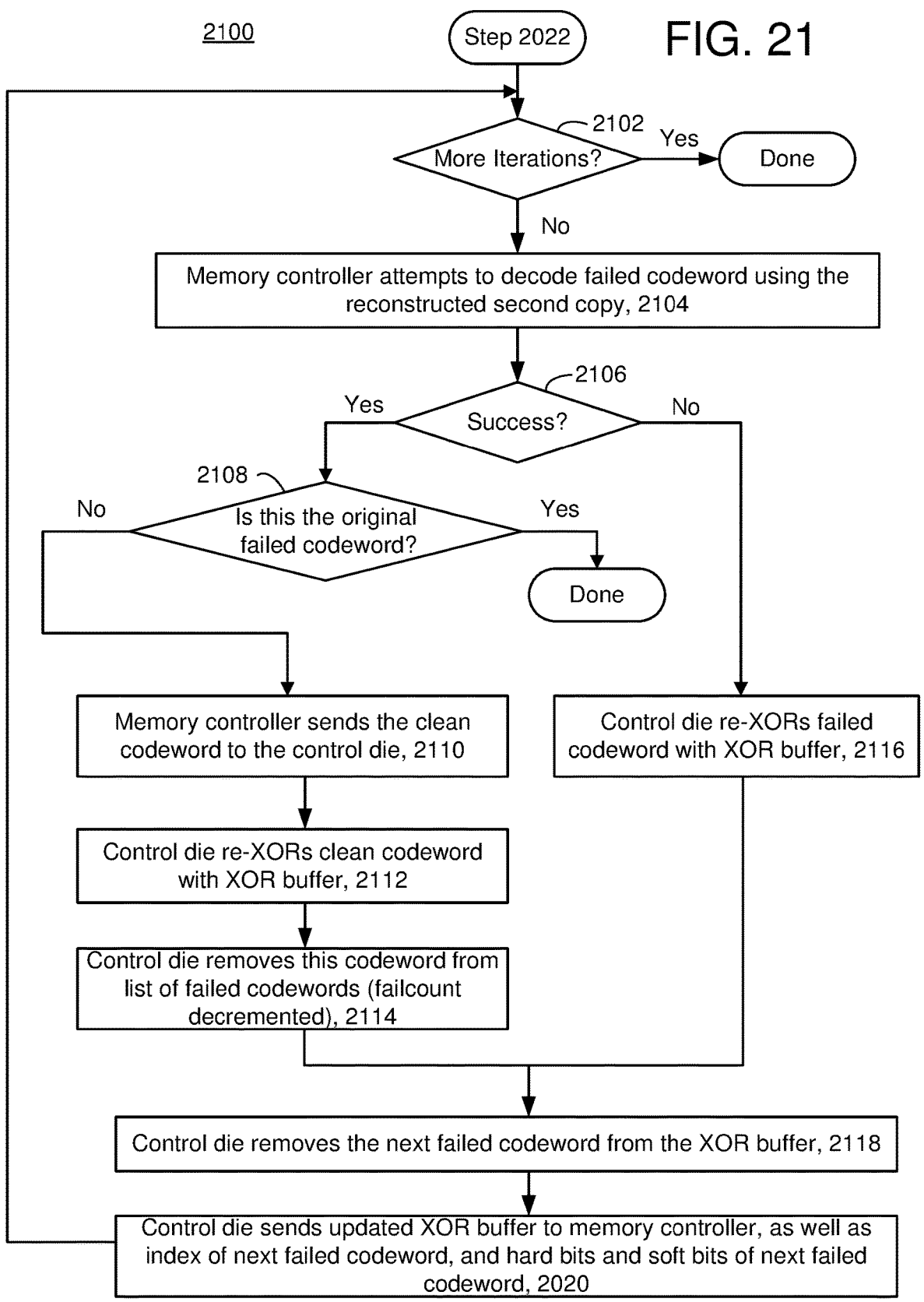
FIG. 21 depicts a flowchart of one embodiment of a process of an iterative phase of iterative JLX recovery.

After performing the initial phase in process 2000, an iterative procedure may be performed. Each iteration attempts to improve the quality of the XOR buffer 1306, which can help to recover more failed codewords. FIG. 21 depicts a flowchart of one embodiment of a process 2100 of an iterative phase of iterative JLX recovery. Step 2102 of process 2100 is performed after step 2022 of process 2000. Each iteration of process 2100 is applied to a different one of the failed codewords from process 2000. Step 2102 is a determination of whether additional iterations should be performed. This determination is based on whether processing of an additional failed codeword may be beneficial. This determination may be based on other considerations, such as a timeout limitation.

Step 2104 includes the memory controller attempting to decode the failed codeword that is the subject of this iteration using the reconstructed second copy (the XOR buffer). Step 2016 is a determination of whether the decode of 2104 was successful. If so, then a determination is made in step 2108 of whether this is the original failed codeword. If this is the original failed codeword (step 2108 is yes), then the process is done, as the original failed codeword has been successfully recovered. In other embodiments, the recovery process can proceed to all failures in the XOR stripe.

If this is not the original failed codeword (step 2108 is no), then the memory controller 102 sends the clean codeword to the control die 304, in step 2110. Step 2112 includes the control die re-XORing the clean codeword with the XOR buffer 1306. In one embedment, memory controller 102 performs step 2112. Step 2114 includes the control die 304 removing this codeword from its list of failed codewords. The fail count is decremented in step 2114.

If the decode of step 2104 was not successful (step 2106 is no), then control passes to step 2116. Step 2116 includes the control die 302 re-XORing the failed codeword with the XOR buffer 1306. After either step 2114 or step 2116, step 2118 is performed. In step 2118, the control die 304 removes the next failed codeword from the XOR buffer 1306 by XORing the undecoded code-word with the XOR buffer 1306. The next failed codeword refers the codeword that is to be processed in the next iteration of process 2100. Note that step 2118 removes the aforementioned dirty information from the XOR buffer 1306. Step 2112, if performed, will replace the dirty information with clean information. Step 2116, if performed, will put the dirty information back into the XOR buffer 1306.

In step 2020, the control die 304 sends the updated XOR buffer 1306 to the memory controller 102. The control die 304 may also send the index of the next failed codeword to be processed. The control die 304 may also send the hard bits and the soft bits of the next failed codeword.

A first embodiment includes an apparatus a plurality of memory semiconductor dies and a plurality of control semiconductor dies. Each memory semiconductor dies comprises non-volatile memory cells and a first plurality of pathways. Each semiconductor die comprises one or more control circuits and a second plurality of pathways. Each control semiconductor die is attached to at least one of the memory semiconductor dies to allow communication between the control semiconductor die and the at least one memory semiconductor die by way of pathway pairs of the first plurality of pathways and the second plurality of pathways. The one or more control circuits on each control semiconductor die are configured to access an error corrected code (ECC) codeword in the non-volatile memory cells in the memory semiconductor die to which the respective control semiconductor die is attached. Collectively the control semiconductor dies access a set of ECC codewords, wherein each ECC codeword comprises data bits and parity bits. The one or more control circuits read each data bit and each parity bit of a ECC codeword through a different pathway pair. The one or more control circuits of each control semiconductor are configured to run an error correcting code (ECC) algorithm on the accessed ECC codeword using the parity bits for the accessed ECC codeword. The one or more control circuits on at least one of the control semiconductor dies are configured to access redundancy information for the set of the ECC codewords from one of the memory dies. The apparatus further comprises an additional control circuit configured to use the redundancy information and information from running the ECC algorithm to recover the data bits of the set of the ECC codewords.

In a second embodiment, in furtherance of the first embodiment, the additional control circuit is configured to request the redundancy information from a first of the control semiconductor dies in response to a failure of the additional control circuit to decode one of the ECC codewords that was not decoded by a second of the control semiconductor dies.

In a third embodiment, in furtherance of the first embodiment or second embodiments, the one or more control circuits on each control semiconductor die are configured to send the data bits from ECC codewords that were successfully decoded using the ECC algorithm to the additional control circuit, and to send ECC codewords that were not successfully decoded using the ECC algorithm to the additional control circuit.

In a fourth embodiment, in furtherance of any of the first to third embodiments, the one or more control circuits of each respective control semiconductor die are configured to provide the additional control circuit with a syndrome weight of an un-decoded ECC codeword in the set that the respective control semiconductor die did not decode using the ECC algorithm. Also, the additional control circuit is configured to determine whether to attempt to decode the un-decoded ECC codeword using the parity bits of the un-decoded ECC codeword based on the syndrome weights.

In a fifth embodiment, in furtherance of any of the first to fourth embodiments, a first memory semiconductor die of the memory semiconductor dies comprises a first plurality of bond pads, a second control semiconductor die of the control semiconductor dies comprises a second plurality of bond pads, and each pathway pair comprises a bond pad of the first plurality of bond pads and a bond pad of the second plurality of bond pads.

In a sixth embodiment, in furtherance of any of the first to fifth embodiments, the redundancy information comprises a bitwise XOR of each ECC codeword in the set of ECC codewords.

In a seventh embodiment, in furtherance of any of the first to sixth embodiments, the redundancy information comprises global parity bits.

In an eighth embodiment, in furtherance of any of the first to seventh embodiments, the apparatus further comprises a memory controller that is in communication with the plurality of control semiconductor dies. The additional control circuit resides on the memory controller.

In a ninth embodiment, in furtherance of any of the first to eighth embodiments, additional control circuit resides on one of the control semiconductor dies.

One embodiment includes a method of recovering data. The method comprises accessing, at plurality of control dies, a set of error correcting code (ECC) codewords that are stored across a plurality of memory dies, including accessing each ECC codeword by way of bond pads that bond one of the control die to one of the memory die. Each ECC codeword comprises data bits and parity bits. The method comprises running an ECC decoder, at each control die, on the ECC codeword that was accessed from the memory die that is bonded to the control die. The method comprises sending decoding information from running the ECC decoders from each control die to a memory controller, wherein the decoding information indicates that at least one of the ECC codewords in the set was not decoded. The method comprises sending a request for XOR information from the memory controller to a selected control die of the control dies. The method comprises sending XOR information that is formed from the set of ECC codewords from the selected control die to the memory controller. The method comprises recovering the data bits of the set of ECC codewords, by the memory controller, based on the XOR information and the decoding information.

One embodiment includes a non-volatile memory system, comprising a memory controller and an assembly comprising a plurality of memory semiconductor dies, a plurality of control semiconductor dies, and bond pads that bond each control semiconductor die to one of the memory semiconductor die. Each control semiconductor die is in communication with the memory controller. Each memory semiconductor die comprises non-volatile memory cells. Each control semiconductor die comprises one or more control circuits configured to read codewords stored in the non-volatile memory cells on the memory die to which the control semiconductor die is bonded, including read each data bit and each parity bit of a codeword through a different pad of the bond pads. Each control semiconductor die comprises one or more control circuits configured to apply a parity bit checking algorithm to attempt to decode the codewords based only on the individual codewords. Each control semiconductor die comprises one or more control circuits configured to send data bits from codewords that were successfully decoded using the parity bit checking algorithm to the memory controller. Each control semiconductor die comprises one or more control circuits configured to send codewords that were not successfully decoded using the parity bit checking algorithm to the memory controller. At least one of the control semiconductor dies is configured to send XOR information for an XOR stripe that comprises a set of the codewords to the memory controller. The memory controller is configured to use the XOR information to recover the data bits for the codewords in the XOR stripe.

One embodiment includes an integrated memory assembly, comprising a memory semiconductor die comprising non-volatile memory cells and a first plurality of bond pads, and a control semiconductor die comprising one or more control circuits and a second plurality of bond pads. The control semiconductor die is bonded to the memory semiconductor die by way of the bond pads to allow communication between the control semiconductor die and the memory semiconductor die. The one or more control circuits on the control semiconductor die are configured to read error corrected code (ECC) codewords stored in the non-volatile memory cells on the memory die. The ECC codewords are part of an XOR stripe. Each codeword comprises data bits and parity bits. The one or more control circuits read each data bit and each parity bit stored in the non-volatile memory cells on the memory die by way of a different bond pad. The one or more control circuits on the control semiconductor die are configured to read XOR information stored in the non-volatile memory cells. The XOR information is based on the ECC codewords that were read and a failed ECC codeword of the XOR stripe. The one or more control circuits on the control semiconductor die are configured to apply an ECC algorithm to correct errors in ECC codewords of the XOR stripe that were read. The one or more control circuits on the control semiconductor die are configured to perform XOR recovery to produce a version of the failed ECC codeword based on the XOR information and at least ECC codewords in the XOR stripe that were successfully decoded by the ECC algorithm. The one or more control circuits on the control semiconductor die are configured to send the version of the failed ECC codeword to a memory controller.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An apparatus, comprising:
a plurality of memory semiconductor dies each comprising non-volatile memory cells and a first plurality of pathways; and
a plurality of control semiconductor dies each comprising one or more control circuits and a second plurality of pathways, wherein each control semiconductor die is attached to at least one of the memory semiconductor dies to allow communication between the control semiconductor die and the at least one memory semiconductor die by way of pathway pairs of the first plurality of pathways and the second plurality of pathways, wherein the one or more control circuits on each control semiconductor die are configured to:
  access an error corrected code (ECC) codeword in the non-volatile memory cells in the memory semiconductor die to which the respective control semiconductor die is attached, wherein collectively the control semiconductor dies access a set of ECC codewords, wherein each codeword comprises data bits and parity bits; and
  run an ECC algorithm on the accessed ECC codeword using the parity bits for the accessed ECC codeword;
  wherein the one or more control circuits on at least one of the control semiconductor dies are configured to access redundancy information for the set of the ECC codewords from one of the memory dies; and
an additional control circuit configured to use the redundancy information and information from running the ECC algorithm to recover the data bits of the set of the ECC codewords.

2. The apparatus of claim 1, wherein the additional control circuit is configured to:
request the redundancy information from a first of the control semiconductor dies in response to a failure of the additional control circuit to decode one of the ECC codewords that was not decoded by a second of the control semiconductor dies.

3. The apparatus of claim 1, wherein the one or more control circuits on each control semiconductor are is configured to:
send the data bits from codewords that were successfully decoded using the ECC algorithm to the additional control circuit; and
send codewords that were not successfully decoded using the ECC algorithm to the additional control circuit.

4. The apparatus of claim 1, wherein:
the one or more control circuits of each respective control semiconductor die are configured to provide the additional control circuit with a syndrome weight of an un-decoded codeword in the set that the respective control semiconductor die did not decode using the ECC algorithm; and the additional control circuit is configured to determine whether to attempt to decode the un-decoded codeword using the parity bits of the un-decoded codeword based on the syndrome weights.

5. The apparatus of claim 1, wherein:
a first memory semiconductor die of the memory semiconductor dies comprises a first plurality of bond pads;
a second control semiconductor die of the control semiconductor dies comprises a second plurality of bond pads; and
each pathway pair comprises a bond pad of the first plurality of bond pads and a bond pad of the second plurality of bond pads.

6. The apparatus of claim 1, wherein the redundancy information comprises a bitwise XOR of each ECC codeword in the set of ECC codewords.

7. The apparatus of claim 1, wherein the redundancy information comprises global parity bits.

8. The apparatus of claim 1, further comprising:
a memory controller that is in communication with the plurality of control semiconductor dies, wherein the additional control circuit resides on the memory controller.

9. The apparatus of claim 1, wherein the additional control circuit resides on one of the control semiconductor dies.

10. A method of recovering data, the method comprising:
accessing, at a plurality of control dies, a set of error correcting code (ECC) codewords that are stored across a plurality of memory dies, including accessing each ECC codeword by way of bond pads that bond one of the control dies to one of the memory dies, wherein each ECC codeword comprises data bits and parity bits;
running an ECC decoder, at each control die, on the ECC codeword that was accessed from the memory die that is bonded to the control die;
sending decoding information from running the ECC decoders from each control die to a memory controller, wherein the decoding information indicates that at least one of the ECC codewords in the set was not decoded;
sending a request for XOR information from the memory controller to a selected control die of the control dies;
sending XOR information that is formed from the set of ECC codewords from the selected control die to the memory controller; and
recovering the data bits of the set of ECC codewords, by the memory controller, based on the XOR information and the decoding information.

11. The method of claim 10, wherein:
sending the request for the XOR information is performed in response to failing, at the memory controller, to decode the at least one ECC codeword in the set that was not decoded by a control die.

12. The method of claim 10, wherein:
sending the decoding information comprises sending a syndrome weight for the at least one ECC codeword in the set that was not decoded at the control dies; and
sending the request for the XOR information from the memory controller to the selected control die is performed without attempting to decode the at least one ECC codeword at the memory controller in response to the syndrome weight being above a threshold.

13. The method of claim 10, wherein the decoding information comprises a syndrome weight for the at least one ECC codeword in the set that was not decoded at the control dies, and further comprising determining, at the memory controller, which decoding mode out of a plurality of decoding modes to use based on the syndrome weight.

14. A non-volatile memory system, comprising:
a memory controller; and
an assembly comprising a plurality of memory semiconductor dies, a plurality of control semiconductor dies, and bond pads that bond each control semiconductor die to one of the memory semiconductor dies, wherein each control semiconductor die is in communication with the memory controller, wherein each memory semiconductor die comprises non-volatile memory cells, wherein each control semiconductor die comprises one or more control circuits configured to:
read codewords stored in the non-volatile memory cells on the memory die to which the control semiconductor die is bonded, including read each data bit and each parity bit of a codeword through a different pad of the bond pads;
apply a parity bit checking algorithm to attempt to decode the codewords based only on the individual codewords;
send data bits from codewords that were successfully decoded using the parity bit checking algorithm to the memory controller; and
send codewords that were not successfully decoded using the parity bit checking algorithm to the memory controller;
wherein at least one of the control semiconductor dies is configured to send XOR information for an XOR stripe that comprises a set of the codewords to the memory controller; and
wherein the memory controller is configured to use the XOR information to recover the data bits for the codewords in the XOR stripe.

15. The non-volatile memory system of claim 14, wherein each codeword in the XOR stripe is stored on a different memory semiconductor die of the plurality of memory semiconductor dies.

16. The non-volatile memory system of claim 14, wherein the memory controller is configured to request the XOR information for the XOR stripe in response to not having all of the data bits for the codewords in the XOR stripe.

17. The non-volatile memory system of claim 14, wherein the XOR information comprises a bitwise XOR of each codeword in the XOR stripe.

18. The non-volatile memory system of claim 14, wherein the XOR information comprises a bitwise XOR of global parity bits for each codeword in the XOR stripe.

19. The non-volatile memory system of claim 14, wherein the one or more control circuits of each control semiconductor die are configured to send a syndrome weight to the memory controller for each un-decoded codeword.

20. The non-volatile memory system of claim 19, wherein the memory controller is further configured to determine whether to attempt to decode the un-decoded codeword based on the syndrome weight.

21. An integrated memory assembly, comprising:
a memory semiconductor die comprising non-volatile memory cells and a first plurality of bond pads; and
a control semiconductor die comprising one or more control circuits and a second plurality of bond pads, wherein the control semiconductor die is bonded to the memory semiconductor die by way of the bond pads to allow communication between the control semiconductor die and the memory semiconductor die, wherein the one or more control circuits on the control semiconductor die are configured to:

read error corrected code (ECC) codewords stored in the non-volatile memory cells on the memory die, wherein the ECC codewords are part of an XOR stripe, wherein each codeword comprises data bits and parity bits, wherein the one or more control circuits read each data bit and each parity bit stored in the non-volatile memory cells on the memory die by way of a different bond pad;

read XOR information stored in the non-volatile memory cells, wherein the XOR information is based on the ECC codewords that were read and a failed ECC codeword of the XOR stripe;

apply an ECC algorithm to correct errors in ECC codewords of the XOR stripe that were read;

perform XOR recovery to produce a version of the failed ECC codeword based on the XOR information and at least ECC codewords in the XOR stripe that were successfully decoded by the ECC algorithm; and send the version of the failed ECC codeword to a memory controller.

22. The integrated memory assembly of claim 21, wherein the one or more control circuits are further configured to:
send any ECC codewords of the XOR stripe that were not successfully decoded by the ECC algorithm to the memory controller, wherein the version of the failed ECC codeword is based only on the XOR information and the ECC codewords that were successfully decoded by the ECC algorithm.

23. The integrated memory assembly of claim 21, wherein the one or more control circuits are further configured to:
perform the XOR recovery to produce the version of the failed ECC codeword based on the XOR information, the ECC codewords that were successfully decoded by the ECC algorithm, and an un-decoded version of any ECC codeword that was not successfully decoded by the control die applying the ECC algorithm.

24. The integrated memory assembly of claim 23, wherein the failed ECC codeword is a first failed ECC codeword in the XOR stripe, wherein the one or more control circuits are further configured to:
perform a second XOR recovery to recover a second failed ECC codeword in the XOR stripe based on the XOR information and the ECC codewords in the XOR stripe that were successfully decoded at the control die by the ECC algorithm; and
perform a third XOR recovery to recover the first failed ECC codeword based on the recovered second failed ECC codeword.

* * * * *